United States Patent
Harashina

(10) Patent No.: US 7,205,346 B2
(45) Date of Patent: Apr. 17, 2007

(54) FLAME-RETARDANT RESIN COMPOSITION

(75) Inventor: Hatsuhiko Harashina, Fuji (JP)

(73) Assignee: Polyplastics Co., Ltd., Tokyo (JP)

( * ) Notice: Subject to any disclaimer, the term of this patent is extended or adjusted under 35 U.S.C. 154(b) by 0 days.

(21) Appl. No.: 10/493,538

(22) PCT Filed: Nov. 28, 2002

(86) PCT No.: PCT/JP02/12405

§ 371 (c)(1),
(2), (4) Date: Apr. 22, 2004

(87) PCT Pub. No.: WO03/046084

PCT Pub. Date: Jun. 5, 2003

(65) Prior Publication Data

US 2004/0254270 A1  Dec. 16, 2004

(30) Foreign Application Priority Data

Nov. 30, 2001  (JP) .............................. 2001-368005

(51) Int. Cl.
C08K 5/5313 (2006.01)

(52) U.S. Cl. .................. 524/133; 524/99; 524/100; 524/101; 524/102; 524/116; 524/126; 524/127; 524/140; 524/141; 524/145; 524/154; 524/404; 524/416; 524/417

(58) Field of Classification Search .......... 524/99–102, 524/116, 126–127, 133, 140–141, 154, 404, 524/416–417
See application file for complete search history.

(56) References Cited

U.S. PATENT DOCUMENTS

| | | | | |
|---|---|---|---|---|
| 5,266,618 A | * | 11/1993 | Watanabe et al. | 524/405 |
| 5,770,644 A | * | 6/1998 | Yamamoto et al. | 524/120 |
| 6,066,686 A | * | 5/2000 | Katayama et al. | 523/423 |
| 6,124,385 A | * | 9/2000 | Honl et al. | 524/115 |
| 6,228,912 B1 | * | 5/2001 | Campbell et al. | 524/100 |
| 6,753,363 B1 | * | 6/2004 | Harashina | 524/99 |
| 6,759,460 B2 | * | 7/2004 | Kamo et al. | 524/100 |
| 6,790,886 B2 | * | 9/2004 | Harashina et al. | 524/116 |

FOREIGN PATENT DOCUMENTS

| | | |
|---|---|---|
| EP | 0 791 634 | 8/1997 |
| JP | 61-287960 | 12/1986 |
| JP | 62-201963 | 9/1987 |
| JP | 63-92667 | 4/1988 |
| JP | 63-150349 | 6/1988 |
| JP | 6-25506 | 2/1994 |
| JP | 9-111059 | 4/1997 |
| JP | 10-195283 | 7/1998 |
| JP | 11-152402 | 6/1999 |

* cited by examiner

Primary Examiner—Peter Szekely
(74) Attorney, Agent, or Firm—Nixon & Vanderhye, P.C.

(57) ABSTRACT

A flame-retardant resin composition comprises a thermoplastic resin; a flame retardant comprising a phosphorus-containing compound (A), a aromatic resin (B), and at least one flame-retardant auxiliary (C) selected from a nitrogen-containing compound and a metal salt of an inorganic acid; and at least one stabilizer auxiliary (D) selected from a compound having a functional group reactive to an active hydrogen atom and a water-repellent compound. The phosphorus-containing compound may be a phosphoric ester. The aromatic resin may be a polyphenylene sulfide-series resin or a polyphenylene oxide-series resin. The nitrogen-containing compound is a salt of an amino group-containing triazine compound with an oxygen acid, a salt of an amino group-containing triazine compound with a hydroxyl group-containing triazine compound, a polyphosphoric acid amide, a cyclic urea compound, or others. The present invention provides a flame-retardant resin composition which has been flame-retarded without using a halogen-containing flame retardant.

2 Claims, No Drawings

FLAME-RETARDANT RESIN COMPOSITION

This application is the US national phase of international application PCT/JP02/12405 filed Nov. 28, 2002 which designated the U.S. and claims benefit of JP 368005/2001, dated Nov. 30, 2001, the entire content of which is hereby incorporated by reference.

TECHNICAL FIELD

The present invention relates to a flame-retardant resin composition which comprises a thermoplastic resin, a flame retardant comprising a phosphorus-containing compound, an aromatic resin and a specific flame-retardant auxiliary (a nitrogen-containing compound, a metal salt of an inorganic acid), and a specific stabilizer auxiliary (a compound containing a specific functional group, a water-repellent compound), to a process for producing the composition, and to a shaped article formed with the composition.

BACKGROUND ART

Among thermoplastic resins, a polyester-series resin (such as a polybutylene terephthalate), a styrenic resin, or the like has excellent mechanical and electrical properties, weather resistance, water resistance, and resistance to chemicals and solvents. Therefore, the resin has been utilized for various purposes such as electric or electronic device parts, and automotive parts. While, these resins are required to have improved flame retardancy as the field of their uses expands.

Japanese Patent Application Laid-Open No. 287960/1986 (JP-61-287960A) discloses a process for injection molding a polyamide resin with improving moldability of the resin, which comprises adding a polyester-series resin having a butylene naphthalate unit to a polyamide resin having a xylylene adipamide unit. Japanese Patent Application Laid-Open No. 201963/1987 (JP-62-201963A) discloses a polyester resin composition of which gas barrier property and transparency are improved by adding a metaxylylene group-containing polyamide resin and a compatibilizing agent to a thermoplastic polyester resin. Further, Japanese Patent Application Laid-Open No. 92667/1988 (JP-63-92667A) discloses a resin composition for stretch blow molding which comprises a polyester resin having an ethylene terephthalate unit, a metaxylylene group-containing polyamide resin, and a specific thermoplastic resin, and additionally a mica powder. In these literatures, moldability, gas barrier property or transparency of resins is improved, however, flame retardant thereof is insufficient.

Therefore, there has been proposed a method for imparting flame retardancy to a thermoplastic resin by adding a flame retardant comprising a halogen-containing compound or an antimony-containing compound to the resin. For example, Japanese Patent Application Laid-Open No. 150349/1988 (JP-63-150349A) discloses a resin composition to which flame retardancy is imparted by blending a glass fiber, an organic halogen-containing flame retardant, antimony trioxide, and a hydroxide of an alkali metal or alkaline earth metal to a mixed resin comprising a polyamide resin and a nylon 66. However, the halogen-containing flame retardant is not preferable for environmental reasons because the flame retardant sometimes generates a dioxin-series compound on resolution caused by combustion. Therefore, there is proposed a method for rendering a resin flame-retardant by using a phosphorus-containing or nitrogen-containing compound as a halogen-free flame retardant.

Japanese Patent Application Laid-Open No. 25506/1994 (JP-6-25506A) discloses a flame-retardant resin composition in which a phosphorus-containing compound is added to a thermoplastic resin composition containing a copolymer of an aromatic vinyl compound and a vinyl monomer, a graft copolymer with or using a rubber-like polymer, and a novolak resin. Japanese Patent Application Laid-Open No. 111059/1997 (JP-9-111059A) discloses a flame-retardant resin composition in which to a polyolefinic resin is blended a certain amount of a phenolic resin, a phosphorus-containing compound (red phosphorus) and an expansive graphite. Moreover, Japanese Patent Application Laid-Open No. 195283/1998 (JP-10-195283A) discloses a polyester resin composition to which flame retardancy is imparted with the combination use of a phosphoric ester having a specific structure and a suitable amount of specific compound(s) (a novolak phenol resin, and an oxide of iron, cobalt, nickel or copper). Japanese Patent Application Laid-Open No. 152402/1999 (JP-11-152402A) discloses a flame-retardant polyester resin composition which comprises a polybutylene terephthalate, a reinforcing component, and a flame retardant composed of an aromatic phosphate oligomer and a melamine pyrophosphate.

The halogen-free flame retardant does not comprise harmful halogens, however, it is inferior to a halogen-containing flame retardant in flame retardancy, so that it is necessary to add a large amount of the flame retardant. The addition of a large amount of the flame retardant brings about bleeding out (blooming) and deterioration in mechanical properties of a resin. Therefore, it is impossible to improve mechanical properties along with flame retardancy. For example, in the case using an expansive graphite in combination with the flame retardant, the resin significantly deteriorates its external appearance on molding. In particular, use of a phosphoric ester as a phosphorus-containing compound brings about bleeding out or deterioration in thermal stability of the resin, and causes considerable decline in physical property of the resin due to hydrolysis.

Thus, in conventional methods, it is difficult to render a resin high flame-retardant without deteriorating properties of the resin. Moreover, the above-mentioned flame retardant is capable of imparting flame-retardant to a specific resin, however, it is impossible to render a wide variety of thermoplastic resins flame-retardant.

It is therefore an object of the present invention to provide a halogen-free flame-retardant resin composition which is rendered flame-retardant to a satisfactory level with the use of a small amount of a flame retardant, and a process for producing the same.

It is another object of the present invention to provide a flame-retardant resin composition in which mold deposit and bleeding out (or blooming) of a flame retardant is effectively inhibited and to which high flame retardancy is imparted without deteriorating properties of the resin, and a process for producing the same.

It is still another object of the present invention to provide a flame-retardant resin composition in which hydrolysis is inhibited even in the case using a monomeric phosphoric ester or polymeric phosphoric ester as a flame retardant and which is rendered flame-retardant to a high level, and a process for producing the same.

It is a further object of the present invention to provide a shaped article having improved flame retardancy.

DISCLOSURE OF THE INVENTION

The inventor of the present invention made intensive studies to achieve the above objects and finally found that high flame-retardant is imparted to a thermoplastic resin by adding a specific halogen-free flame retardant and a stabilizer auxiliary. The present invention was accomplished based on the above finding.

That is, the flame-retardant resin compositi on of the present invention comprises a thermoplastic resin and a flame retardant, and the flame retardant comprises a phosphorus-containing compound (A), an aromatic resin (B), and at least one flame-retardant auxiliary (or flame-retardant synergist) (C) selected from the group consisting of a nitrogen-containing compound (C1) and a metal salt of an inorganic acid (C2). The resin composition further comprises at least one stabilizer auxiliary (D) selected from the group consisting of a compound having a functional group reactive to an active hydrogen atom (D1) and a water-repellent compound (D2). The thermoplastic resin comprises a polyester-series resin, a styrenic resin, a polyamide-series resin, a polycarbonate-series resin, a polyphenylene oxide-series resin, a vinyl-series resin, an olefinic resin, an acrylic resin, and others. The phosphorus-containing compound (A) may comprise a phosphoric ester, a phosphoric ester amide, a phosphonitrilic compound, an organic phosphorous acid compound, and an organic hypophosphorous acid compound, and others. The aromatic resin (B) may comprise a polyphenylene sulfide-series resin; a polyphenylene oxide-series resin; a polycarbonate-series resin; an aromatic nylon; a polyarylate-series resin; an aromatic epoxy resin; and a resin of which the main chain or side chain contains an aromatic ring having at least one group selected from a hydroxyl group and an amino group; and others. In particular, the aromatic resin (B) may comprise a polyphenylene sulfide-series resin, a polyphenylene oxide-series resin, and others.

The nitrogen-containing compound (C1) may comprises a nitrogen-containing cyclic compound having an amino group; a salt of a nitrogen-containing cyclic compound having an amino group with an oxygen acid; a salt of a nitrogen-containing cyclic compound having an amino group with an organic phosphoric acid; a salt of a nitrogen-containing cyclic compound having an amino group with a nitrogen-containing compound having a hydroxyl group; a polyphosphoric acid amide; a cyclic urea compound; and others. The metal salt of an inorganic acid (C2) may comprise a salt of an oxygen acid (e.g., a phosphoric acid, a boric acid, and a stannic acid) with a polyvalent metal, in particular a salt of a phosphoric acid with a polyvalent metal (e.g., calcium hydrogen phosphate).

The compound having a functional group reactive to an active hydrogen atom (D1) may comprise a compound having at least one functional group selected from the group consisting of a cyclic ether group [e.g., an epoxy group, an oxetane group (or ring)], an acid anhydride group, an isocyanate group, an oxazoline group, an oxazine group, and a carbodiimide group. The water-repellent compound (D2) may comprise a fluorine-containing oligomer, or a silicone-series resin.

The flame-retardant resin composition of the present invention may further comprise a hindered phenol-series antioxidant, a phosphorus-containing stabilizer, an inorganic stabilizer, a fluorine-containing resin, a filler, and others.

Moreover, the present invention also includes a process for producing a flame-retardant resin composition, which comprises mixing a thermoplastic resin, a flame retardant, and a stabilizer auxiliary, as well as a shaped article formed with the flame-retardant resin composition.

BEST MODE FOR CARRYING OUT THE INVENTION

The thermoplastic resin includes a variety of resins available for molding application, for example, a polyester-series resin, a styrenic resin, a polyamide-series resin, a polycarbonate-series resin, a polyphenylene oxide-series resin, a vinyl-series resin, an olefinic resin, and an acrylic resin.

(1) Polyester-series Resin

The polyester-series resin is a homopolyester or copolyester obtained by, for example, a polycondensation of a dicarboxylic acid component and a diol component, a polycondensation of a hydroxycarboxylic acid or a lactone or a polycondensation of these components. The preferred polyester-series resin usually includes a saturated polyester-series resin, in particular an aromatic saturated polyester-series resin.

The dicarboxylic acid component includes, for example, an aliphatic dicarboxylic acid (e.g., a dicarboxylic acid having about 4 to 40 carbon atoms such as succinic acid, glutaric acid, adipic acid, pimelic acid, suberic acid, azelaic acid, sebacic acid, undecanedicarboxylic acid, dodecanedicarboxylic acid, hexadecanedicarboxylic acid and dimeric acid, preferably a dicarboxylic acid having about 4 to 14 carbon atoms), an alicyclic dicarboxylic acid (e.g., a dicarboxylic acid having about 8 to 12 carbon atoms such as hexahydrophthalic acid, hexahydroisophthalic acid, hexahydroterephthalic acid, and himic acid), an aromatic dicarboxylic acid [e.g., a dicarboxylic acid having about 8 to 16 carbon atoms such as phthalic acid, isophthalic acid, terephthalic acid, a naphthalenedicarboxylic acid (such as 2,6-naphthalenedicarboxylic acid), 4,4'-diphenyldicarboxylic acid, 4,4'-diphenoxyetherdicarboxylic acid, bis(4-carboxyphenyl)ether, 4,4'-diphenylmethanedicarboxylic acid, and 4.4'-diphenylketonedicarboxylic acid], or a derivative thereof (e.g., a derivative, capable of producing an ester, such as a lower alkyl ester, an aryl ester, and an acid anhydride)). These dicarboxylic acid components may be used singly or in combination. Further, if necessary, the dicarboxylic acid component may be used in combination with a polyfunctional carboxylic acid such as trimellitic acid and pyromellitic acid.

The preferred dicarboxylic acid component includes an aromatic dicarboxylic acid such as terephthalic acid, isophthalic acid, and naphthalenedicarboxylic acid.

As the diol component, for example, there are mentioned an aliphatic alkylene glycol (e.g., an aliphatic glycol having about 2 to 12 carbon atoms such as ethylene glycol, trimethylene glycol, propylene glycol, 1,4-butanediol, 1,3-butanediol, neopentylglycol, hexanediol, octanediol and decanediol, preferably an aliphatic glycol having about 2 to 10 carbon atoms), a polyoxyalkylene glycol [e.g., a glycol having a plurality of oxyalkylene units of which the alkylene group has about 2 to 4 carbon atoms, for example, diethylene glycol, dipropylene glycol, ditetramethylene glycol, triethylene glycol, tripropylene glycol, a polytetramethylene glycol], an alicyclic diol (e.g., 1,4-cyclohexanediol, 1,4-cyclohexanedimethanol, hydrogenated bisphenol A), and others. Moreover, the diol component may be used in combination with an aromatic diol such as hydroquinone, resorcinol, biphenol, 2,2-bis(4-hydroxyphenyl)propane, 2,2-bis-(4-(2-hydroxyethoxy)phenyl)propane, and xylylene glycol. These diol components may be used singly or in combination.

Further, if necessary, the diol component may be used in combination with a polyol such as glycerin, trimethylolpropane, trimethylolethane and pentaerythritol.

The preferred diol component includes a $C_{2-6}$ alkylene glycol (e.g., a linear alkylene glycol such as ethylene glycol, trimethylene glycol, propylene glycol and 1,4-butanediol), a polyoxyalkylene glycol having a repeating oxyalkylene unit of about 2 to 4 [a glycol containing a poly(oxy-$C_{2-4}$alkylene) unit, such as diethylene glycol and a polytetramethylene glycol], and 1,4-cyclohexanedimethanol.

The hydroxycarboxylic acid includes, for example, a hydroxycarboxylic acid such as hydroxybenzoic acid, hydroxynaphthoic acid, hydroxyphenylacetic acid, glycolic acid and hydroxycaproic acid, or a derivative thereof.

Exemplified as the lactone is a $C_{3-12}$lactone such as propiolactone, butyrolactone, valerolactone, and caprolactone (e.g., ε-caprolactone), and others.

The preferred polyester-series resin includes a homopolyester or copolyester containing an alkylene arylate unit such as an alkylene terephthalate and an alkylene naphthalate as a main unit (e.g., about 50 to 100% by weight, preferably about 75 to 100% by weight) [for example, a homopolyester such as a polyalkylene terephthalate (e.g., a poly$C_{2-4}$alkylene terephthalate such as a poly(1,4-cyclohexanedimethylene terephthalate) (PCT), a polyethylene terephthalate (PET), a polypropylene terephthalate (PPT) and a polybutylene terephthalate (PBT)), a polyalkylene naphthalate (e.g., a poly$C_{2-4}$ alkylene naphthalate such as a polyethylene naphthalate and a polybutylene naphthalate); and a copolyester containing alkylene terephthalate and/or alkylene naphthalate unit(s) as a main unit (e.g., not less than 50% by weight)]. The particularly preferred polyester-series resin includes a polybutylene terephthalate-series resin containing a butylene terephthalate unit as a main unit (e.g., a polybutylene terephthalate, and a polybutylene terephthalate copolyester). Incidentally, these polyester-series resins may be used singly or in combination.

Moreover, in the copolyester, a copolymerizable monomer includes a $C_{2-6}$alkylene glycol (e.g., a linear alkylene glycol such as ethylene glycol, propylene glycol and 1,4-butanediol), a polyoxyalkylene glycol which has a repeating oxyalkylene unit of about 2 to 4 (e.g., a glycol comprising a poly(oxy-$C_{2-4}$alkylene) unit, such as diethylene glycol and a polytetramethylene glycol), a $C_{6-12}$aliphatic dicarboxylic acid (e.g., adipic acid, pimelic acid, suberic acid, azelaic acid, sebacic acid), an aromatic dicarboxylic acid (e.g., phthalic acid, isophthalic acid), an aromatic hydroxycarboxylic acid (e.g., hydroxybenzoic acid, hydroxynaphthoic acid), and others. Incidentally, the polyester-series resin mayhave not only a linear chain structure but also a branched chain structure, or crosslinked structure as far as melt-moldability thereof is not deteriorated. Moreover, the polyester-series resin may be a liquid crystalline polyester.

The polyester-series resin may be produced by a conventional manner, for example, transesterification, direct esterification.

(2) Styrenic Resin

As the styrenic resin, for example, there may be mentioned a homo- or copolymer of a styrenic monomer (e.g., styrene, vinyltoluene, α-methylstyrene); a copolymer of the styrenic monomer and a vinyl monomer [e.g., an unsaturated nitrile (such as acrylonitrile), an α,β-monoolefinic unsaturated carboxylic acid or acid anhydride or an ester thereof (such as a (meth)acrylic acid ester, (meth)acrylic acid, glycidyl (meth)acrylate and maleic anhydride)]; a styrenic graft copolymer; and a styrenic block copolymer.

The preferred styrenic resin includes a polystyrene [GPPS, SPS (syndiotactic polystyrene)], a styrene-methyl methacrylate copolymer, a styrene-(meth)acrylic acid copolymer, a styrene-glycidyl (meth)acrylate copolymer, a styrene-maleic anhydride copolymer, a styrene-acrylonitrile copolymer (AS resin), a high impact polystyrene (HIPS) in which a styrenic monomer is polymerized to a rubber component, and a polystyrenic graft or block copolymer. As the polystyrene-series graft copolymer, there may be mentioned a copolymer which is obtained by graft polymerization of at least a styrenic monomer and a copolymerizable monomer to a rubber component (for example, ABS resin which is obtained by graft polymerization of styrene and acrylonitrile to a polybutadiene, AAS resin which is obtained by graft polymerization of styrene and acrylonitrile to an acrylic rubber, ACS resin which is obtained by graft polymerization of styrene and acrylonitrile to a chlorinated polyethylene, a polymer which is obtained by graft polymerization of styrene and acrylonitrile to an ethylene-vinyl acetate copolymer, a polymer which is obtained by graft polymerization of styrene and acrylonitrile to an ethylene-propylene rubber, MBS resin which is obtained by graft polymerization of styrene and methyl methacrylate to a polybutadiene, a resin which is obtained by graft polymerization of styrene and acrylonitrile to a styrene-butadiene copolymer rubber). The block copolymer includes a copolymer comprising a polystyrenic block and a diene or olefinic block (e.g., a styrene-butadiene-styrene (SBS) block copolymer, a styrene-isoprene block copolymer, a styrene-isoprene-styrene (SIS) block copolymer, a hydrogenated styrene-butadiene-styrene (SEBS) block copolymer, a hydrogenated styrene-isoprene-styrene (SEPS) block copolymer), and others. These styrenic resins may be used singly or in combination.

(3) Polyamide-series Resin

The polyamide includes a polyamide derived from a diamine and a dicarboxylic acid; a polyamide obtained from an aminocarboxylic acid, and if necessary in combination with a diamine and/or a dicarboxylic acid; a polyamide derived from a lactam, and if necessary in combination with a diamine and/or a dicarboxylic acid. The polyamide also includes a copolyamide derived from at least two different kinds of polyamide constituent components.

As the diamine, there may be mentioned, for example, an aliphatic diamine such as trimethylenediamine, tetramethylenediamine, pentamethylenediamine, hexamethylenediamine, 2,2,4-trimethylhexamethylenediamine, 2,4,4-trimethylhexamethylenediamine, octamethylenediamine and nonamethylenediamine; and an alicyclic diamine such as bis(4-aminocyclohexyl)methane and bis(4-amino-3-methylcyclohexyl)methane. Moreover, the diamine may be used in combination with an aromatic diamine such as phenylenediamine and metaxylylenediamine. These diamines may be used singly or in combination.

Examples of the dicarboxylic acid are a $C_{4-20}$ aliphatic dicarboxylic acid such as glutaric acid, adipic acid, pimelic acid, suberic acid, azelaic acid, sebacic acid and octadecanoic diacid; a dimerized fatty acid (dimeric acid); an alicyclic dicarboxylic acid such as cyclohexane-1,4-dicarboxylic acid and cyclohexane-1,3-dicarboxylic acid; an aromatic dicarboxylic acid such as phthalic acid, phthalic anhydride, isophthalic acid, terephthalic acid and naphthalenedicarboxylic acid; and others.

As the aminocarboxylic acid, there may be mentioned, for example, a $C_{4-20}$aminocarboxylic acid such as aminoheptanoic acid, aminononanoic acid and aminoundecanoic acid. These aminocarboxylic acids may be also used singly or in combination.

As the lactam, for example, there may be mentioned a $C_{4-20}$lactam such as butyrolactam, pivalolactam, caprolactam, caprilactam, enantholactam, undecanolactam and dodecalactam. These lactams may be also used singly or in combination.

The polyamide-series resin includes an aliphatic polyamide (such as a nylon 46, a nylon 6, a nylon 66, a nylon 610, a nylon 612, a nylon 11 and a nylon 12), a polyamide obtainable from an aromatic dicarboxylic acid (e.g., terephthalic acid and/or isophthalic acid) and an aliphatic diamine (e.g., hexamethylenediamine, nonamethylenediamine), a polyamide obtainable from both aromatic and aliphatic dicarboxylic acids (e.g., both terephthalic acid and adipic acid), and an aliphatic diamine (e.g., hexamethylenediamine), and others. These polyamides may be used singly or in combination. The preferred polyamide includes a non-aromatic and aliphatic polyamide (e.g., a nylon 6, a nylon 66, a nylon 610, a nylon 612, a nylon 11, a nylon 12), a semiaromatic polyamide (e.g., a nylon MXD6, a nylon 9T), a copolymerized semiaromatic polyamide (e.g., a nylon 6T/6, a nylon 6T/66, a nylon 6T/12, a nylon 6I/6, a nylon 6I/66, a nylon 6T/6I, a nylon 6T/6I/6, a nylon 6T/6I/66, a nylon 6T/M5T), and others. These polyamide-series resins may be used singly or in combination.

(4) Polycarbonate-series Resin

The polycarbonate-series resin includes a polymer obtainable through the reaction of a dihydroxy compound with phosgene or a carbonic ester such as diphenyl carbonate. The dihydroxy compound may be an alicyclic compound, and is preferably a bisphenol compound.

The bisphenol compound includes a bis(hydroxyaryl)$C_{1-6}$ alkane such as bis(4-hydroxyphenyl)methane, 1,1-bis(4-hydroxyphenyl)propane, 2,2-bis(4-hydroxyphenyl)propane (bisphenol A), 2,2-bis(4-hydroxy-3-methylphenyl)propane, 2,2-bis(4-hydroxyphenyl)butane, 2,2-bis(4-hydroxyphenyl)-3-methylbutane, 2,2-bis(4-hydroxyphenyl)hexane, and 2,2-bis(4-hydroxyphenyl)-4-methylpentane; a bis(hydroxyaryl)$C_{4-10}$ocycloalkane such as 1,1-bis(4-hydroxyphenyl)cyclopentane and 1,1-bis(4-hydroxyphenyl) cyclohexane; 4,4'-dihydroxydiphenyl ether; 4,4,-dihydroxydiphenyl sulfone; 4,4'-dihydroxydiphenyl sulfide; 4,4'-dihydroxydiphenyl ketone; and others.

The preferred polycarbonate-series resin includes a bisphenol A-based polycarbonate. These polycarbonate-series resins may be used singly or in combination.

(5) Polyphenylene Oxide-series Resin

The polyphenylene oxide-series resin (polyphenylene ether-series resin) includes a homopolymer and a copolymer. As the homopolymer, there may be mentioned a poly (mono-, di- or tri$C_{1-6}$alkyl-phenylene) oxide such as a poly(2,6-dimethyl-1,4-phenylene) oxide, a poly(2,5-dimethyl-1,4-phenylene) oxide, a poly(2,5-diethyl-1,4-phenylene) oxide, a poly(2-methyl-6-ethyl-1,4-phenylene) oxide, a poly(2,6-di-n-propyl-1,4-phenylene) oxide, a poly(2-ethyl-6-isopropyl-1,4-phenylene) oxide, a poly(2-methyl-6-methoxy-1,4-phenylene) oxide, a poly(2-methyl-6-hydroxyethyl-1,4-phenylene) oxide, a poly(2,3,6-trimethyl-1,4-phenylene) oxide, a poly(2,6-diphenyl-1,4-phenylene) oxide, and a poly(2-methyl-6-phenyl-1,4-phenylene) oxide; a poly(mono- or di$C_{6-20}$aryl-phenylene) oxide; and a poly (mono$C_{1-6}$alkyl-mono$C_{6-20}$aryl-phenylene) oxide.

As the copolymer of a polyphenylene oxide, there may be mentioned: a copolymer having not less than two of monomer units constituting the above-mentioned homopolymers (e.g., a random copolymer having 2,6-dimethyl-1,4-phenylene oxide unit and 2,3,6-trimethyl-1,4-phenylene oxide unit); a modified polyphenylene oxide copolymer comprising an alkylphenol-modified benzene formaldehyde resin block which is obtainable by a reaction of an alkylphenol (such as cresol and p-tert-butylphenol) with a benzene formaldehyde resin (a condensation product of a benzene ring-containing compound and formaldehyde, such as a phenol resin) or alkylbenzene formaldehyde resin, and a polyphenylene oxide block as the main structure; a modified graft copolymer in which a styrenic polymer is grafted to a polyphenylene oxide or a copolymer thereof; and others. These polyphenylene oxide-series resins may be used singly or in combination.

(6) Vinyl-series Resin

The vinyl-series resin includes a homo- or copolymer of a vinyl-series monomer [e.g., a vinyl ester such as vinyl acetate, vinyl propionate, vinyl crotonate and vinyl benzoate; a chlorine-containing vinyl monomer (e.g., vinyl chloride, chloroprene); a fluorine-containing vinyl monomer (e.g., fluoroethylene); a vinyl ketone such as methyl vinyl ketone and methyl isopropenyl ketone; a vinyl ether such as vinyl methyl ether and vinyl isobutyl ether; and a vinyl amine such as N-vinylcarbazole and N-vinylpyrrolidone], or a copolymer of a vinyl-series monomer and other copolymerizable monomer.

A derivative of the above-mentioned vinyl-series resin (e.g., a polyvinyl alcohol, a polyvinyl acetal such as a polyvinyl formal and a polyvinyl butyral, an ethylene-vinyl acetate copolymer, an ethylene-vinyl alcohol copolymer) may be also used. These vinyl-series resins may be used singly or in combination.

(7) Olefinic Resin

The olefinic resin includes a homo- or copolymer of an olefin (e.g., an $\alpha$-$C_{1-6}$olefin such as ethylene, propylene, butene-1, hexene-1, decene-1, 4-methylbutene-1, and 4-methylpentene-1), a copolymer of such an olefin and a copolymerizable monomer [for example, an unsaturated carboxylic acid or an ester thereof (e.g., (meth)acrylic acid, a $C_{1-6}$alkyl ester of (meth)acrylic acid such as methyl (meth)acrylate and ethyl (meth)acrylate)], and the others. The copolymer includes a random copolymer, a block copolymer, and a graft copolymer.

The olefinic resin includes, for example, a polyethylene-series resin [e.g., a low-, middle-, or high-density polyethylene, a linear low-density polyethylene, an ethylene-propylene copolymer, an ethylene-butene-1 copolymer, an ethylene-propylene-butene-1 copolymer, and an ethylene-(4-methylpentene-1) copolymer], a polypropylene-series resin (e.g., a propylene-series resin containing propylene at a proportion of not less than 80% by weight, such as a polypropylene, a propylene-ethylene copolymer, a propylene-butene-1 copolymer, and a propylene-ethylene-butene-1 copolymer), and a poly(methylpentene-1) resin. As the copolymer, for example, there may be mentioned an ethylene-vinyl acetate copolymer, an ethylene-(meth)acrylic acid copolymer or an ionomer thereof, an ethylene-(meth)acrylate copolymer such as an ethylene-ethyl acrylate copolymer, and others.

Among these olefinic resins, a polyethylene-series resin (e.g., a polyethylene, an ethylene-ethyl acrylate copolymer) is preferred. These olefinic polymers may be used singly or in combination.

(8) Acrylic Resin

The acrylic resin includes, for example, a homo- or copolymer of a (meth)acrylic monomer (e.g., (meth)acrylic acid or an ester thereof), in addition a (meth)acrylic acid-styrene copolymer, a methyl (meth)acrylate-styrene copolymer, and others.

(9) Other Resins

As other resins, there may be exemplified a polyacetal resin, an aliphatic polyketone-series resin (ketone resin); a polysulfone [e.g., a thermoplastic polysulfone, a poly(ether sulfone), a poly(4,4'-bisphenol ether sulfone)]; a polyether ketone; a poly(ether ether ketone); a polyether imide; a thermoplastic polyurethane-series resin [e.g., a polymer obtainable from a reaction of a diisocyanate compound (such as tolylenediisocyanate) with the above-mentioned glycol and/or the above-mentioned diamine; and a polyurethane elastomer which may have a segment such as a polytetramethylene glycol]; a thermoplastic polyimide; a polyoxybenzylene; a thermoplastic elastomer; and the like.

These polymer compounds may be used singly or in combination.

The preferred thermoplastic resin includes a polyester-series resin which may be a liquid crystalline polyester, a styrenic resin, a polyamide-series resin, a polycarbonate-series resin, a polyphenylene oxide-series resin, and a vinyl-series resin, and more preferably includes a polyester-series resin, a polycarbonate-series resin, and a styrenic resin. In particular, a polyester-series resin (such as PBT-series resin and PET-series resin) is preferred. Such a polyester-series resin may be used in combination with a styrenic resin.

The number average molecular weight of the thermoplastic resin is not particularly limited to a specific one, and is suitably selected depending on a kind or application of resin. For example, the number average molecular weight may be selected within the range of about $5 \times 10^3$ to $200 \times 10^4$, preferably about $1 \times 10^4$ to $150 \times 10^4$, and more preferably about $1 \times 10^4$ to $100 \times 10^4$. Moreover, in the case where the thermoplastic resin is a polyester-series resin, the number average molecular weight may for example be about $5 \times 10^4$ to $100 \times 10^4$, preferably about $1 \times 10^4$ to $70 \times 10^4$, and more preferably about $1.2 \times 10^4$ to $30 \times 10^4$.

[Flame Retardant and Stabilizer Auxiliary]

In the present invention, the flame retardant comprises (A) a phosphorus-containing compound, (B) an aromatic compound and (C) a flame-retardant auxiliary (or flame-retardant synergist), and is used in combination with (D) a stabilizer auxiliary, thereby imparting high flame retardancy and hydrolysis resistance (or stability against hydrolysis) to a wide variety of thermoplastic resins without deteriorating properties thereof.

(A) Phosphorus-containing Compound

As the phosphorus-containing compound, there may be mentioned an organic phosphorus compound (e.g., a monomeric organic phosphorus compound, a polymeric organic phosphorus compound), an inorganic phosphorus compound, and others.

Among the organic phosphorus compounds, the monomeric organic phosphorus compound includes a phosphoric ester, a phosphoric ester amide, a phosphonitrile compound, an organic phosphorous acid compound (a phosphorous ester), an organic hypophosphorous acid compound, a phosphine oxide (e.g., triphenylphosphine oxide and tricresylphosphine oxide), and others.

(Phosphoric Ester)

As the phosphoric ester, there may be mentioned an aliphatic phosphoric ester [for example, a $triC_{1-10}alkyl$ phosphate such as trimethyl phosphate, triethyl phosphate, tripropyl phosphate, triisopropyl phosphate, tributyl phosphate, triisobutyl phosphate, and pentaerythritol phosphate [e.g., NH-1197 (manufactured by Great Lakes Chemical Corporation), a bicyclophosphoric ester described in Japanese Patent Application Laid-Open No. 106889/2001 (JP-2001-106889A)]; a $diC_{1-10}alkyl$ phosphate and $monoC_{1-10}alkyl$ phosphate corresponding to the above-mentioned phosphoric triester], an aromatic phosphoric ester [for example, a $triC_{6-20}aryl$ phosphate such as triphenyl phosphate, tricresyl phosphate, trixylyl phosphate, diphenyl cresyl phosphate, tri(isopropylphenyl) phosphate and diphenyl ethylcresyl phosphate], an aliphatic-aromatic phosphoric ester [e.g., methyl diphenyl phosphate, phenyl diethyl phosphate, a polyphenol (a cyclic alkylene glycol phosphate) [e.g., resorcinol bis(neopentylene glycol phosphate), hydroquinone bis(neopentylene glycol phosphate), biphenol bis(neopentylene glycol phosphate), bisphenol-A bis(neopentylene glycol phosphate)], a spiro ring-containing aromatic phosphoric ester (e.g., diphenyl pentaerythritol diphosphate, dicresyl pentaerythritol diphosphate, dixylyl pentaerythritol diphosphate)], and others.

(Phosphoric Ester Amide)

As the phosphoric ester amide (phosphoramide), there may be used a phosphoric ester amide including bond styles of a phosphoric ester and a phosphoric acid amide, and represented by the following formula (1):

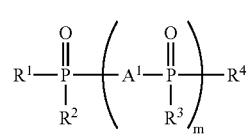

(1)

wherein $R^1$ to $R^4$ are the same or different, each representing —$OR^5$ ($R$ represents an alkyl group may have a substituent, a cycloalkyl group may have a substituent, or an aryl group may have a substituent), or —$NR^6R^7$ ($R^6$ and $R^7$ are the same or different, each representing a hydrogen atom, an alkyl group may have a substituent, a cycloalkyl group may have a substituent, or an aryl group may have a substituent, $R^1$ and $R^2$ may bind together to form a ring, $R^3$ and $R^4$ may bind together to form a ring, $R^6$ and $R^7$ may bind together to form a ring); $A^1$ represents a diamine residue or an arylenedioxy group; "m" denotes an integer of 0 to 20, provided that in the case where $R^1$ to $R^4$ are —$OR^5$ all together, $A^1$ is a diamine residue.

In the formula (1), as the alkyl group represented by $R^5$ to $R^7$, there may be mentioned a $C_{1-20}alkyl$ group (such as methyl, ethyl, butyl, t-butyl, hexyl, octyl, nonyl and dodecyl), preferably a $C_{1-12}alkyl$ group, and more preferably a $C_{1-6}alkyl$ group. The cycloalkyl group includes a $C_{5-20}cycloalkyl$ group such as cyclohexyl, preferably a $C_{6-12}cycloalkyl$ group. As the aryl group represented by $R^5$ to $R^7$, there may be mentioned a $C_{6-20}aryl$ group (e.g., phenyl, naphthyl), a substituted aryl group (e.g., an alkyl-substituted aryl group such as methylphenyl group and ethylphenyl group, a hydroxyphenyl group). Moreover, $R^6$ and $R^7$ may bind to each other to form a ring (e.g., a 4- to 10-membered heterocycle comprising an adjacent nitrogen atom as a hetero atom thereof). Incidentally, these groups may have a substituent (e.g., a $C_{1-4}$alkyl group, particularly a $C_{1-3}$alkyl group; and a hydroxyl group).

As the group —$OR^5$, there may be mentioned a univalent organic group, for example, a phenyloxy group which may have a substituent (e.g., a $C_{1-3}$alkyl group), such as phenyloxy, and a mono-, di- or tri$C_{1-4}$alkylphenyloxy (e.g., tolyloxy, xylyloxy, trimethylphenyloxy, and diethylphenyloxy).

As the group —$NR^6R^7$, there may be mentioned a univalent amino group, for example, a mono- or di$C_{1-4}$ alkylamino group such as methylamino group and dibutylamino group; a mono- or di$C_{4-12}$cycloalkyl-substituted amino group such as cyclohexylamino group; a mono- or di$C_{6-20}$arylamino group such as phenylamino group; a $C_{1-4}$alkyl $C_{6-20}$arylamino group such as methylphenylamino group; a 4- to 10-membered heterocycle (preferably 5- to 8-membered heterocycle) comprising at least one nitrogen atom as a hetero atom thereof, e.g., pyrrolidino, 2-methylpyrrolidino, piperidino, 2-methylpiperidino (pipecolino), 3-methylpiperidino, 4-methylpiperidino and piperazino; and others.

Moreover, adjacent groups $R^1$ and $R^2$ may bond to each other to form a ring, or adjacent groups $R^3$ and $R^4$ may bond to each other to form a ring. For example, $R^1$ and $R^2$ or $R^3$ and $R^4$ may bond together to form an alkylenedioxy group (e.g., a $C_{2-10}$alkylenedioxy such as methylenedioxy, dimethylenedioxy, trimethylenedioxy, 2,2-dimethyl-1,3-trimethylenedioxy, 2-ethyl-2-methyl-1,3-trimethylenedioxy, and 2,2-diethyl-1,3-trimethylenedioxy).

In the formula (1), $A^1$ may be a bivalent group represented by the following formula (2) or (3):

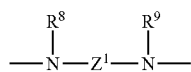  (2)

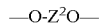  (3)

wherein $R^8$ and $R^9$ are the same or different, each representing a hydrogen atom, an alkyl group, a cycloalkyl group, or $R^8$ and $R^9$ may bind to each other to form a ring; $Z^1$ represents an alkylene group, a cycloalkylene group, or a bifunctional (bivalent) aromatic group; $Z^2$ represents a bifunctional aromatic group.

The alkyl group and the cycloalkyl group represented by $R^8$ and $R^9$ include the above-mentioned alkyl group (e.g., a $C_{1-6}$alkyl group such as methyl and ethyl) and the above-mentioned cycloalkyl group (e.g., a $C_{4-10}$ cycloalkyl group such as cyclohexyl), respectively. Moreover, $R^8$ and $R^9$ may bond to each other to form a $C_{1-6}$alkylene group such as ethylene, propylene, tetramethylene and hexamethylene.

As the alkylene group represented by $Z^1$, there may be mentioned a $C_{1-6}$alkylene group such as methylene, ethylene, propylene, tetramethylene and hexamethylene, preferably a $C_{1-4}$alkylene group. As the cycloalkylene group, there may be mentioned a $C_{4-20}$cycloalkylene group such as cyclohexylene, preferably a $C_{6-12}$cycloalkylene group. The bifunctional aromatic group represented by $Z^1$ and $Z^2$ may be an arylene group [e.g., a $C_{6-20}$arylene group such as a phenylene group (1,3- or 1,4-phenylene group) and a naphthylene group], a group having a plurality of the above-mentioned arylene groups [a bisphenol residue (a group which is removed hydroxyl groups from a bisphenol compound), or a biphenylene group], and others. The bisphenol of the bisphenol residue includes, for example, a bis(hydroxydiaryl)alkane [e.g., a bis(hydroxyaryl) $C_{1-6}$alkane such as bisphenol A, bisphenol D, bisphenol AD, 2,2-bis(3,5-dimethyl-4-hydroxyphenyl)propane, 1,1-bis(4-hydroxyphenyl)butane, bisphenol F, 2,2'-dihydroxydiphenylmethane, and 2,2'-diethyl-4,4'-dihydroxydiphenylmethane], a bis($C_{1-4}$alkyl-substituted hydroxyaryl)alkane [e.g., bis(3-methyl-4-hydroxyphenyl)methane, bis(3-methyl-4-hydroxyphenyl)propane, bis(3,5-dimethyl-4-hydroxyphenyl)methane, or bis(3,5-dimethyl-4-hydroxyphenyl)propane], a bis(hydroxydiaryl)cycloalkane [e.g., a bis(hydroxyaryl)$C_{3-12}$cycloalkane such as 1,1-bis(4-hydroxyphenyl)cyclohexane], a bis(hydroxyaryl)carboxylic acid [e.g., a bis(hydroxyaryl) $C_{2-6}$carboxylic acid such as bis-4,4-(hydroxyphenyl)butanoic acid], a bis(hydroxyarylalkyl)benzene [e.g., 1,4-bis(4-hydroxyphenylisopropyl)benzene], a bis(hydroxydiaryl) sulfone [e.g., bis(4-hydroxyphenyl) sulfone, bis(3,5-dimethyl-4-hydroxyphenyl) sulfone], a bis(hydroxyaryl) ether [e.g., bis(4-hydroxyphenyl) ether, bis(3,5-dimethyl-4-hydroxyphenyl) ether, 4,4'-dihydroxydiphenyl ether], a bis(hydroxyaryl) ketone [e.g., 4,4'-dihydroxybenzophenone, 3,3',5,5'-tetramethyl-4,4'-dihydroxybenzophenone], a bis(hydroxyaryl) sulfide [e.g., bis(4-hydroxyphenyl) sulfide, bis(3-methyl-4-hydroxyphenyl) sulfide], a bis(hydroxyaryl) sulfoxide [e.g., bis(4-hydroxyphenyl) sulfoxide], a dihydroxydiphenyl [e.g., 4,4'-dihydroxybiphenyl, 2,2'-biphenol], a di(hydroxyphenyl) thioether [e.g., bis(4-hydroxyphenyl) thioether], a terpenediphenol [e.g., 1,4-di($C_{1-4}$alkyl-substituted hydroxyphenyl)-p-menthane], and others.

The diamine residue represented by $A^1$ includes a residue of a diamine [for example, a $C_{2-4}$alkylenediamine (such as ethylenediamine, diethylenediamine and N,N-dimethylethylenediamine); a piperazine (such as 1,3-piperazine, 1,4-piperazine and 2-methyl-1,4-piperazine); a $C_{4-8}$cycloalkyldiamine (such as 1,4-cyclohexanediamine); a phenylenediamine (such as 1,4-phenylenediamine); a toluenediamine (such as 2,4-diaminotoluene and 3,5-diethyl-2,4-diaminotoluene); a xylylenediamine (such as 1,4-xylylenediamine); a diaminodiphenylmethane (such as 4,4'-diaminodiphenylmethane, 2,2'-diethyl-4,4'-diaminodiphenylmethane and 3,3'-diethyl-4,4'-diaminodiphenylmethane); a diaminodiphenyl ether (such as 4,4'-diaminodiphenyl ether and 2,2'-dimethyl-4,4'-diaminodiphenyl ether); a diaminodiphenyl sulfone (such as 4,4'-diaminodiphenyl sulfone and 3,3-dimethyl-4,4'-diaminodiphenyl sulfone); and a diaminodiphenyl sulfide (such as 4,4'-diaminodiphenyl sulfide)].

Moreover, as the arylenedioxy group represented by $A^1$, there may be mentioned a phenylenedioxy group (such as a hydroquinone residue and resorcinol residue), a residue of a bisphenol (for example, a bisphenol exemplified in the paragraph on the above $Z^1$ and $Z^2$, e.g., a dihydroxydiarylalkane, a dihydroxydiaryl ether, a dihydroxydiaryl sulfide and a dihydroxydiaryl sulfone).

The preferred phosphoric ester amide includes a compound in which "m" is 0 or 1 in the formula (1), particularly "m" is 1. A compound in which "m" is 1 in the formula (1) is represented by the following formula (4):

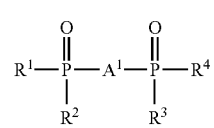  (4)

wherein $R^1$ to $R^4$ and $A^1$ have the same meanings as defined above.

As the phosphoric ester amide, there may be mentioned, for example, a $C_{2-6}$alkylenediaminediyl tetraarylphosphate (e.g., one in which the aryl groups is phenyl, cresyl, xylyl, or the like, suchasapiperazinediyl tetraaryl phosphate, an ethylenediaminediyl tetra$C_{6-10}$ arylphosphate and an N,N'-dimethylethylenediamediyl tetra$C_{6-10}$arylphosphate); a $C_{6-10}$arylenediaminediyl tetra$C_{6-10}$arylphosphate which may have a substituent (for example, one in which the arylene group is o-phenylene, m-phenylene, p-phenylene or the like, and the aryl group is phenyl, cresyl, xylyl or the like, such as phenylenediaminediyl tetraphenylphosphate, resorcinol triphenylphosphate diphenylamide and hydroquinone triphenylphosphate diphenylamide); a $C_{8-12}$ aralkylenediaminediyl tetra$C_{6-10}$arylphosphate which may have a substituent (for example, one in which the aralkylene group is o-xylylene, m-xylylene, p-xylylene or the like, and the aryl group is phenyl, cresyl, xylyl or the like, such as a xylylenediaminediyl tetraarylphosphate); a bisphenol phosphate di$C_{1-6}$alkylamide (such as bisphenol A triphenylphosphate dibutylamide); a bisphenol phosphate $C_{6-10}$arylamide (such as bisphenol A triphenylphosphate diphenylamide); a diphenylphosphate di$C_{1-6}$alkylamide (such as diphenylphosphate dibutylamide); a diphenylphosphate $C_{6-10}$arylamide (such as diphenylphosphate methylphenylamide and diphenylphosphate diphenylamide); and a piperidinodi$C_{6-10}$ arylphosphate and pipecolinodi$C_{6-10}$ arylphosphate, in which the aryl groups are phenyl, cresyl, xylyl or the like. These phosphoric ester amides may be used singly or in combination.

A process for producing the phosphoric ester amide is not particularly limited to a specific one, and may be referred to Japanese Patent Application Laid-Open No. 226547/2002 (JP-2002-226547A), Japanese Patent Application Laid-Open No. 354684/2001 (JP-2001-354684A), Japanese Patent Application Laid-Open No. 327834/2000 (JP-2000-327834A), Japanese Patent Application Laid-Open No. 154277/2000 (JP-2000-154277A), Japanese Patent Application Laid-Open No. 175985/1998 (JP-10-175985A), Journal of Chem. Soc. C, 3614 (1971), Japanese Patent Application Laid-Open No. 59888/1996 (JP-8-59888A), Japanese Patent Application Laid-Open No. 235363/1988 (JP-63-235363A), or Japanese Patent Application Laid-Open No. 19919/1979 (JP-54-19919A). For example, the phosphoric ester amide can be obtained by, in the presence of an amine catalyst or a metal chloride, the following process: (1) a process which comprises allowing an oxyhalogenated phosphorus to react with a phenol, then to react with an amine; (2) a process which comprises allowing an oxyhalogenated phosphorus to react with an amine, then to react with a phenol; (3) a process which comprises allowing a phenyl ester of a dihalophosphoric acid to react with an amine; (4) a process which comprises allowing a diphenyl ester of a halophosphoric acid to react with an amine; or (5) a process which comprises allowing a diphenyl phosphate to react with an amine.

The preferred phosphoric ester amide includes compounds described in the above-mentioned patent applications, condensed phosphoric ester amides having high molecular weight. As such a phosphoric ester amide, for example, there may be mentioned an N-(diaryloxyphosphinyl)-substituted alkyleneamine [e.g., N,N'-bis(diphenoxyphosphinyl)piperazine, N,N'-bis(ditolyloxyphosphinyl)piperazine, N,N'-bis(dixylyloxyphosphinyl)piperazine, N,N'-bis(di- or trimethylphenyloxyphosphinyl)piperazine]; a bis to tetrakis[(diaryloxyphosphinyl)amino]-substituted aromatic compound [e.g., 1,3- or 1,4-bis[(diphenoxyphosphinyl)amino]benzene, 1,3- or 1,4-bis[(ditolyloxyphosphinyl) amino]benzene, 1,3- or 1,4-bis[(dixylyloxyphosphinyl) aminolbenzene, 1,3- or 1,4-bis[(di- or trimethylphenyloxyphosphinyl)amino]benzene, 1,3- or 1,4-bis[(diphenoxyphosphinyl)aminomethyl]benzene, 1,3- or 1,4-bis[(ditolyloxyphosphinyl)aminomethyl]benzene, 1,3- or 1,4-bis[(dixylyloxyphosphinyl)aminomethyl]benzene, 1,3- or 1,4-bis[(di- or trimethylphenyloxyphosphinyl)aminomethyl]benzene]; an N-(cyclic alkylenedioxyphosphinyl)-substituted alkyleneamine [e.g., N,N'-bis(neopentylenedioxyphosphinyl)piperazine]; a bis to tetrakis[(cyclic alkylenedioxyphosphinyl)amino]-substituted aromatic compound [e.g., 1,3- or 1,4-bis[(neopentylenedioxyphosphinyl) amino]benzene, 1,3- or 1,4-bis[(neopentylenedioxyphosphinyl)aminomethyl]benzene]; an N-(cyclic arylenedioxyphosphinyl)-substituted alkyleneamine [e.g., N,N'-bis(phenylene-1,2-dioxyphosphinyl)piperazine, 1,3- or 1,4-bis[(biphenylene-2,2'-dioxyphosphinyl)aminomethyl]piperazine]; a bis to tetrakis[(cyclic arylenedioxyphosphinyl)amino]-substituted aromatic compound {e.g., 1,3- or 1,4-bis[(phenylene-1,2-dioxyphosphinyl)amino]benzene, 1,3- or 1,4-bis[(biphenylene-2,2'-dioxyphosphinyl)aminomethyl]benzene}, and a 3,9-bis(N-substituted amino)-2,4,8,10-tetraoxa-3,9-diphosphaspiro[5.5]-undecane-3,9-dioxide [e.g., a spiro ring-containing phosphoric ester amide of which the N-substituted amino group is a dialkylamino group (e.g., diethylamino group), a cyclic amino group (e.g., piperidino group, pipecolino group, dimethylpiperidino group, morpholino group), an arylamino group (e.g., phenylamino group), or an alkylarylamino group (e.g., methylphenylamino group)].

The phosphoric ester amide is commercially available as trade name "PHOSPHORIC ESTER AMIDE FLAME RETARDANT SP SERIES (e.g., SP-601,SP-670, SP-703, SP-720)" (manufactured by Shikoku Chemicals Corp.).

(Phosphonitrilic Compound)

As the phosphonitrilic compound (or phosphonitrile compound), there may be used a compound having a repeating unit represented by the following formula (5). The phosphonitrilic compound may be either of a linear compound and a cyclic compound.

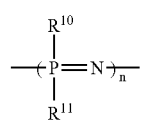

(5)

Wherein $R^{10}$ and $R^{11}$ are the same or different, each representing a halogen atom, an alkyl group, an aryl group, an aralkyl group, a substituted oxy group, a substituted amino group, or a thiocyanato group, and "n" denotes an integer of not less than 3.

As the alkyl group and the aryl group represented by the $R^{10}$ and $R^{11}$, there may be mentioned the alkyl group (particularly a $C_{1-4}$alkyl group) and the aryl group (particularly a $C_{6-10}$aryl group) which are exemplified in the item on the $R^5$ of the formula (1). The aralkyl group includes a $C_{6-14}$aryl-$C_{1-6}$alkyl group such as benzyl group and phenethyl group (particularly a $C_{6-10}$aryl-$C_{1-4}$alkyl group). The substituted hydroxy group includes an alkoxy group such as methoxy group (e.g., a $C_{1-4}$alkoxy group), an aryloxy group such as phenoxy group, tolyloxy group, and xylyloxy group (e.g., a $C_{6-10}$aryloxy group which may have a substituent such as an alkyl group), and a $C_{6-10}$aryl-$C_{1-4}$alkyloxy group. The substituted amino group includes an amino group having the above-mentioned alkyl group, aryl group and the like as substituent(s), particularly a di-substituted amino group (e.g., a $diC_{1-4}$alkylamino group such as dimethylamino group; a $diC_{6-10}$arylamino group such as diphenylamino group; and a $C_{1-4}$alkyl$C_{6-10}$arylamino group such as methylphenylamino group).

Moreover, the phosphonitrilic compound also includes a branched or crosslinked derivative modified with a polyhydric phenol [for example, a polyhydroxyphenol such as hydroquinone, resorcinol, and phloroglucinol; biphenol, a bisphenol (e.g., bisphenol A)], e.g., a phenoxyphosphazene modified with the above-mentioned polyhydric phenol.

The number "n" may be preferably an integer of about 3 to 100, and more preferably an integer of about 3 to 50. In particular, when the phosphonitrilic compound is a cyclic compound, the number "n" may be an integer of about 3 to 30 (e.g., about 3 to 20), preferably an integer of about 3 to 10.

(Organic Phosphorous Acid Compound)

The organic phosphorous acid (or phosphonic acid) compound includes a variety of phosphorous esters, for example, an aromatic phosphorous ester (e.g., a $triC_{6-20}$ aryl phosphite in which aryl groups are phenyl, cresyl, xylyl group, or other group), an aliphatic phosphorous ester (e.g., a $triC_{1-10}$alkyl phosphite in which alkyl groups are the alkyl group exemplified in the paragraph on the above-mentioned $R^5$ to $R^7$; a di- or mono$C_{1-10}$alkyl phosphite corresponding to the above-mentioned trialkyl phosphite), an organic phosphorous ester [for example, a $diC_{1-6}$alkyl ester of a $C_{1-6}$alkylphosphorous acid of which the alkyl group is the above-exemplified alkyl group (an ester of a spiro ring-containing alkylphosphorous acid such as pentaerythritol bis(methylphosphonate), pentaerythritol bis(ethylphosphonate), pentaerythritol bis(propylphosphonate), and pentaerythritol bis(butylphosphonate)); a diester of an alkylphosphorous acid such as a $diC_{6-10}$aryl ester of a $C_{1-6}$alkylphosphorous acid and a $C_{1-6}$alkyl$C_{6-10}$aryl ester of a $C_{1-6}$alkylphosphorous acid, of which the alkyl group is the above-exemplified alkyl group and an aryl group is phenyl, cresyl, xylyl or other groups; a diester of $C_{6-10}$aryl-phosphorous acid corresponding to the above-mentioned diester of an alkylphosphorous acid (e.g., an ester of a spiro ring-containig arylphosphorous acid such as pentaerythritol bis(phenylphosphonate) and pentaerythritol bis(tolylphosphonate)); a $C_{6-10}$arylphosphorous monoester (e.g., 10-hydroxy-9,10-dihydro-9-oxa-10-phosphaphenanthrene-10-oxide); a phosphonocarboxylate (a phosphonocarboxylic triester such as a $C_{1-4}$alkoxycarbonyloxy$C_{1-4}$alkylphosphorous diester corresponding to the above-mentioned alkylphosphorous diester, e.g., dimethyl methoxycarbonylmethylphosphonate)]. Moreover, the organic phosphorous acid compound also includes a metal salt (for example, a Ca, Mg, Zn, Ba, or Al salt) of a phosphorous acid, phosphorous monoester, or phosphonocarboxylic acid, each of which may have substituent(s) such as an alkyl group or an aryl group (e.g., an alkylphosphorous acid, a monoalkyl alkylphosphite, a monoaryl alkylphosphite, an arylphosphorous acid, a monoalkyl arylphosphite, a monoaryl arylphosphite). For example, the details about representative compounds of such a metal salt of an organic phosphorous acid may be referred to Japanese Patent Application Laid-Open No. 22866/1988 (JP-63-22866A), Japanese Patent Application Laid-Open No. 226891/1989 (JP-1-226891A), Japanese Patent Application Laid-Open No. 234893/1992 (JP-4-234893A), Japanese Patent Application Laid-Open No. 245659/1996 (JP-8-245659A), and Japanese Patent Application Laid-Open No. 272759/1997 (JP-9-272759A).

(Organic Hypophosphorous Acid Compound)

The organic hypophosphorous acid compound includes a hypophosphorous ester which may be substituted (mono- or disubstituted) with an alkyl group(s) such as a $C_{1-4}$alkyl group or an aryl group(s) such as a $C_{6-10}$aryl group (e.g., a $C_{1-6}$alkyl hypophosphite such as methyl hypophosphite, a $C_{6-10}$aryl hypophosphite such as phenyl hypophosphite, and a cyclic hypophosphorous ester such as 9,10-dihydro-9-oxa-10-phosphaphenanthrene-10-oxide and a 10-$C_{1-30}$alkyl or $C_{6-20}$aryl-substituted-9,10-dihydro-9-oxa-10-phosphaphenanthrene-10-oxide). Moreover, the organic hypophosphorous acid compound also includes a metal salt (e.g., a Ca, Mg, Zn, Ba, or Al salt) of a hypophosphorous acid which may have a substituent such as an alkyl group or an aryl group [for example, dimethylhypophosphorous acid, diethylhypophosphorous acid, dibutylhypophosphorous acid, methylethylhypophosphorous acid, ethylbutylhypophosphorous acid, ethanebis(methylhypophosphorous acid), 1-hydroxy-dihydrophospholeoxide, 1-hydroxyphosphoraneoxide], an ester of a phosphinicocarboxylic acid which may have a substituent such as an alkyl group or an aryl group (e.g., an ester of 3-methylphosphinicopropionic acid, an ester of 3-phenylphosphinicopropionic acid), and a homo- or copolymer thereof.

(Polymeric Organic Phosphorus Compound)

As the polymeric organic phosphorus compound, there may be used a condensate (or condensation product) of a monomeric organic phosphorus compound. The condensate may have a structural unit represented by the following formula (6):

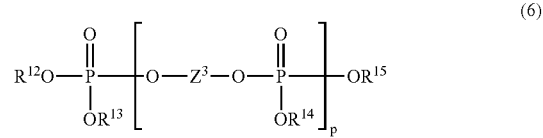

(6)

wherein $R^{12}$ to $R^{15}$ represent an aryl group which may have a substituent, $Z^3$ represents a bifunctional aromatic group, and "p" denotes an integer of not less than 1.

In the formula (6), the aryl groups represented by the $R^{12}$ to $R^{15}$ include a $C_{6-20}$aryl group and a substituted aryl group exemplified in the paragraph on the above-mentioned $R^5$ to $R^7$ of the formula (1). Moreover, the bifunctional aromatic group represented by $Z^3$ includes a $C_{6-20}$arylene group, a biphenylene group and a bisphenol residue exemplified in the item on the above-mentioned $Z^1$ and $Z^2$, and others.

The condensate represented by the formula (6) (in particular, an ester of a condensed phosphoric acid) includes, for example, a resorcinol phosphate [e.g., a condensate of resorcinol and phenyl phosphate such as resorcinol bis(diphenyl phosphate), a condensate of resorcinol and cresyl phosphate such as resorcinol bis(dicresyl phosphate), a condensate of resorcinol and xylenyl phosphate such as resorcinol bis(dixylenyl phosphate)], a hydroquinone phosphate (e.g., a condensate of hydroquinone and phenyl phosphate, a condensate of hydroquinone and cresyl phosphate, a condensate of hydroquinone and xylenyl phosphate), a biphenol phosphate (e.g., a condensate of biphenol and phenyl phosphate, a condensate of biphenol and cresyl phosphate, a condensate of biphenol and xylenyl phosphate), a bisphenol phosphate (e.g., a condensate of bisphenol A and phenyl phosphate, a condensate of bisphenol A and cresyl phosphate, a condensate of bisphenol A and xylenyl phosphate), and others.

For example, the condensate may be obtained by allowing an aromatic dihydroxy compound (e.g., resorcinol, hydroquinone, a bisphenol compound) and an oxyhalogenated phosphorus (e.g., phosphoryl chloride) to condense, and esterifying the condensed product with a hydroxyaryl compound (e.g., phenol, cresol, xylenol, naphthol).

In the formula (6), "p" is an integer of not less than 1 (e.g., about 1 to 100), preferably about 1 to 50, and more preferably about 1 to 30.

Moreover, the polymeric organic phosphorus-containing compound may be a phosphoric ester of a polymer having a hydroxyl group (such as a phenolic resin). Such a phosphoric ester of a polymer includes, for example, a polymer having a structural unit represented by the following formula (7):

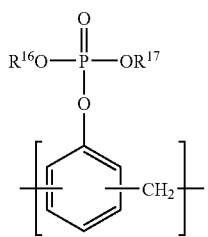

wherein $R^{16}$ and $R^{17}$ represent an aryl group.

The aryl group includes the above-exemplified aryl group (a $C_{6-20}$aryl group, in particular phenyl group) and a substituted aryl group (an alkyl-substituted aryl group).

Further, the polymeric organic phosphorus-containing compound also includes a polyphosphinicocarboxylic ester and a polyphosphorous acid amide. As the polyphosphorous acid amide, for example, there may be mentioned a polymer having a structural unit represented by the following formula (8):

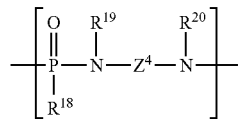

wherein $Z^4$ represents an alkylene group, an arylene group, or an aralkylene group, $R^{18}$ represents an alkyl group, a cycloalkyl group, an aryl group, or an aralkyl group, and $R^9$ and $R^{20}$ are the same or different, each representing ahydrogen atom, an alkyl group, oran aryl group. Moreover, $R^{19}$ and $R^{20}$ may directly bond to each other to form a ring.

As the alkylene group and arylene group represented by $Z^4$, there may be mentioned the alkylene group and arylene group exemplified in the paragraph on the above-mentioned $Z^1$ and $Z^2$, in addition a biphenyl, and a bisphenol residue [e.g., a residue of the bis (hydroxyaryl)alkane exemplified in the paragraph on the above-mentioned $Z^1$ and $Z^2$]. As the aralkylene group, there may be mentioned a group in which the alkylene group and the arylene group are connected to each other (particularly, a $C_{1-4}$alkylene-$C_{6-10}$arylene group), and others. The $R^{19}$ and $R^{20}$ may bond to each other to form the alkylene group exemplified in the paragraph on the above-mentioned $R^8$ and $R^9$.

(Inorganic Phosphorus Compound)

The inorganic phosphorus compound includes, for example, a red phosphorus, a (poly)phosphate [e.g., a salt of a non-condensed phosphoric acid or condensed phosphoric acid with an inorganic base (such as ammonium phosphate, ammonium polyphosphate)].

The redphosphorus has high flame-retarding effect, and can impart flame retardancy to a resin at a small amount of addition. Moreover, since the red phosphorus exerts such an effect at a small amount of addition, the red phosphorus imparts flame retardancy to a resin without deteriorating resin properties (e.g., mechanical and electrical properties). As the red phosphorus, usually, a red phosphorus which has undergone stabilization treatment, that is, a stabilized red phosphorus, is preferably employed. Particularly preferred are a red phosphorus which is obtained by being finely dividing without pulverization and formation of the pulverized surface highly reactive to water or oxygen, and a red phosphorus the surface of which is coated with one member or a combination of two or more members selected from resins (e.g., thermosetting resins, thermoplastic resins), metals, metal compounds (e.g., metal hydroxides, metal oxides).

Exemplified as the thermosetting resin for coating the surface of the red phosphorus are a phenolic resin, amelamine-series resin, aurea-based resin, an alkyd resin, an unsaturated polyester-series resin, an epoxy resin, and a silicone-series resin, and examples of the thermoplastic resin are a polyester-series resin, a polyamide-series resin, an acrylic resin, an olefinic resin, and others. Examples of the metal hydroxide are aluminum hydroxide, magnesium hydroxide, calcium hydroxide, zinc hydroxide, and titanium hydroxide. Examples of the metal oxide are aluminum oxide, magnesium oxide, zinc oxide, titanium oxide, zirconium oxide, copper oxide, iron oxide, molybdenum oxide, tungsten oxide, manganese oxide, and tin oxide.

Further, a process for coating with a metal the surface of the red phosphorus for stabilization includes, for example, a coating process with a metal (e.g., iron, nickel, copper, aluminum, zinc, manganese, tin, titanium, zirconium) or an alloy thereof through electroless plating. Other processes for coating the surface of red phosphorus include a process in which red phosphorus is treated with a solution of a metal salt (e.g., a salt with aluminum, magnesium, zinc, titanium, copper, silver, iron, nickel) to form a metal phosphorus compound on the red phosphorus surface for stabilization of the red phosphorus.

In particular, with the use of a process comprising pulverizing the red phosphorus without forming a crushed surface thereon, the red phosphorus may be subjected to coating treatment with a plurality of layers being a combination of a layer(s) of a metal component(s) (e.g., metal hydroxide, metal oxide) and a resin layer(s), particularly with a metal component layer covered by a plurality of resin layers. Such stabilized red phosphorus is excellent in heat stability and hydrolysis resistance and the amount of a phosphine produced upon decomposition in the presence of moisture or under high temperatures is so extremely small that they are preferable from the viewpoint of safety in the course of producing the resin composition of the present invention and a shaped article molded therefrom.

Such stabilized red phosphorus can be prepared referring to Japanese Patent Application Laid-Open No. 229806/1993 (JP-5-229806A), Japanese Patent Application Laid-Open No. 259956/1991 (JP-3-259956A), Japanese Patent Application Laid-Open No. 209991/1990 (JP-2-209991A), Japanese Patent Application Laid-Open No. 150309/1989 (JP-1-150309A), Japanese Patent Application Laid-Open No. 21704/1987 (JP-62-21704A), Japanese Patent Application Laid-Open No. 125489/1977 (JP-52-125489A), EP 296501A1,and EP249723A2.

As the red phosphorus, a stabilized one in the form of particles may be usually employed. The mean particle size of the stabilized red phosphorus is, for example, about 0.01 to 100 μm, preferably about 0.1 to 70 μm, and more preferably about 0.1 to 50 μm.

The preferred phosphorus-containing compound includes a phosphoric ester (e.g., an aliphatic phosphoric ester, an aromatic phosphoric ester and a condensed phosphoric ester, particularly a condensed phosphoric ester), a phosphoric acid ester amide, a phosphonitrile compound, an organic phosphorous acid compound, an organic hypophosphorous acid compound, an inorganic phosphorus compound (such as a salt of a (poly)phosphoric acid), and others. In particular, a monomeric or oligomeric phosphoric ester (e.g., an oligomeric phosphoric ester) is preferred.

(B) Aromatic Resin

The aromatic resin includes a polyphenylene sulfide-series resin, a polyphenylene oxide-series resin, a polycarbonate-series resin, a polyarylate-series resin, an aromatic nylon, an aromatic epoxy resin, a novolak resin, an aralkyl resin, and an aromatic vinyl resin. As the polyphenylene oxide-series resin and the polycarbonate-series resin, there may be used the same resin as exemplified in the paragraph on the above-mentioned thermoplastic resin. As the aromatic resin, an aromatic resin different in species from the thermoplastic resin is usually employed.

(Polyphenylene Sulfide-series Resin)

The polyphenylene sulfide-series resin (polyphenylene thioether-series resin) includes a homopolymer or copolymer having a polyphenylene sulfide backbone, —(Ar—S—)— (wherein Ar represents a phenylene group). As the phenylene group (—Ar—), there may be mentioned, for example, p-phenylene group, m-phenylene group, o-phenylene group, a substituted phenylene group (e.g., an alkyl phenylene group having substituent(s) such as a $C_{1-5}$alkyl-group, an arylphenylene group having substituent(s) such as phenyl group), p,p'-diphenylenesulfone group, p,p'-biphenylene group, p,p'-diphenylene ether group, and p,p'-diphenylenecarbonyl group. The polyphenylene sulfide-series resin may be a homopolymer obtained from a homogeneous repeating unit among the phenylene sulfide groups comprising such a phenylene group, or in view of workability of the composition, may be a copolymer containing a heterogeneous repeating unit among the phenylene sulfide groups comprising such a phenylene group.

As the homopolymer, a substantially linear polymer comprising p-phenylene sulfide group as a repeating unit is preferably used. The copolymer may be obtained from two or more different kinds of phenylene sulfide groups among the phenylene sulfide groups. Among others, a copolymer comprising p-phenylene sulfide group as a main repeating unit in combination with m-phenylene sulfide group is preferred. From the viewpoint of physical properties such as heat resistance, moldability, and mechanical property, a substantially linear copolymer comprising not less than 60 mol % (preferably 70 mol %) of p-phenylene sulfide group is particularly preferred.

The polyphenylene sulfide resin may be a polymer obtained by allowing a relative low molecular weight of a linear polymer to crosslink with oxidation or heating for increasing the melt viscosity of the polymer thereby improving molding processability (mold-processability), or a high molecular weight polymer having a substantially linear structure which polymer is obtained by condensation polymerization from a monomer mainly comprising a bifunctional monomer. From the viewpoint of physical properties of the resultant shaped article, a polymer having a substantially linear structure, which is obtained by condensation polymerization is more preferred. Moreover, as the polyphenylene sulfide resin, in addition to the above-mentioned polymer, a branched or crosslinked polyphenylene sulfide resin obtained by a polymerization of the monomer in combination with a monomer having not less than three of functional groups, or a resin composition obtained by blending the resin to the above-mentioned linear polymer may be also used.

As the polyphenylene sulfide-series resin, there may be used a polyphenylene sulfide or a polybiphenylene sulfide (PBPS), in addition a polyphenylene sulfide ketone (PPSK), a polybiphenylene sulfide sulfone (PPSS), or others. These polyphenylene sulfide-series resins may be used singly or in combination.

The number average molecular weight of the polyphenylene sulfide-series resin is, for example, about 300 to $30\times10^4$, preferably about 400 to $10\times10^4$, and more preferably about 500 to $5\times10^4$.

(Aromatic Nylon)

As the aromatic nylon constituting the flame retardant, a resin different in kind from the polyamide resin of the thermoplastic resin is used. As such a resin, there may be used a compound having a unit represented by the following formula (9):

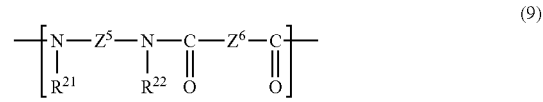

(9)

wherein $Z^5$ and $Z^6$ are the same or different, each selecting from an aliphatic hydrocarbon group, an alicyclic hydrocarbon group, and an aromatic hydrocarbon group, and at least one of $Z^5$ and $Z^6$ is an aromatic hydrocarbon group; $R^{21}$ and $R^{22}$ are the same or different, each selecting from a hydrogen group, an alkyl group, and an aryl group; and $R^{21}$ and $R^{22}$ may be connected directly with each other to form a ring.

Such an aromatic nylon includes a polyamide derived from a diamine and a dicarboxylic acid, in which at least one component of the diamine component and the dicarboxylic acid component is an aromatic compound; and a polyamide obtained from an aromatic aminocarboxylic acid, and if necessary a diamine and/or a dicarboxylic acid in combination. The aromatic nylon also includes a copolyamide derived from at least two different kinds of polyamide constituent components.

The diamine includes, for example, an aromatic diamine, for example, phenylenediamine, diaminotoluene, 2,4-diaminomesitylene, 3,5-diethyl-2,6-diaminotoluene, xylylenediamine (in particular, metaxylylenediamine, paraxylylenediamine), bis(2-aminoethyl)benzene, biphenylenediamine, a diamine having a biphenyl backbone (e.g., 4,4'-diamino-3,3'-ethylbiphenyl), a diamine having adiphenylalkane backbone [e.g., diaminodiphenylmethane, bis(4-amino-3-ethylphenyl)methane, bis(4-amino-3-methylphenyl)methane, 3,3'-dichloro-4,4'-diaminodiphenylmethane, 2,2'-bis(4-aminophenyl)propane], bis(4-aminophenyl)ketone, bis(4-aminophenyl)sulfone, or 1,4-naphthalenediamine, and an N-substituted aromatic diamine thereof. Moreover, the aromatic diamine may be used in combination with an alicyclic diamine such as 1,3-cyclopentanediamine, 1,4-cyclohexanediamine, and bis(4-amino-3-methylcyclohexyl)methane; an aliphatic amine, such as trimethylenediamine, tetramethylenediamine, pentamethylenediamine, hexamethylenediamine, 2,2,4-trimethylhexamethylenediamine, 2,4,4-trimethylhexamethylenediamine, and octamethylenediamine, and an N-substituted aliphatic diamine thereof; or others. These diamines may be used singly or in combination. As the diamine, it is preferred to use an aromatic diamine (in particular xylylenediamine, N,N'-dialkyl substituted xylylenediamine).

The dicarboxylic acid includes, for example, a $C_{2-20}$ aliphatic dicarboxylic acid such as oxalic acid, malonic acid, succinic acid, glutaric acid, adipic acid, pimelic acid, suberic acid, azelaic acid, sebacic acid, undecanedicarboxylic acid, dodecanedicarboxylic acid, hexadecanedicarboxylic acid, and octadecanedicarboxylic acid; an aromatic dicarboxylic acid such as phthalic acid, phthalic anhydride, isophthalic acid, terephthalic acid, or naphthalenedicarboxylic acid; an alicyclic dicarboxylic acid such as cyclohexane-1,4-dicarboxylic acid and cyclohexane-1,3-dicarboxylic acid; a dimerized fatty acid (e.g., dimeric acid); or others. These dicarboxylic acids may be used singly or in combination. As the dicarboxylic acid, it is preferred to use an aliphatic dicarboxylic acid (in particular a $C_{6-20}$ aliphatic dicarboxylic acid such as adipic acid).

As the aromatic or alicyclic aminocarboxylic acid, there may be exemplified phenylalanine, tyrosine, anthranilic acid, aminobenzoic acid, or the like. These aminocarboxylic acids may be also used singly or in combination.

Moreover, as the aromatic nylon, a condensate of a lactam and/or an α,ω-aminocarboxylic acid may be used insofar as characteristics as a flame retardant is not deteriorated. The lactam includes a $C_{3-12}$ actam such as propiolactam, butyrolactam, valerolactam, and caprolactam (e.g., ε-caprolactam), and others. The α,ω-aminocarboxylic acid includes 7-aminoheptanoic acid, 10-aminodecanoic acid, and others.

The accessory ingredient of other aromatic nylon includes a monobasic acid (for example, acetic acid, propionic acid, caproic acid, nicotinic acid), a monoamine (for example, ethylamine, butylamine, benzylamine), a dibasic acid (for example, adipic acid, sebacic acid, terephthalic acid, isophthalic acid, cinchomeronic acid), a diamine (for example, tetramethylenediamine, hexamethylenediamine), a lactam or others, and at least one member selected therefrom may be used as a viscosity adjustment (or viscosity controller).

The aromatic nylon includes a polyamide in which the diamine component is an aromatic compound (for example, a polyamide or copolyamide comprising xylylenediamine as a diamine component), preferably a polyamide obtained from an aromatic diamine and an α,ω-$C_{2-12}$ dicarboxylic acid [for example, a polyamide obtained from adipic acid and metaxylylenediamine (MXD6), a polyamide obtained from suberic acid and metaxylylenediamine, a polyamide obtained from adipic acid and paraxylylenediamine (PMD6), a polyamide obtained from suberic acid and paraxylylenediamine, a polyamide obtained from adipic acid and N,N'-dimethylmetaxylylenediamine, a polyamide obtained from suberic acid and N,N'-dimethylmetaxylylenediamine, a polyamide obtained from adipic acid and 1,3-phenylenediamine, a polyamide obtained from adipic acid and 4,4'-diaminodiphenylmethane, a copolyamide obtained from adipic acid, metaxylylenediamine and paraxylylenediamine, and a copolyamide obtained from adipic acid, metaxylylenediamine and N,N'-dimethylmetaxylylenediamine]. The particularly preferred aromatic nylon includes a polyamide obtained from an aromatic diamine (in particular xylylenediamine) and an α,ω-$C_{2-12}$ aliphatic dicarboxylic acid, especially MXD6. These polyamides may be used singly or in combination.

The aromatic nylon is prepared by a direct method under atmospheric pressure or a melt polymerization based on, for example, Japanese Patent Publication No. 22510/1969 (JP-44-22510B), Japanese Patent Publication No. 51480/1972 (JP-47-51480B), Japanese Patent Application Laid-Open No. 200420/1982 (JP-57-200420A), Japanese Patent Application Laid-Open No. 111829/1983 (JP-58-111829A), Japanese Patent Application Laid-Open No. 283179/1987 (JP-62-283179A), Kogyokagaku Zasshi (Journal of the Chemical Society of Japan, Industrial Chemistry) Vol. 74, No. 4, page 786 (1971), Kogyokagaku Zasshi (Journal of the Chemical Society of Japan, Industrial Chemistry) Vol. 74, No. 10, page 2185 (1971), Engineering Plastic Jiten (Engineering Plastic Dictionary) page 74 (Gihodo Shuppan Co., Ltd., 1998), and references described in these documents.

The number average molecular weight of the aromatic nylon is not particularly limited to a specific one, and for example may be selected from the range of about 300 to $10 \times 10^4$, and preferably about 500 to $5 \times 10^4$.

(Polyarylate-series Resin)

As the polyarylate-series resin, there may be employed a compound having a structural unit represented by the following formula (9):

[—O—Ar—OC(O)-A$^2$-C(O)—]  (9)

wherein Ar stands for an aromatic group and $A^2$ stands for an aromatic, alicyclic, or aliphatic group.

Such a polyarylate-series resin may be produced by a fusion polymerization method, a solution polymerization method, or an interfacial polymerization method with utilizing, as a way of polyesterification, a transesterification method (e.g., acetate method, phenyl ester method), an acid chloride method, a direct method, or an addition polymerization method.

The polyarylate-series resin may be obtained through a reaction of an aromatic polyol component with a polycarboxylic acid component (e.g., an aromatic polycarboxylic acid component, an aliphatic polycarboxylic acid component, an alicyclic polycarboxylic acid component). The polycarboxylic acid component usually contains at least an aromatic polycarboxylic acid component.

Usually employed as the aromatic polyol (monomer) is a diol such as a monocyclic aromatic diol and a polycyclic aromatic diol, or a reactive derivative thereof [e.g., a salt (e.g., sodium salt, potassium salt) of an aromatic polyol, an ester of an aromatic polyol (e.g., an ester of acetic acid), a silyl-protected aromatic polyol (e.g., trimethylsilylated aromatic polyol)].

Exemplified as the monocyclic aromatic diol is an diol having an aromatic ring of about 6 to 20 carbon atoms, such as a benzenediol (e.g., resorcinol, hydroquinone, m-xylene glycol, p-xylene glycol) and a naphthalenediol.

As the polycyclic aromatic diol, there may be mentioned, a bis (hydroxyaryl) (a bisphenol), for example, 4,4'-dihydroxybiphenyl, 2,2'-biphenol, a dihydroxydiarylalkane exemplified in the paragraph on the above-mentioned $Z^1$ and $Z^2$, in addition a bis(hydroxyaryl)$C_{1-6}$alkane such as bisphenol F; a bis(hydroxyaryl)cycloalkene [for example, a bis (hydroxyaryl) $C_{3-12}$cycloalkane such as bis(hydroxyphenyl)

cyclohexane]; a bis(hydroxyaryl)carboxylic acid [for example, a bis(hydroxyaryl)$C_{2-6}$carboxylic acid such as bis-4,4-(hydroxyphenyl)butanoic acid]; and others. Moreover, other polycyclic aromatic diols also include compounds having a bis(hydroxyaryl) backbone, such as di(hydroxyphenyl) ether, di(hydroxyphenyl) ketone and di(hydroxyphenyl) sulfoxide exemplified in the paragraph on the above-mentioned $Z^1$ and $Z^2$, and di(hydroxyphenyl) thioether, a bis($C_{1-4}$alkyl-substituted hydroxyphenyl)alkane [e.g., bis(3-methyl-4-hydroxyphenyl)methane, bis(3-methyl-4-hydroxyphenyl)propane, bis(3,5-dimethyl-4-hydroxyphenyl)methane, bis(3,5-dimethyl-4-hydroxyphenyl)propane] and a terpene diphenol (e.g., 1,4-di($C_{1-4}$alkyl-substitutedhydroxyphenyl)-p-menthane).

These aromatic polyols may be used singly or in combination.

The preferred aromatic polyol includes a benzenediol and a bisphenol, for example, hydroquinone, resorcinol, a bis(hydroxyaryl)$C_{1-6}$alkane (e.g., bisphenol A, bisphenol F, bisphenol AD), biphenol, or others.

Incidentally, the aromatic polyol may be used together with an aliphatic or alicyclic polyol. Examples of the aliphatic polyol are a $C_{1-10}$aliphatic polyol such as ethylene glycol, propylene glycol, butanediol, pentanediol, hexanediol and neopentyl glycol. Moreover, examples of the aliphatic polyol also include an aliphatic polyol having a $C_{3-10}$aliphatic ring, such as 1,4-cyclohexanedimethanol. As the alicyclic polyol, there may be mentioned, for example, a $C_{3-10}$alicyclic polyol such as cyclohexanediol.

Exemplified as the aromatic polycarboxylic acid are a dicarboxylic acid such as a monocyclic aromatic dicarboxylic acid and a polycyclic aromatic dicarboxylic acid, or a reactive derivative thereof [for example, an aromatic polycarboxylic acid halide (e.g., an aromatic polycarboxylic acid chloride), an aromatic polycarboxylic ester (e.g., an alkyl ester, an aryl ester), and an aromatic polycarboxylic acid anhydride].

Examples of the monocyclic aromatic dicarboxylic acid are an aromatic carboxylic acid exemplified in the paragraph on the aromatic nylon (an aryldicarboxylic acid having 8 to 20 carbon atoms, e.g., a benzenedicarboxylic acid and a naphthalenedicarboxylic acid). Incidentally, the benzenedicarboxylic acid and naphthalenedicarboxylic acid (particularly, benzenedicarboxylic acid) may have one or two $C_{1-4}$alkyl group(s) as a substituent.

Examples of the polycyclic aromatic dicarboxylic acid are a bis(arylcarboxylic acid), for example, biphenyldicarboxylic acid, a bis(carboxyaryl)$C_{1-6}$alkane such as bis(carboxyphenyl)methane; a bis(carboxyaryl) $C_{3-12}$cycloalkane such as bis (carboxyphenyl) cyclohexane; a bis (carboxyaryl) ketone such as bis(carboxyphenyl) ketone; a bis(carboxyaryl) sulfoxide such as bis(carboxyphenyl) sulfoxide; a bis(carboxyaryl) ether such as bis(carboxyphenyl) ether; and a bis(carboxyaryl) thioether such as bis(carboxyphenyl) thioether.

The preferred aromatic polycarboxylic acid component includes a monocyclic aromatic dicarboxylic acid (particularly, a benzenedicarboxylic acid such as phthalic acid, isophthalic acid and terephthalic acid), a bis(carboxyaryl) $C_{1-6}$alkane, and others.

The aliphatic polycarboxylic acid (monomer) includes an aliphatic dicarboxylic acid exemplified in the paragraph on the aromatic nylon (in particular a $C_{2-20}$ aliphatic dicarboxylic acid), and may be a dicarboxylic acid having a $C_{3-10}$aliphatic ring, such as dicarboxymethylcyclohexane. The alicyclic polycarboxylic acid includes an alicyclic dicarboxylic acid exemplified in the paragraph on the aromatic nylon (in particular a $C_{3-20}$alicyclic dicarboxylic acid).

Preferred as the polyarylate-series resin are, for example, a polyarylate resin wherein the aromatic polyol is a bisphenol, such as a polyester of a bisphenol (e.g., bisphenol A, bisphenol AD, bisphenol F) with a benzenedicarboxylic acid (e.g., isophthalic acid, terephthalic acid), and a polyester of the bisphenol with a bis(arylcarboxylic acid) [e.g., a bis (carboxyaryl) $C_{1-4}$alkane such as bis(carboxyphenyl)methane, bis (carboxyphenyl) ethane and bis (carboxyphenyl) propane]. These polyarylate-series resins may be used singly or in combination.

Moreover, the pdlyarylate-series resin may be a resin using, if necessary an aromatic triol, an aromatic tetraol [e.g., 1,1,2,2-tetrakis(hydroxyphenyl)ethane], an aromatic tricarboxylic acid, or an aromatic tetracarboxylic acid, in addition to an aromatic diol and an aromatic dicarboxylic acid.

The terminal (or end) of the polyarylate-series resin may be blocked with (bonded to) an alcohol, or a carboxylic acid (particularly, a monohydric alcohol, a monofunctional carboxylic acid). Examples of the monohydric alcohol for blocking the terminal of the polyarylate-series resin are a monohydric aryl alcohol (e.g., a monohydric phenol which may be substituted with a $C_{1-10}$alkyl group and/or a $C_{6-10}$aryl group, for example, phenol, an alkylphenol having one or two $C_{1-4}$alkyl group(s) (such as methyl group) at o-, m- or p-position; an arylphenol having phenyl, benzyl or cumyl group at o-, m- or p-position), a monohydric alkyl alcohol (e.g., a $C_{1-20}$alkyl monoalcohol such as methanol, ethanol, propanol, butanol, hexanol and stearyl alcohol), a monohydric aralkyl alcohol (e.g., a $C_{7-20}$aralkyl monoalcohol such as benzyl alcohol and phenethyl alcohol), and others.

Examples of the monofunctional carboxylic acid for blocking the terminal of the polyarylate-series resin include a monofunctional aliphatic carboxylic acid (a $C_{1-20}$ aliphatic monocarboxylic acid such as acetic acid, propionic acid and octanoic acid), a monofunctional alicyclic carboxylic acid (e.g., a $C_{4-20}$ alicyclic monocarboxylic acid such as cyclohexanecarboxylic acid) and a monofunctional aromatic carboxylic acid (a $C_{7-20}$ aromatic monocarboxylic acid such as benzoic acid, toluic acid, o-, m-, or p-tert-butylbenzoic acid and p-methoxyphenylacetic acid). The carboxylic acid may be a monofunctional aliphatic carboxylic acid substituted with an aromatic group such as phenylacetic acid (particularly, a $C_{1-10}$aliphatic monocarboxylic acid substituted with a $C_{6-20}$ aromatic group).

Moreover, the polyarylate-series resin may constitute a polymer alloy with a resin other than the polyarylate-series resin, such as a polymer alloy with a polyamide or the like. The polymer alloy includes not only a simple mixture but also a transesterified polymer alloy or a polymer alloy containing a compatibilizing agent.

The number average molecular weight of the polyarylate-series resin is, for example, about 300 to $30\times10^4$ preferably about 500 to $10\times10^4$, and more preferably about 500 to $5\times10^4$.

(Aromatic Epoxy Resin)

Examples of the aromatic epoxy resin include an ether-series epoxy resin (e.g., a bisphenol-based epoxy resin, a novolak epoxy resin) and an amine-series epoxy resin formed with an aromatic amine component.

Examples of the bisphenol constituting a bisphenol-based epoxy resin are similar to the bis(hydroxyaryl) listed above. The preferred bisphenol-based epoxy resin includes a glycidyl ether of a bis(hydroxyaryl)$C_{1-6}$alkane, particularly bisphenol A, bisphenol AD, bisphenol F or the like. Moreover, examples of the bisphenol-based epoxy resin also include the above-mentioned bisphenol glycidyl ether of high molecular weight (that is, a phenoxy resin).

Examples of the novolak resin constituting a novolak epoxy resin include a novolak resin in which an alkyl group (e.g., a $C_{1-20}$alkyl group, preferably a $C_{1-4}$alkyl group such as methyl group and ethyl group) may be substituted on the aromatic ring (e.g., a phenol-novolak resin, a cresol-novolak resin). The preferred novolak epoxy resin includes a glycidyl ether of a novolak resin which may be substituted with a $C_{1-2}$alkyl group.

Examples of the aromatic amine component constituting an amine-series epoxy resin are a monocyclic aromatic amine (e.g., aniline, toluidine), a monocyclic aromatic diamine (e.g., diaminobenzene, xylylenediamine), a monocyclic aromatic aminoalcohol (e.g., aminohydroxybenzene), a polycyclic aromatic diamine (e.g., diaminodiphenylmethane), and a polycyclic aromatic amine.

The number average molecular weight of the aromatic epoxy resin is, for example, about 200 to 50,000, preferably about 300 to 10,000, and more preferably about 400 to 6,000 (e.g., about 400 to 5,000). Moreover, the number average molecular weight of the phenoxy resin is, for example, about 500 to 50,000, preferably 1,000 to 40,000, and more preferably about 3,000 to 35,000.

The aromatic epoxy resin may be used in a cured state, and the curing is effected by the use of a curing agent, e.g., an amine-series curing agent (e.g., an aliphatic amine such as ethylenediamine; an aromatic amine such as metaphenylenediamine and xylylenediamine), a polyaminoamide-series curing agent, an acid and acid anhydride-series curing agent.

These resin components may be used singly or in combination.

(Resin Containing Aromatic Ring having at Least One Group Selected from the Group Consisting of Hydroxyl Group and Amino Group)

The resin containing an aromatic ring having at least one group selected from the group consisting of a hydroxyl group and an amino group includes a resin of which the main chain or side chain contains the aromatic ring. Among these resins, as the resin of which the main chain contains the aromatic ring, for example, there may be mentioned a novolak resin and aralkyl resin. As the resin of which the side chain contains the aromatic ring, there may be mentioned an aromatic vinyl resin.

(1) Novolak Resin

The novolak resin has a repeating unit represented by the following formula (10):

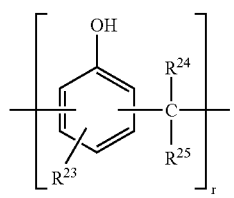

(10)

wherein $R^{23}$ to $R^{25}$ are the same or different, each representing a hydrogen atom, an alkyl group, or an aryl group, "r" denotes an integer of not less than 1.

The alkyl group and the aryl group includes a $C_{1-20}$alkyl group (particularly a $C_{1-12}$alkyl group), a $C_{6-20}$aryl group and a substituted aryl group (particularly a $C_{1-4}$alkyl-substituted aryl group) exemplified in the item on the $R^5$ to $R^7$.

The novolak resin (particularly a random novolak resin) is usually obtainable by a reaction of a phenol with an aldehyde. As the phenol, for example, there may be mentioned phenol, p- or m-cresol, 3,5-xylenol, an alkyl phenol (e.g., a $C_{1-20}$alkyl phenol such as t-butyl phenol, p-octyl phenol, and nonyl phenol), an aryl phenol (e.g., phenyl phenol, benzyl phenol, cumyl phenol), and others. These phenols may be used singly or in combination.

The aldehyde includes, for example, an aliphatic aldehyde such as formaldehyde, acetaldehyde and propionaldehyde, and an aromatic aldehyde such as phenylacetaldehyde. The preferred aldehyde includes formaldehyde. Moreover, a condensate of formaldehyde such as trioxane and paraformaldehyde may be also used. The ratio of the phenol relative to the aldehyde (the former/the latter) is about 1/0.5 to 1/1 (molar ratio).

The condensation reaction of the phenol with the aldehyde is usually carried out in the presence of an acid catalyst. As the acid catalyst, for example, there may be mentioned an inorganic catalyst (e.g., hydrochloric acid, sulfuric acid, phosphoric acid), and an organic catalyst (e.g., p-toluenesulfonic acid, oxalic acid).

In particular, a phenol novolak resin having decreased content of a monomer or dimer of a phenol is preferred. Such a phenol novolak resin is, for example, available as trade name "SUMILITE RESIN PR-53647", "SUMILITE RESIN PR-NMD-100 series", or "SUMILITE RESIN PR-NMD-200 series" from Sumitomo Durez Co., Ltd.

Moreover, as the novolak resin, a high-orthonovolak resin having an ortho/para ratio of not less than 1 may be used.

Incidentally, there may be also used a co-condensate of the above-mentioned phenol with a co-condensable component such as a dioxybenzene, a naphthol, a bisphenol (e.g., the bisphenol exemplified in the item on the $Z^1$ and $Z^2$), an alkylbenzene (e.g., toluene, ethylbenzene, xylene, mesitylene), an aniline, a furfural, a urea or a triazine (e.g., urea, cyanuric acid, isocyanuric acid, melamine, guanamine, acetoguanamine, benzoguanamine), a terpene, a cashew nut, a rosin. In particular, an aminotriazine novolak resin modified with a triazine is a preferred co-condensate. Such an aminotriazine novolak may be obtained by condensation of a phenol, a triazine and a formaldehyde in the presence or absence of an basic catalyst (e.g., ammonia, triethylamine, triethanolamine) and/or an acid catalyst (e.g., oxalic acid) [for example, DIC Technical Review No. 3, p47 (1997), Japanese Patent Application Laid-Open No. 253557/1996 (JP-8-253557A), Japanese Patent Application Laid-Open No. 279657/1998 (JP-10-279657A)]. An aminotriazine novolak is available from Dainippon Ink And Chemicals, Inc. as trade name "PHENOLITE".

Moreover, a modified novolak resin (e.g., a phosphoric acid-modified novolak resin or a boric acid-modified novolak resin) may be also employed, and the resin is a novolak resin (random novolak resin, high-ortho novolak resin) in which phenolic hydroxyl groups are partially or wholly modified with at least one compound selected from phosphorus-containing compounds (e.g., a phosphoric acid such as phosphoric acid, phosphorous acid, an organic phosphorous acid and an organic hypophosphorous acid, and an acid anhydride, halide, salt or ester (in particular, an aliphatic ester) thereof) and boron-containing compounds (e.g., a boric acid such as boric acid, an organic boronic acid and an organic borinic acid, and an acid anhydride, halide, salt or ester thereof). The hydroxyl group in the novolak resin is usually modified to a phosphoric ester or a boric ester.

Further, a modified novolak resin being a novolak resin (random novolak resin and high-ortho novolak resin) in which the hydrogen atom of the phenolic hydroxyl group is partially or wholly modified (or substituted) with a metal ion, a silyl group, an organic group (e.g., an alkyl group, an alkanoyl group, a benzoyl group) is also available.

Preferred as the novolak resins are, for example, phenol-formaldehyde novolak resin, an alkylphenol-formaldehyde resin (e.g., a t-butylphenol-formaldehyde novolak resin, a p-octylphenol-formaldehyde resin), a co-condensate thereof (an aminotriazine-novolak resin), and a mixture thereof.

There is no particular restriction as to the number average molecular weight of the novolak resin (random novolak resin and high-ortho novolak resin), and it may be selected within the range of 300 to $5 \times 10^4$, preferably 300 to $1 \times 10^4$, and more preferably 300 to 8,000 (e.g., particularly, 300 to 5,000).

(2) Aralkyl Resin

The aralkyl resin has a structural unit represented by the following formula (11):

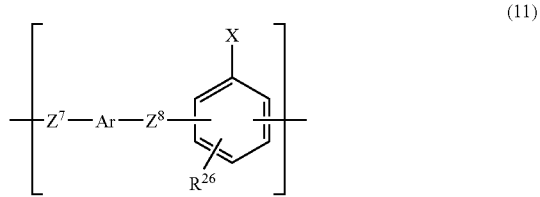

(11)

wherein Ar represents an aromatic group, $Z^7$ and $Z^8$ are the same or different, each representing an alkylene group, $R^{26}$ represents a hydrogen atom or an alkyl group, and X represents a hydroxyl group, an amino group, or an N-substituted amino group.

The aromatic group represented by Ar includes an aromatic group having 6 to 20 carbon atoms, for example, a phenylene group (e.g., o-phenylene group, m-phenylene group, p-phenylene group), and naphthylene group, preferably a phenylene group (in particular p-phenylene group).

The alkylene group represented by $Z^7$ and $Z^8$ includes the alkylene group exemplified in the item on the $Z^1$ and $Z^2$ (a $C_{1-4}$alkylene group, particularly a $C_{1-2}$alkylene group). The alkyl group represented by $R^{26}$ includes a $C_{1-20}$alkyl group exemplified in the item on the $R^5$ to $R^7$ (in particular a $C_{1-4}$alkyl group).

The N-substituted amino group represented by X includes a mono- or di$C_{1-4}$alkylamino group, for example, dimethylamino group and diethylamino group.

In many cases, a phenol aralkyl resin having a hydroxyl group as X is used as an aralkyl resin. The preferred phenol aralkyl resin includes a resin having methylene groups as $Z^7$ and $Z^8$, a phenylene group as Ar, a hydrogen atom as $R^{26}$, and a p-xylene-substituted phenol represented by the following formula (12) as a repeating unit.

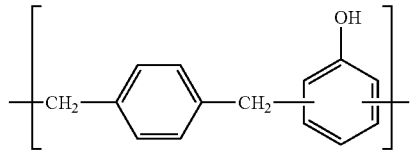

(12)

The aralkyl resin may be usually obtained by reacting a compound represented by the formula (13) with a phenol or an aniline. A phenolalkyl resin is formed through the use of a phenol, and an anilinearalkyl resin is formed through the use of an aniline.

$Y-Z^7-Ar-Z^8-Y$    (13)

In the formula, Y represents an alkoxy group, an acyloxy group, a hydroxyl group, or a halogen atom, and Ar, $Z^7$ and $Z^8$ have the same meanings as defined above.

In the formula (14), an alkoxy group represented by Y includes a $C_{1-4}$ alkoxy group such as methoxy, ethoxy, propoxy and butoxy group. Examples of the acyloxy group include an acyloxy group having about 2 to 5 carbon atoms, such as acetoxy group. Moreover, examples of the halogen atom include chlorine, bromine, and iodine atom.

The compound represented by the formula (13), for example, includes an aralkyl ether such as a xylylene glycol $C_{1-4}$alkyl ether (e.g., p-xylylene glycol dimethyl ether, p-xylylene glycol diethyl ether), an acyloxyaralkyl such as p-xylylene-α,α'-diacetate, an aralkyldiol such as p-xylylene-α,α'-diol, an aralkyl halide such as p-xylylene-α,α'-dichloride and p-xylylene-α,α'-dibromide.

The phenol includes a phenol and an alkylphenol exemplified in the section on the novolak resin. These phenols may be used either singly or in combination.

Examples of the aniline are aniline, an alkylaniline (e.g., a $C_{1-20}$alkylaniline such as toluidine, xylidine, octylaniline and nonylaniline), and an N-alkylaniline (e.g., an N-$C_{1-4}$alkylaniline such as N,N-dimethylaniline and N,N-diethylaniline). These anilines may be used either singly or in combination.

The ratio of the compound represented by the formula (13) relative to the phenol or aniline (the former/the latter) is, for example, about 1/1 to 1/3 (molar ratio), preferably about 1/1 to 1/2.5 (molar ratio).

The reaction of the compound represented by the formula (13) with the phenol or the aniline may be carried out in the presence or absence of a catalyst. For example, in the case where an aralkyl ether is employed as the compound of the formula (13), the reaction may be effected in the presence of a catalyst. In the case of the use of an aralkyl halide, the reaction may be effected in the absence of a catalyst. Examples of the catalyst are a Friedel-Crafts catalyst such as dimethyl sulfate, diethyl sulfate, tin chloride and aluminum chloride.

Moreover, the reaction may be effected in the presence or absence of a solvent. The reaction temperature is for example about 50 to 250° C., preferably about 100 to 230° C. When an aralkyl halide is employed as a reactant, the reaction temperature may be lower than the one mentioned above. For example, the reaction temperature may be about 50 to 150° C., particularly about 70 to 130° C.

In the reaction described above, together with the phenol and/or aniline, there may be additionally used a co-condensable component in combination, such as an aldehyde (e.g., the aldehyde exemplified in the section on the novolak resin, and benzaldehyde), an hydroxybenzoic acid (e.g., p-hydroxybenzoic acid; an alkyl ester of p-hydroxybenzoic acid such as methyl p-hydroxybenzoate and ethyl p-hydroxybenzoate), an hydroxybenzene (e.g., dihydroxybenzene, trihydroxybenzene), a naphthol (e.g., 1-naphthol, 2-naphthol, 1,6-dihydroxynaphthalene, 2,7-dihydroxynaphthalene, hydroxynaphthoic acid, an alkyl ester of hydroxynaphthoic acid), a bisphenol (e.g., the bisphenol exemplified in the section on the $Z^1$ and $Z^2$, and bisphenol F, bisphenol S, bisphenol-sulfone), an aniline, a furfural, an alkylbenzene and a urea exemplified as a copolymerizable component in the section on the novolak resin.

Further, as the aralkyl resin, there may be used a modified aralkyl resin, in which at least part of the hydroxyl group or amino group denoted by X has been modified with at least one member selected from phosphorus-containing compounds and boron-containing compounds exemplified in the section on the novolak resin, for example a phosphoric acid-modified phenolaralkyl resin, a phosphoric acid-modified anilinearalkyl resin, a boric acid-modified phenolaralkyl resin and a boric acid-modified anilinearalkyl resin. The hydroxyl group of the aralkyl resin has been usually modified into a phosphate or borate, and the amino group, in many cases, into a phosphoric acid amide or a boric acid amide.

The softening point of the aralkyl resin thus obtained is, for example, about 40 to 160° C., preferably about 50 to 150° C., and more preferably about 55 to 140° C. Incidentally, as other aralkyl resin, there may be used an aralkyl resin described in Japanese Patent Application Laid-Open No. 351822/2000 (JP-2000-351822A).

If necessary, the aralkyl resin may be cured or modified. Curing or modification may be usually effected by a conventional method, such as methylene-crosslinking with the use of a polyamine (e.g., hexamethylenetetramine) and epoxy-modification with the use of an epoxy compound (e.g., epichlorohydrin).

Furthermore, if necessary, the aralkyl resin may be modified with an elastomer. Modification with an elastomer may be chemically effected using a synthetic rubber, a polyolefin (e.g., a polyisobutylene, a polyethylene), or other elastomers.

(3) Aromatic Vinyl Resin

The aromatic vinyl resin includes, for example, a resin having a structural unit represented by the following formula (14):

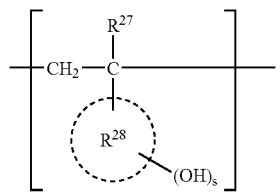

(14)

wherein $R^{27}$ represents a hydrogen atom or a $C_{1-3}$alkyl group, $R^{28}$ represents an aromatic ring, and "s" denotes an integer of 1 to 3.

In the formula (14), the preferred $C_{1-3}$alkyl group includes methyl group. As the aromatic ring, there may be mentioned a $C_{6-20}$aromatic ring such as benzene ring and naphthalene ring. Incidentally, the aromatic ring may have a substituent (e.g., a hydroxyl group; the alkyl group exemplified in the item on the above-mentioned $R^5$ to $R^7$; the alkoxy group exemplified in the item on the above-mentioned Y).

In the formula (14), the hydrogen atom of the hydroxyl group may be protected by a metal ion, a silyl group, or an organic group (or protecting group) such as an alkyl group, an alkanoyl group and a benzoyl group.

A resin obtained from such a derivative has, for example, a structural unit represented by the following formula (15):

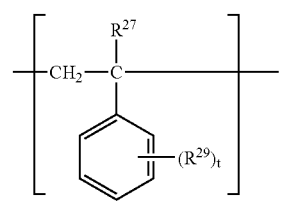

(15)

wherein $R^{27}$ has the same meaning as defined above, $R^{29}$ is a group selected from the group consisting of —OH, —OSi($R^{30}$)$_3$ and —OM ("M" represents a metal cation, $OR^{30}$ and $OCOR^{30}$, and $R^{30}$ represents an alkyl group having 1 to 5 carbon atom(s) or aryl group), and "t" denotes an integer of 1 to 3.

In the formula, "M" may be either a monovalent alkali metal cation (e.g., sodium, lithium, potassium), a bivalent alkaline earth metal cation (e.g., magnesium, calcium), or a transition metal cation.

It is sufficient that the substituent $R^{29}$ in the formula is positioned in any one of ortho-position, meta-position and para-position. Further, in addition to the substituent $R^{29}$, a pendant aromatic ring may have a $C_{1-4}$alkyl group as a substituent.

The aromatic vinyl-series resin includes a homo- or copolymer of an aromatic vinyl monomer having a hydroxyl group, corresponding to the above-mentioned structural unit (14), or a copolymer with other copolymerizable monomer.

As the aromatic vinyl monomer, for example, there may be mentioned a hydroxyl group-containing aromatic vinyl monomer such as vinylphenol, dihydroxystyrene and vinylnaphthol. These aromatic vinyl monomers may be used singly or in combination.

Examples of the other copolymerizable monomer are a (meth)acrylic monomer [e.g., (meth)acrylic acid, a (meth) acrylate (e.g., a $C_{1-18}$alkyl (meth)acrylate such as methyl (meth)acrylate, ethyl (meth)acrylate, butyl (meth)acrylate and 2-ethylhexyl (meth)acrylate, a hydroxyl group-containing monomer such as 2-hydroxyethyl (meth)acrylate, glycidyl (meth)acrylate), (meth)acrylamide, (meth)acrylonitrile], a styrenic monomer (e.g., styrene, vinyltoluene, α-methylstyrene, chlorostyrene, vinylnaphthalene, vinylcyclohexane), a polymerizable polycarboxylic acid (e.g., fumaric acid, maleic acid),a maleimide-series monomer (e.g., maleimide, N-alkylmaleimide, N-phenylmaleimide), a diene-series monomer (e.g., isoprene, 1,3-butadiene, 1,4-hexadiene, dicyclopentadiene), and a vinyl-series monomer (e.g., a vinyl ester such as vinyl acetate and vinyl propionate; a vinyl ketone such as methyl vinyl ketone and methyl isopropenyl ketone; a vinyl ether such as vinyl isobutyl ether and vinyl methyl ether; a nitrogen-containing vinyl monomer such as N-vinylcarbazole, and N-vinylpyrrolidone, N-vinylimidazole). These copolymerizable monomers may be used either singly or in combination.

The ratio of the vinyl monomer relative to the copolymerizable monomer is, for example, about 10/90 to 100/0

(% by weight), preferably about 30/70 to 100/0 (% by weight), and more preferably about 50/50 to 100/0 (% by weight).

The preferred aromatic vinyl resin includes a vinylphenol homopolymer (a polyhydroxystyrene), particularly a p-vinylphenol homopolymer.

There is no particular restriction as to the number average molecular weight of the aromatic vinyl-series resin, and it may be selected within the range of, for example, 300 to $50 \times 10^4$, preferably 400 to $30 \times 10^4$, and more preferably about 500 to $5 \times 10^4$.

Among the aromatic resins, a polyphenylene sulfide-series resin or a polyphenylene oxide-series resin is preferred.

(C) Flame-retardant Auxiliary

The flame-retardant auxiliary (or flame-retardant synergist) of the present invention includes a nitrogen-containing compound (C1) and a metal salt of an inorganic acid (C2).

(C1) Nitrogen-containing Compound

The nitrogen-containing compound to be used as a flame-retardant auxiliary includes (a) a nitrogen-containing cyclic compound having an amino group, (b) a salt of a nitrogen-containing cyclic compound having an amino group with an oxygen acid (oxyacid), (c) a salt of a nitrogen-containing cyclic compound having an amino group with an organic phosphoric acid, (d) a salt of a nitrogen-containing cyclic compound having an amino group with a nitrogen-containing cyclic compound having a hydroxyl group, (e) a polyphosphoric acid amide, (f) a cyclic compound having a urea unit (or cyclic urea compound), and others.

(a) Nitrogen-containing Cyclic Compound having Amino Group

The nitrogen-containing cyclic compound having an amino group includes a heterocyclic compound having at least one amino group, and at least one nitrogen atom as a hetero atom of a heterocycle. The heterocycle may have other hetero atom(s) such as sulfur and oxygen other than nitrogen. Such a nitrogen-containing heterocycle includes a 5- or 6-membered unsaturated nitrogen-containing heterocycle having a plurality of nitrogen atoms as constituent atoms thereof, for example, imidazole, thiadiazole, thiadiazoline, furazan, triazole, thiadiazine, pyrazine, pyrimidine, pyridazine, triazine, and purine. Among such nitrogen-containing rings, a 5- or 6-membered unsaturated nitrogen-containing ring having a plurality of nitrogen atoms as constituent atoms thereof is preferred, and in particular, triazole and triazine are preferred.

As the triazole compound, there may be mentioned a 1,2,3-triazole (e.g., a 1H-1,2,3-triazole; a 2H-1,2,3-triazole), a 1,2,4-triazole (e.g., a 1H-1,2,4-triazole such as guanazole; a 4H-1,2,4-triazole such as guanazine), and the like. The arbitrary site(s) of a triazole ring (nitrogen atom and carbon atom, particular carbon atom) may have an amino group(s) as substituent(s). The number of the amino group is not particularly limited to a specific one, and is about 1 to 3, and particularly about 1 to 2.

The triazine compound includes a variety of aminotriazines: a 1,3,5-triazine [for example, a melamine or a derivative thereof such as melamine, a substituted melamine (e.g., an alkylmelamine such as 2-methylmelamine, guanylmelamine), a condensation product of a melamine (melamine condensate) (e.g., melam, melem, melon), and a copolycondensed resin of a melamine (e.g., a melamine-formaldehyde resin, a phenol-melamine resin, a benzoguanamine-melamine resin, an aromatic polyamine-melamine resin); a cyanuric amide (e.g., ammeline, ammelide); a guanamine or a derivative thereof (e.g., guanamine, methylguanamine, acetoguanamine, benzoguanamine, succinoguanamine and CTU guanamine)], an amino group-containing 1,2,3-triazine (e.g., 1,2,3-triazine having an amino group(s) as substituent(s) at 5-position, 4,5-positions or 4,5,6-positions, 4-amino-benzo-1,2,3-triazine), and an amino group-containing 1,2,4-triazine (e.g., 1,2,4-triazine having an amino group(s) as substituent(s) at 3-position, 5-position or 3,5-positions). The arbitrary site(s) of a triazine ring (nitrogen atom and carbon atom, particularly carbon atom) has an amino group(s) as substituent(s). The number of the amino group is not particularly limited to a specific one, and is about 1 to 4, especially about 1 to 3 (for example about 1 to 2).

Among them, the amino group-containing triazine compound, particularly the amino group-containing 1,3,5-triazine, is preferred.

(b) Salt of Nitrogen-containing Cyclic Compound having Amino Group with Oxygen Acid As the nitrogen-containing cyclic compound having an amino group, there may be used a nitrogen-containing cyclic compound similar to the above-mentioned (a).

The nitrogen-containing cyclic compound having an amino group may form a salt with an oxygen acid at a nitrogen atom site (imino group) constituting a ring. It is usually preferred to form a salt of at least one amino group which is a substituent of a ring with an oxygen acid. In the case having a plurality of amino groups, all amino groups may form a salt with the oxygen acid. Moreover, a plurality of nitrogen-containing compounds which are the same or different kind (the above-mentioned nitrogen-containing cyclic compound, or other nitrogen-containing compound which contains an amino group) may form a salt with one polyphosphoric acid to form a double salt (or complex salt) of a polyacid.

(Oxygen Acid)

The oxygen acid includes nitric acid, a chloric acid (such as perchloric acid, chloric acid, chlorous acid, hypochlorous acid), a phosphoric acid, a sulfuric acid, a sulfonic acid, a boric acid, a chromic acid, an antimonic acid, a molybdic acid, and a tungstic acid. The preferred oxygen acid includes a phosphoric acid (polyphosphoric acid), a sulfuric acid, a sulfonic acid, and a boric acid.

(1) Phosphate of Nitrogen-containing Cyclic Compound having Amino Group

The phosphoric acid includes a non-condensed phosphoric acid such as peroxyphosphoric acid, orthophosphoric acid, metaphosphoric acid, phosphorous acid (phosphonic acid), and hypophosphorous acid (phosphinic acid); a condensed phosphoric acid (polyphosphoric acid) such as polymetaphosphoric acid $(HPO_3)_q$ (wherein, "q" shows an integer of not less than 2), hypophosphoric acid, and phosphoric anhydride (diphosphorus pentaoxide). Moreover, the polyphosphoric acid also includes a condensed phosphoric acid represented by the following formula (16):

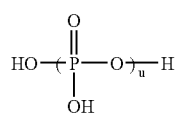

(16)

wherein "u" denotes an integer of not less than 2.

In the formula, "u" is preferably an integer of 2 to 200, and more preferably an integer of 3 to 100.

In a phosphoric acid having a plurality of salifiable sites, at least part of the sites may form a partial salt with other amino group-containing compound such as an amine and a urea (e.g., a partial salt of a condensed acid such as an ammonium polyphosphate and a urea polyphosphate; and a partial salt of non-condensed acid such as a urea orthophosphate).

As a phosphate of a nitrogen-containing cyclic compound having an amino group, there may be exemplified a phosphate of an amino group-containing triazine compound, for example, a non-condensed phosphate (e.g., a melamine salt of a non-condensed phosphoric acid such as melamine orthophosphate and melamine phosphate; a melem, melam, melon and guanamine salt corresponding to the melamine polyphosphate), a polyphosphate [e.g., a melamine pyrophosphate (melamine pyrophosphate, dimelamine pyrophosphate), a melamine polyphosphate (such as a triphosphate and tetraphosphate) corresponding to the melamine pyrophosphate; and a melem, melam, melon and guanamine salt corresponding to the melamine polyphosphate]. Moreover, the polyphosphate may contain a sulfur atom derived from sulfuric acid. There may be also used a triazole salt corresponding to the above-mentioned triazine salt.

The polyphosphate also includes a double salt (complex salt) of polyphosphoric acid with melamine, melam and melem (or a melamine.melam.melem double salt of polyphosphoric acid), a melamine.melam.melem double salt of metaphosphoric acid, in addition a melamine.melam.melem double salt of the above-mentioned polyacid containing a sulfur atom (a polyacid containing a sulfur atom, an oxygen atom and others in addition to a phosphorus atom). The details of these double salts can be referred to Japanese Patent Application Laid-Open No. 306081/1998 (JP-10-306081A), Japanese Patent Application Laid-Open No. 306082/1998 (JP-10-306082A), and others.

(2) Sulfate of Nitrogen-containing Compound having Amino Group

The sulfuric acid includes a non-condensed sulfuric acid such as peroxomonosulfuric acid, sulfuric acid and sulfurous acid, a condensed sulfuric acid such as peroxodisulfuric acid and pyrosulfuric acid, and others.

As a sulfate of a nitrogen-containing compound having an amino group, there may be mentioned a sulfate of an amino group-containing triazine compound, for example, a condensed sulfate [for example, a melamine salt of a non-condensed sulfuric acid such as a melamine sulfate (e.g., melamine sulfate, dimelamine sulfate, guanylmelamine sulfate), and a melamine sulfite corresponding to the melamine sulfate; and a melem salt, melam salt, melon salt or guanamine salt corresponding to the melamine salt of a non-condensed sulfuric acid)], a condensed sulfate [for example, a melamine pyrosulfate (e.g., melamine pyrosulfate, dimelamine pyrosulfate), and a melem salt, melam salt, melon salt or guanamine salt corresponding to the melamine pyrosulfate]. Moreover, a triazole salt corresponding to the triazine salt may be also used.

For example, the melamine sulfate may be obtained by a method described in Japanese Patent Application Laid-Open No. 231517/1996 (JP-8-231517A). For example, the dimelam pyrosulfate may be obtained by a method described in A.C.S. Symposium Series No. 425 "Fire and Polymers", Chapter 15, p. 211–238 (American Chemical Society, Washington D.C., 1990), Japanese Patent Application Laid-Open No. 306082/1998 (JP-10-306082A), or the like.

(3) Sulfonate of Nitrogen-containing Cyclic Compound having Amino Group

The sulfonic acid includes an organic sulfonic acid such as a $C_{1-10}$alkanesulfonic acid (e.g., methanesulfonic acid, ethanesulfonic acid, ethanedisulfonic acid), and a $C_{6-20}$arylsulfonic acid (e.g., benzenesulfonic acid, toluenesulfonic acid).

As the sulfonate of a nitrogen-containing cyclic compound having an amino group, there may be mentioned a sulfonate of a amino group-containing triazine compound (e.g., melamine, melam, melem, melon, guanamine, acetoguanamine, benzoguanamine) [for example, a melamine sulfonate (melamine methanesulfonate, melam methanesulfonate, melem methanesulfonate, a melamine-melam-melem double salt of methanesulfonic acid, guanamine methanesulfonate)], or others.

(4) Borate of Nitrogen-containing Cyclic Compound having Amino Group

The boric acid includes a non-condensed boric acid such as orthoboric acid and metaboric acid; a condensed boric acid such as tetraboric acid and boric anhydride; and others.

As a borate of a nitrogen-containing cyclic compound having an amino group, there may be mentioned a borate of an amino-group containing triazine compound, for example, a non-condensed borate [a salt of an orthoboric acid such as a melamine orthoborate (a melamine orthoborate such as mono- to trimelamine orthoborate), a melem salt, melam salt, melon salt or guanamine salt corresponding to the melamine orthoborate; a metaborate corresponding to the orthoborate], a polyborate [a melamine salt of a condensed boric acid (e.g., melamine boric anhydride, melamine tetraborate), a melem salt, melam salt, melon salt or guanamine salt corresponding to the melamine borate].

Moreover, the borate may be obtained by a method of maintaining a mixture comprising a nitrogen-containing cyclic compound and a boric acid at a high temperature under a high humidity (e.g., amethod described in Japanese Patent Application Laid-Open No. 79720/1999 (JP-11-79720A)). Such a borate of a nitrogen-containing cyclic compound (triazine compound) is, for example, available as "melapur" from DMS, as "STORFLAM MLB" from Joseph Storey & Co LTD, or as "BUDIT 313" from Budenheim Iberica Comercial.

These salts of an oxygen acid may be used singly or in combination.

The ratio of the nitrogen-containing cyclic compound having an amino group relative to the oxygen acid is not particularly limited to a specific one, and the former/the latter (molar ratio) is, for example, about 1/20 to 20/1, preferably about 1/10 to 10/1 (e.g., about 1/5 to 10/1), and particularly about 1/2 to 8/1. The equivalence ratio of an amino group contained in the nitrogen-containing cyclic compound relative to a salifiable site of the oxygen acid is also not particularly limited to a specific one, and is, for example, about 10/1 to 1/2, preferably about 5/1 to 1/1,and particularly about 4/1 to 1/1.

(c) Salt of Nitrogen-containing Cyclic Compound having Amino Group with Organic Phosphoric Acid As a nitrogen-containing cyclic compound having an amino group, there may be exemplified the nitrogen-containing cyclic compound having an amino group similar to the above-mentioned (a).

As the organic phosphoric acid, for example, there may be mentioned a partial ester of the non-condensed phosphoric acid exemplified in the paragraph on the foregoing (b) [e.g., a phosphoric acid (orthophosphoric acid), a phosphorous acid], and a phosphorous acid or hypophosphorous acid having a substituent organic group. The organic phosphoric acid need only comprise at least one site capable of forming a salt with the nitrogen-containing cyclic compound having an amino group.

The phosphoric ester (organic orthophosphoric acid) includes a phosphoric mono- or diester of an alcohol (a mono- or polyhydric alcohol, a mono- or polyhydric phenol). The alcohol includes a monohydric alcohol and an aliphatic polyol exemplified in the paragraph on the polyarylate-series resin (in particular a $C_{1-10}$aliphatic monool), in addition a $C_{1-10}$aliphatic polyol such as glycerol and pentaerythritol; a $C_{2-10}$aliphatic polyol having a hetero atom, such as nitrilotrimethanol; a $C_{5-8}$alicyclic monool such as cyclopentanol and cyclohexanol (preferably a $C_{5-6}$cycloalkanol); a $C_{5-8}$ alicyclic diol such as cyclohexanediol (preferably a $C_{5-6}$cycloalkanediol); a monohydric phenol such as phenol, an alkylphenol (e.g., a mono- to tri$C_{1-20}$alkylphenol such as p- or m-cresol, 3,5-xylenol, trimethylphenol, t-butylphenol, p-octylphenol, and nonylphenol), an arylphenol (e.g., phenylphenol, benzylphenol, cumylphenol), naphthol, or hydroxybiphenyl; a monohydric aralkyl alcohol and aromatic cyclic diol exemplified in the paragraph on the polyarylate-series resin; and others.

Such a phosphate includes a mono- or di$C_{1-10}$alkyl phosphate such as methyl phosphate and dibutyl phosphate; a mono- to tetraphosphate of a $C_{2-10}$ aliphatic polyhydric alcohol such as ethylene glycol monophosphate and pentaerythritol bisphosphate; a phosphate of a monohydric phenol which may have a substituent (such as a $C_{1-4}$alkyl group) (e.g., a mono- or di$C_{6-14}$aryl phosphate which may have a $C_{1-4}$alkyl group), such as monophenyl phosphate, monocresyl phosphate, monoxylenyl phosphate, monotrimethylphenyl phosphate, diphenyl phosphate, dicresyl phosphate, dixylenyl phosphate and ditrimethylphenyl phosphate; a mono- or diphosphate of a polyhydric phenol which may have a substituent (such as a $C_{1-4}$alkyl group) (e.g., a $C_{6-14}$arylene mono- or diphosphate which may have a $C_{1-4}$alkyl group), such as phenylene bisphosphate; an alkylaryl phosphate [e.g., a $C_{1-10}$alkyl $C_{6-14}$aryl phosphate such as methyl phenyl phosphate (preferably a $C_{1-6}$alkyl $C_{6-10}$aryl phosphate)].

The organic phosphorous acid includes a phosphorous monoester corresponding to the above-mentioned phosphate, an organic phosphorous acid in which a hydrogen atom directly bonded to a phosphorus atom of phosphorous acid is substituted by an organic group (such as an aliphatic hydrocarbon group, an alicyclic hydrocarbon group, an aromatic hydrocarbon group), an organic phosphorous monoester of the alcohol.

The organic phosphorous acid includes an aliphatic phosphorous acid [e.g., an alkylphosphorous acid such as methylphosphorous acid, ethylphosphorous acid, propylphosphorous acid and butylphosphorous acid; a mono or diphosphorous ester of an aliphatic polyol such as 1-hydroxyethylidene-1-phosphorous acid and 1-hydroxyethylidene-1,1-diphosphorous acid; a $C_{1-10}$alkyl-substituted phosphorous acid in which the $C_{1-10}$alkyl group may have a substituent (e.g., a hydroxyl group, a carboxyl group, an ester group), for example, a phosphonocarboxylic acid such as a phosphono$C_{1-10}$aliphatic carboxylic acid (e.g., a phosphonoacetic acid, 3-phosphonopropionic acid) or a carboxylic ester thereof (e.g., a carboxylate of a phosphonocarboxylic acid such as ethyl phosphonoacetate and ethyl 3-phosphonopropionate) (preferably a $C_{1-6}$ alkyl-substituted phosphorous acid); a $C_{1-10}$ alkylenediphosphorous acid such as ethylenebisphosphorous acid; a phosphorous acid which has a substituent aliphatic polyfunctional group having a hetero atom such as nitrilotris(methylphosphorous acid) (or [nitrilotris(methylene)]trisphosphorous acid)], an aromatic phosphorous acid [for example, a $C_{6-10}$ arylphosphorous acid such as phenylphosphorous acid and tolylphosphorous acid; a phosphonocarboxylic acid such as a phosphono$C_{7-15}$aromatic carboxylic acid (such as phosphonobenzoic acid) or a carboxylic ester thereof (e.g., a carboxylate of a phosphono aromatic carboxylic acid such as ethyl phosphonobenzoate); a phosphorous acid having a substituent aromatic polyfunctional group which may have a substituent (e.g., a $C_{1-4}$alkyl group), such as phenylenebisphosphorous acid]. Moreover, the organic phosphorous acid may be a phosphorous acid bonded to a polymer (e.g., a polyvinylphosphorous acid).

The organic phosphorous monoester includes a monoester of the above-mentioned organic phosphorous acid with the alcohol exemplified in the item on the above-mentioned phosphate, for example, a $C_{1-10}$alkylphosphorous acid mono$C_{1-6}$alkyl ester such as methylphosphorous acid monomethyl ester; a phosphonocarboxylic acid diester (a $C_{2-6}$alkoxycarbonyl$C_{1-6}$alkylphosphorous mono$C_{1-6}$alkyl ester such as monoethyl ethoxycarbonylmethylphosphite or monoethyl ethoxycarbonylethylphosphite); a $C_{1-10}$ alkylphosphorous mono$C_{6-10}$aryl ester such as methylphosphorous monophenyl ester; a $C_{6-10}$arylphosphorous $C_{1-6}$alkyl ester such as phenylphosphorous monomethyl ester; and a $C_{6-10}$arylphosphorous mono$C_{6-10}$aryl ester such as phenylphosphorous monophenyl ester. Incidentally, the phosphorous ester may be a cyclic phosphorous ester (e.g., 9,10-dihydro-10-hydroxy-10-oxo-9-oxa-10-phosphaphenanthrene).

The organic hypophosphorous acid includes an organic hypophosphorous acid in which an organic group (hydrocarbon group such as an aliphatic hydrocarbon group, an alicyclic hydrocarbon group and an aromatic hydrocarbon group) is bonded to phosphorus atom of the hypophosphorous acid. As such a organic hypophosphorous acid, there may be mentioned a substituted hypophosphorous acid corresponding to the substituted phosphorous acid, for example, a mono- or di$C_{1-10}$alkylhypophosphorous acid such as methylethylhypophosphorous acid and diethylhypophosphorous acid; a $C_{1-10}$alkyl$C_{6-10}$ arylhypophosphorous acid such as methylphenylhypophosphorous acid; a $C_{6-10}$ arylhypophosphorous acid such as phenylhypophosphorous acid; a phosphinicocarboxylic acid [e.g., a phosphinicodi$C_{1-6}$aliphatic carboxylic acid such as phosphinicodiacetic acid; a $C_{1-6}$alkylphosphinico-mono$C_{1-6}$ aliphatic carboxylic acid such as 3-(methylphosphinico)propionic acid, a $C_{6-10}$arylphosphinico-mono$C_{1-6}$ aliphatic carboxylic acid such as 3-(phenylphosphinico)propionic acid, a carboxylic ester of the phosphinicocarboxylic acid; a phosphinicomono- or di$C_{6-10}$arylcarboxylic acid or an carboxylic ester thereof]; a hydroxyphosphine oxide (e.g., 1-hydroxydihydrophosphonyl oxide, 1-hydroxyphosphorane oxide); and others.

The organic phosphate may be a salt of the nitrogen-containing cyclic compound having an amino group at part or whole of salifiable site(s), and both of the salts may be used. Such an organic phosphate includes a salt of an amino group-containing triazine compound, for example, a melamine salt of an organic phosphoric ester (e.g., salt of pentaerythritol bisphosphate with melamine, salt of pentaerythritol bisphosphate with dimelamine), a melamine salt of a $C_{1-6}$alkyl-substituted phosphorous acid, a melamine salt of a mono- or diphosphorous ester of a $C_{1-6}$aliphatic diol (e.g., salt of 1-hydroxyethylidene-1,1-diphosphorous acid with dimelamine, salt of 1-hydroxyethylidene-1,1-diphosphorous acid with tetramelamine), a melamine salt of a phosphorous acid which has a substituent aliphatic polyfunctional group having a hetero atom [e.g., tetramelamine salt of nitrilotris(methylphosphonic acid), hexamelamine salt of nitrilotris(methylphosphonic acid)], and a melamine salt of a $C_{6-10}$arylphosphorous acid, (melamine salt of phenylphosphorous acid, dimelamine salt of phenylphosphorous acid), a melamine salt of a phosphinicocarboxylic acid (a melamine salt of an arylphosphinicocarboxylic acid such as melamine salt of 3-(phenylphosphinico)propionic acid and dimelamine salt of 3-(phenylphosphinico)propionic acid); a melem salt, a melam salt, a melon salt or a guanamine salt, each corresponding to the melamine salt; and a double salt corresponding to the melamine salt, such as salt of pentaerythritol bisphosphate with melamine and melem). Moreover, a triazole salt corresponding to the above-mentioned salt of a triazine compound may be also used. Such an organic phosphate may be used singly or in combination.

A production method of such an organic phosphate of a nitrogen-containing compound having an amino group (in particular, an amino group-containing triazine compound) is not particularly limited to a specific one, and for example comprises stirring and mixing a solution or dispersion liquid containing the nitrogen-containing compound and the organic phosphoric acid (e.g., an aqueous solution or suspension such as a water-acetone mixed system and a water-alcohol mixed system) at an appropriate temperature (for example, about 50 to 100° C.), and separating and drying the produced precipitate to give an object product.

(d) Salt of Nitrogen-containing Cyclic Compound having Amino Group with Nitrogen-containing Cyclic Compound having Hydrogen Group As a nitrogen-containing cyclic compound having an amino group, there may be mentioned the nitrogen-containing cyclic compound having an amino group similar to the above-mentioned (a).

A nitrogen-containing cyclic compound having a hydroxyl group includes a compound composed of at least one hydroxyl group and a heterocycle having at least one nitrogen atom as a hetero atom thereof. As the heterocycle, there may be mentioned a heterocycle corresponding to the above nitrogen-containing cyclic compound having an amino group. The preferred nitrogen-containing ring is a 5- or 6-membered unsaturated nitrogen-containing ring having a plurality of nitrogen atoms as constituent atoms of the ring, in particular triazine, as described above.

As the triazine compound, there may be mentioned a hydroxyl group-containing triazine compound corresponding to the triazine compound exemplified in the item on the nitrogen-containing cyclic compound having an amino group. The arbitrary site(s) of a triazine ring (nitrogen atom and carbon atom, particular carbon atom), e.g., 2-position, 3-position, 4-position, 5-position, 2,4-position, 3,5-posision, 4,5-position, 2,4,6-position, or 4,5,6-position, may have a hydroxyl group(s) as substituent(s). The number of the hydroxyl group is not particularly limited to a specific one, and is about 1 to 4, and particularly about 1 to 3 (e.g., about 2 to 3). The preferred hydroxyl group-containing triazine compound includes a hydroxyl group-containing 1,3,5-triazine, in particular a cyanuric acid or a derivative thereof such as cyanuric acid, ammeline, and ammelide.

The salt of the nitrogen-containing cyclic compound having an amino group with the nitrogen-containing cyclic compound having a hydroxyl group includes a salt of a triazine with a cyanuric acid or a derivative thereof, for example, a melamine salt of cyanuric acid such as melamine cyanurate; and a melem salt, melam salt, melon salt or guanamine salt (e.g., guanamine cyanurate, acetoguanamine cyanurate, benzoguanamine cyanurate) corresponding to the melamine salt.

These salts may be used singly or in combination.

The ratio of the nitrogen-containing cyclic compound having an amino group relative to the nitrogen-containing cyclic compound having a hydroxyl group is not particularly limited to a specific one, and for example the former/the latter (molar ratio) is about 1/2 to 3/1,and preferably about 1/1 to 2/1.

(e) Polyphosphoric Acid Amide

The polyphosphoric acid amide is a polymer compound containing a nitrogen of an amide form and includes a condensate of a phosphoric acid exemplified in the paragraph on the oxygen acid and a compound having a unit represented by —N=C=N— or —N=C(—N<)$_2$ (such as a cyanamide derivative). Such a polyphosphoric acid amide is usually obtained by heating (such as burning) the above-mentioned phosphoric acid and the cyanamide derivative in the presence of at least one member (or binding agent) selected from a urea and a urea polyphosphate.

As the above-mentioned phosphoric acid, it is preferred to use a non-condensed phosphoric acid (e.g., orthophosphoric acid, metaphosphoric acid), a polyphosphoric acid, a partial ester of a phosphoric acid (e.g., ammonium polyphosphate, urea phosphate) or the like. These phosphoric acids may be used singly or in combination.

The cyanamide derivative includes a cyclic cyanamide derivative such as an amino group-containing triazine (e.g., an amino group-containing 1,3,5-triazine such as melamine, melam, melem, melon, guanamine, acetoguanamine, or benzoguanamine, an amino group-containing 1,2,4-triazinesuch as 3-amino-1,2,4-triazine) and an amino group-containing triazole (e.g., an amino group-containing 1,3,4-triazole such as 2,5-diamino-1,3,4-triazole); a noncyclic cyanamide derivative such as a guanidine compound [e.g., guanidine, a guanidine derivative such as dicyandiamide or guanylurea)]; or others. The preferred cyanamide derivative includes an amino group-containing 1,3,5-triazine, and guanidine or a derivative thereof, in particular melamine. Such a cyanamide derivative may be used singly or in combination.

These polyphosphoric acid amides may be used singly or in combination. For example, the polyphosphoric acid amide may be referred to Japanese Patent Application Laid-Open No. 138463/1995 (JP-7-138463A). Such a polyphosphoric acid amide may be produced by methods described in Japanese Patent Publication No. 2170/1978 (JP-53-2170B), Japanese Patent Publication No. 15478/1978 (JP-53-15478B), Japanese Patent Publication No. 49004/1980 (JP-55-49004B), Japanese Patent Application Laid-Open No. 126091/1986 (JP-61-126091A), Japanese Patent Application Laid-Open No. 81691/1998 (JP-10-81691A), U.S. Pat. No. 4,043,987, or others. The polyphosphoric acid amide is commercially available as "SUMISAFE PM" (manufactured by Sumitomo Chemical Co., Ltd.), "Taien S" (manufactured by Taihei Chemical Industrial Co., Ltd.), "MPP" (manufactured by Sanwa Chemical Co., Ltd.), "Melapur" (manufactured by DSM), "Exolit" (manufactured by Clariant Ltd.), and "AMGARD" (manufactured by Albright & Wilson Corp.).

(f) Cyclic Compound having a Urea Unit

The cyclic compound having a urea unit (or cyclic urea compound) is not particularly limited to a specific one as far as the compound comprises at least one urea unit (—NH-CONH—) as a constituent unit of a ring thereof, and may be any of a monocyclic compound, and a condensed ring or crosslinked ring with an aromatic hydrocarbon ring. Such a cyclic urea compound includes a cyclic monoureide, a cyclic diureide, and others. Further, the cyclic urea compound also includes a cyclic thiourea corresponding to the above-mentioned cyclic urea. These cyclic urea compounds may be used singly or in combination.

As the cyclic monoureide, for example, there may be mentioned an alkyleneurea [e.g., a $C_{1-10}$alkyleneurea such as methyleneurea, ethyleneurea and crotonylideneurea (CDU) (preferably, a $C_{1-6}$alkyleneurea)], an alkenyleneurea (e.g., a $C_{2-10}$alkenyleneurea such as vinyleneurea and cytosine), an alkynyleneurea [e.g., a $C_{2-10}$alkynyleneurea (preferably, a $C_{2-6}$alkynyleneurea)], an aryleneurea (e.g., imesatin), a ureide of a dicarboxylic acid (e.g., parabanic acid, dimethylparabanic acid, barbituric acid, 5,5-diethyl-barbituric acid, dilituric acid, dialuric acid, alloxan, alloxanic acid, isocyanuric acid, uramil), a ureide of a β-aldehydic acid (e.g., uracil, 5-methyluracil (thymine), dihydrouracil, urazole, benzolyene urea), a ureide of an α-hydroxy acid [e.g., a hydantoin compound such as hydantoin, 5,5-dimethylhydantoin, 1,1-methylenebis(5,5-dimethylhydantoin) and allantoin], or a derivative thereof.

As the cyclic diureide, for example, there may be mentioned uric acid, 3-methyluric acid, pseudouric acid, acetyleneurea (glycoluril), a diureide of a α-hydroxy acid [e.g., 1,1-methylenebis(5,5-dimethylhydantoin), allantoin], a diurea such as p-urazine, a diureide of a dicarboxylic acid (e.g., alloxantin, purpuric acid), or a derivative thereof.

The cyclic thiourea includes ethylene thiourea, thiobarbituric acid, dithiourazole, thiohydantoin, dithiohydantoin, and others.

Among the cyclic urea compounds, the preferred compound includes a cyclic diureide having two urea units as a constituent unit of a ring thereof (including a cyclic thiourea having two urea units), in particular acetyleneurea, uric acid, and a derivative thereof.

Among these nitrogen-containing compounds, the preferred compound includes a double salt of a nitrogen-containing cyclic compound having an amino group with a polyphosphoric acid (in particular a melamine.melam.melem double salt of a polyphosphoric acid), a salt of a nitrogen-containing cyclic compound having an amino group with a polymetaphosphoric acid (in particular a melamine polymetaphosphate), a polyphosphoric acid amide, a salt of a nitrogen-containing cyclic compound having an amino group with a sulfuric acid, a pyrosulfuric acid, an organic sulfonic acid, an organic phosphorus acid or an organic hypophosphorous acid (in particular a melamine sulfate, a melam pyrosulfate, a melam organic sulfonate, a melamine organic phosphate, a melamine organic hypophosphite), a cyclic urea compound, and others.

(C2) Metal Salt of Inorganic Acid

As an inorganic acid constituting the salt, there may be used a variety of inorganic acids such as a hydrochloric acid, a nitric acid, a sulfuric acid, a phosphoric acid, a boric acid, a carbonic acid, and a stannic acid. The preferred inorganic acid includes an oxygen acid exemplified in the paragraph on the foregoing (b) in (C1) and a stannic acid, in particular a phosphoric acid, a boric acid, and a stannic acid.

A metal forming a salt with the inorganic acid includes an alkali metal (e.g., potassium, sodium); an alkaline earth metal (e.g., magnesium, calcium, barium); a transition metal [e.g., the metal of the Group 3A of the Periodic Table of Elements (such as scandium); the metal of the Group 4A of the Periodic Table of Elements (such as titanium); the metal of the Group 5A of the Periodic Table of Elements (such as vanadium); the metal of the Group 6A of the Periodic Table of Elements (such as chromium and molybdenum); the metal of the Group 7A of the Periodic Table of Elements (such as manganese); the metal of the Group 8 of the Periodic Table of Elements (such as iron, cobalt, nickel and palladium); and the metal of the Group 1B of the Periodic Table of Elements (such as copper and silver)], the metal of the Group 2B of the Periodic Table of Elements (such as zinc, cadmium and mercury), the metal of the Group 3B of the Periodic Table of Elements (such as aluminum), the metal of the Group 4B of the Periodic Table of Elements (such as tin and lead), and the metal of the Group 5B of the Periodic Table of Elements (such as antimony and bismuth). These metals may be used singly or in combination.

(Metal Phosphate)

Preferred as a phosphoric acid is a non-condensed phosphoric acid such as orthophosphoric acid, metaphosphoric acid, phosphorous acid, and hypophosphorous acid; and a condensed phosphoric acid such as hypophosphoric acid salt, pyrophosphoric acid salt, a pblyphosphoric acid salt (e.g., triphosphoric acid salt, tetraphosphoric acid salt), a polymetaphosphoric acid salt [e.g., $(Ca)_3(P_3O_9)_2$], and an anhydrous phosphoric acid salt [e.g., $Ca_2(P_4O_{12})$, $Ca_5(P_3O_{10})_2$], in particular a non-condensed phosphoric acid salt.

The metal preferably includes a polyvalent metal, for example, the alkaline earth metal, the transition metal and the metals of the Groups 2B and 3B of the Periodic Table of Elements, particularly the alkaline earth metal.

As the metal phosphate (or metal salt of a phosphoric acid), there may be mentioned a salt of the phosphoric acid with the polyvalent metal, in addition a hydrogenphosphate corresponding to the polyvalent metal phosphate. The metal salt may have a ligand (e.g., hydroxo, halogen).

As the metal phosphate, there may be used, for example, a pyrophosphate (such as $Ca_2P_2O_7$), a polymetaphosphate (such as $Ca_3(P_3O_9)_2$), a salt of anhydrous phosphoric acid (such as $Ca_2(P_4O_{12})$ and $Ca_5(P_3O_{10})_2$), in addition a condensed phosphate (such as $Ca_5(PO_4)_3(OH)$ and $Ca_5(PO_4)_3(F, Cl)$), and there is preferably used a hydrogenphosphate.

Such a hydrogenphosphate includes, for example, a non-condensed hydrogenphosphate such as an alkaline earth metal hydrogenphosphate [e.g., a magnesium hydrogen orthophosphate (such as magnesium hydrogenphosphate and magnesium dihydrogenphosphate), a calcium hydrogen orthophosphate (such as calcium dihydrogenphosphate and calcium secondary phosphate)]; a transition metal hydrogenphosphate [e.g., manganese hydrogenphosphate (such as manganese (III) hydrogenphosphate), iron hydrogenphosphate (such as $Fe(H_2PO_4)_3$)]; a hydrogenphosphate of the metal of the Group 2B of the Periodic Table of Elements (such as zinc hydrogenphosphate and cadmium hydrogenphosphate); a hydrogenphosphate of the metal of the Group 3B of the Periodic Table of Elements (such as aluminum hydrogenphosphate); and a hydrogenphosphate of the metal of the Group 4B of the Periodic Table of Elements (such as tin hydrogenphosphate). Among them, a substantially anhydrous metal hydrogenphosphate, particularly an alkaline earth metal hydrogenphosphate [such as magnesium dihydrogenphosphate, calcium dihydrogenphosphate and calcium secondary phosphate ($CaHPO_4$)], is preferred.

(Metal Borate)

The boric acid preferably includes a non-condensed boric acid such as orthoboric acid and metaboric acid; a condensed boric acid such as pyroboric acid, tetraboric acid, pentaboric acid and octaboric acid; and a basic boric acid. As the metal, the alkali metal may be used, and it is preferred to use a polyvalent metal such as the alkaline earth metal, the transition metal and the metal of the Group 2B of the Periodic Table of Elements.

The metal borate is usually a salt hydrate and includes, for example, a non-condensed borate [e.g., a non-condensed borate of an alkaline earth metal (such as calcium orthoborate and calcium metaborate); a non-condensed borate of a transition metal (such as manganese orthoborate and copper metaborate); a non-condensed borate of the metal of the Group 2B of the Periodic Table of Elements (such as zinc metaborate and cadmium metaborate), in particular metaborate], a condensed borate [e.g., a condensed borate of an alkaline earth metal (such as trimagunesium tetraborate and calcium pyroborate); a condensed salt of a transition metal (such as manganese tetraborate and nickel diborate); a condensed borate of the metal of the Group 2B of the Periodic Table of Elements (such as zinc tetraborate and cadmium tetraborate)], and a basic borate (e.g., a basic borate of the metal of the Group 2B of the Periodic Table of Elements, such as basic zinc borate and basic cadmium borate). Moreover, a hydrogenborate corresponding to the borate (e.g., manganese hydrogenorthoborate) may be also employed. In particular, a borate of the alkaline earth metal or metal of the Group 2B of the Periodic Table of Elements (a non-condensed or condensed borate) (particularly a (hydrous) zinc borate, a (hydrous) calcium borate) is preferred.

(Metal Stannate)

Exemplified as a stannic acid is stannic acid, metastannic acid, orthostannic acid, hexahydroxostannic acid, or others. As a metal, there may be exemplified an alkali metal, or a polyvalent metal such as an alkaline earth metal, a transition metal, and the metal of the Group 2B of the Periodic Table of Elements. The metal stannate is usually a salt hydrate and includes, for example, an alkali metal stannate (e.g., sodium stannate, potassium stannate), an alkaline earth metal stannate (e.g., magnesium stannate), a transition metal stannate (e.g., cobalt stannate), and a stannate of the metal of the Group 2B of the Periodic Table of Elements (e.g., zinc stannate). Among these metal stannates, a stannate of an alkaline earth metal, or a stannate of the metal of the Group 2B of the Periodic Table of Elements [in particular a (hydrous) calcium stannate, a (hydrous) zinc stannate] is preferred. These metal stannates may be used singly or in combination.

As a metal salt of an inorganic acid (oxygen acid) other than a phosphoric acid, a boric acid, and a stannic acid, there may be used various metal salts corresponding to the metal phosphate and metal borate.

Among these metal salts of inorganic acids, a metal phosphate, in particular an alkaline earth metal hydrogenphosphate (e.g., calcium hydrogenphosphate) is preferred.

The flame-retardant auxiliary (C) may be treated with the use of a surface-modifying agent such as an epoxy-series compound, a coupling agent (e.g., a silane-series compound, a titanate-series compound, an aluminum-series compound), and a chromium-series compound. Moreover, the flame-retardant auxiliary (C) may be coating-treated with a metal, a glass, a cyanurate of a triazine derivative, a thermosetting resin (e.g., a phenol resin, a urea resin, a melamine resin, an aniline resin, a furan resin, a xylene resin, or a co-condensed resin thereof, an unsaturated polyester resin, an alkyd resin, a vinylester resin, a diallylphthalate resin, an epoxy resin, a polyurethane resin, a silicon-containing resin, a polyimide), a thermoplastic resin, or the like. Among these coat-treatments, the flame-retardant auxiliary is usually coating-treated with a thermosetting resin (e.g., a phenol resin, an epoxy resin). For example, a coat-treatment method for the flame-retardant auxiliary (C) may be referred to Japanese Patent Application Laid-Open No. 125489/1977 (JP-52-125489A), Japanese Patent Application Laid-Open No. 21704/1987 (JP-62-21704A), Japanese Patent Application Laid-Open No. 110254/1988 (JP-63-110254A), Japanese Patent Application Laid-Open No. 53569/1996 (JP-8-53569A), Japanese Patent Application Laid-Open No. 53574/1996 (JP-8-53574A), Japanese Patent Application Laid-Open No. 169120/2000 (JP-2000-169120A), Japanese Patent Application Laid-Open No. 131293/2001 (JP-2001-131293A), and others. The proportion of the flame-retardant auxiliary (C) relative to a coating component is not particularly limited to a specific one. For example, the coating component is about 0.1 to 20% by weight, preferably about 0.1 to 10% by weight (e.g., about 0.1 to 8% by weight) relative to a flame-retardant auxiliary (C) to be coated.

The above flame-retardant auxiliaries (C) may be used singly or in combination.

The proportion of the metal salt of the inorganic acid is not particularly limited to a specific one as far as resin properties thereof are not deteriorated, and is about 0.1 to 30 parts by weight, preferably about 1 to 20 parts by weight, and more preferably about 3 to 15 parts by weight relative to 100 parts by weight of the thermoplastic resin.

(D) Stabilizer Auxiliary

The stabilizer auxiliary to a flame retardant (in particular a phosphoric ester) includes a compound having a functional group reactive to an active hydrogen atom (D1) and a water-repellent compound (D2).

(D1) Compound having Functional Group Reactive to Active Hydrogen Atom

As the compound having a functional group reactive to an active hydrogen atom, there may be exemplified a compound having at least one functional group selected from a cyclic ether group [e.g., an epoxy group, an oxetane group (or ring)], an acid anhydride group, an isocyanate group, an oxazoline group (or ring), an oxazine group (or ring), a carbodiimide group, and others.

Among compounds having a cyclic ether group, a compound having an epoxy group includes an alicyclic compound, a glycidyl ester compound, a glycidyl ether compound, a glycidyl amine compound, an epoxy group-containing vinyl copolymer, an epoxidized compound of a homo- or copolymer of a diene-series monomer [for example, an epoxidized polybutadiene; an epoxidized compound of a copolymer of a diene-series monomer and other copolymerizable monomer, e.g., an epoxidized compound of a copolymer of a diene-series monomer and a styrenic monomer such as an epoxidized (styrene-butadiene copolymer)], a triglycidyl isocyanurate, an epoxy-modified (or epoxy-containing) (poly)organosiloxane, or others.

The alicyclic compound includes, for example, an alicyclic compound in which the unsaturated bond is epoxidized (e.g., vinylcyclohexene dioxide, dicyclopentadiene oxide), an alicyclic epoxy resin (alicyclic diepoxyacetal, alicyclic diepoxyadipate, alicyclic diepoxycarboxylate, vinylcyclopentadiene dioxide, vinylcyclohexene mono- or dioxide), or others.

As the glycidyl ester compound, for example, there may be mentioned a glycidyl ester of a saturated aliphatic carboxylic acid (e.g., a glycidyl ester of a saturated $C_{2-24}$aliphatic carboxylic acid such as glycidyl acetate, glycidyl propionate, glycidyl butyrate, glycidyl pelargonate, glycidyl laurate, glycidyl palmitate, glycidyl stearate, glycidyl behenate, and glycidyl versatate), a diglycidyl ester of a saturated aliphatic dicarboxylic acid (e.g., a diglycidyl ester of a saturated $C_{4-18}$aliphatic dicarboxylic acid such as diglycidyl succinate, diglycidyl adipate, and diglycidyl dodecanedicarboxylate), a glycidyl ester of an unsaturated carboxylic acid [e.g., a glycidyl ester of an unsaturated $C_{2-24}$aliphatic carboxylic acid such as glycidyl (meth)acrylate, glycidyl ethacrylate, glycidyl itaconate, glycidyl behenolate, glycidyl oleate, glycidyl linoleate, and glycidyl stearolate], a glycidyl ester of an alicyclic carboxylic acid (e.g., glycidyl cyclohexanecarboxylate), a glycidyl ester of an aromatic carboxylic acid (e.g., glycidyl benzoate, glycidyl t-butylbenzoate, glycidyl p-toluylate), a diglycidyl ester of an aromatic dicarboxylic acid (e.g., diglycidyl terephthalate, diglycidyl isophthalate, diglycidyl phthalate, diglycidyl naphthalenedicarboxylate), or others.

The glycidyl ether compound includes, for example, an alkyl glycidyl ether compound (e.g., a $C_{1-6}$alkyl glycidyl ether such as n-butyl glycidyl ether), an aryl glycidyl ether compound (e.g., phenyl glycidyl ether), a bisphenol-based epoxy resin [e.g., an epoxy resin having a bis(hydroxyphenyl)$C_{1-10}$alkane backbone such as a bisphenol A-based, a bisphenol F-based, and a bisphenol AD-based epoxy resin, and a bisphenol S-based epoxy resin], a novolak epoxy resin (e.g., a phenol novolak epoxy resin, a cresol novolak epoxy resin), an aliphatic epoxy resin (e.g., a hydrogenated bisphenol A-based epoxy resin, a propylene glycol mono- or diglycidyl ether, a pentaerythritol mono- to tetraglycidyl ether), a monocyclic epoxy resin (e.g., resorcin glycidyl ether, tetrahydroxyphenylmethane-based epoxy resin), or others.

As the glycidyl amine compound, for example, there may be mentioned a glycidyl amine-based epoxy resin (e.g., tetraglycidyl diaminodiphenylmethane, triglycidyl aminophenol, diglycidyl aniline, diglycidyl toluidine).

The epoxy group-containing vinyl-series polymer includes, for example, a copolymer of glycidyl (meth)acrylate and a copolymerizable monomer [e.g., a $C_{2-4}$olefin-glycidyl (meth)acrylate copolymer such as an ethylene-glycidyl methacrylate copolymer; a $C_{2-4}$olefin-glycidyl (meth)acrylate-styrene copolymer such as an ethylene-glycidyl methacrylate-styrene copolymer; a $C_{2-4}$olefin-glycidyl (meth)acrylate-(meth)acrylonitrile-styrene copolymer; a styrene-(meth)acrylonitrile-glycidyl (meth)acrylate copolymer], an epoxy-modified (or epoxy-containing) styrenic resin [for example, an epoxy-modified polystyrene-styrene copolymer; an epoxy-modified styrenic resin obtained by treating a styrenic resin with a peroxide compound, in which the styrenic resin is formed by random- or block-copolymerizing a diene-series monomer (e.g., butadiene, isoprene) (e.g., an epoxidized SBS, "Epofriend" manufactured by Daicel Chemical Industries, Ltd.)]. Among these epoxy group-containing compounds, an epoxy resin, in particular a bisphenol-based epoxy resin (e.g., a bisphenol A-based epoxy resin), is preferred.

Among the compounds having a cyclic ether group, the compound having an oxetane group (or ring) includes an oxetanyl ester compound, an oxetanyl ether compound, an oxetanyl amine compound, a trioxetanyl isocyanurate, an oxetane group-containing vinyl copolymer, an oxetane-modified (poly)organosiloxane, or others.

As oxetanyl ester compound, for example, there may be mentioned an oxetanyl ester of a saturated aliphatic carboxylic acid (e.g., an oxetanyl ester of a saturated $C_{2-24}$aliphatic carboxylic acid such as oxetanyl acetate, oxetanyl propionate, oxetanyl butyrate, oxetanyl pelargonate, oxetanyl laurate, oxetanyl palmitate, oxetanyl stearate, oxetanyl behenate, and oxetanyl versatate), a dioxetanyl ester of a saturated aliphatic dicarboxylic acid (e.g., a dioxetanyl ester of a saturated $C_{4-18}$aliphatic dicarboxylic acid such as dioxetanyl succinate, dioxetanyl adipate, and dioxetanyl dodecanedicarboxylate), an oxetanyl ester of an unsaturated carboxylic acid [e.g., an oxetanyl ester of an unsaturated $C_{2-24}$aliphatic carboxylic acid such as oxetanyl (meth)acrylate, oxetanyl ethacrylate, oxetanyl itaconate, oxetanyl behenolate, oxetanyl oleate, oxetanyl linoleate, and oxetanyl stearolate], an oxetanyl ester of an alicyclic carboxylic acid (e.g., oxetanyl cyclohexanecarboxylate), an oxetanyl ester of an aromatic carboxylic acid (e.g., oxetanyl benzoate, oxetanyl t-butylbenzoate, oxetanyl p-toluylate), an oxetanyl ester of an aromatic dicarboxylic acid (e.g., dioxetanyl terephthalate, dioxetanyl isophthalate, dioxetanyl phthalate, dioxetanyl naphthalenedicarboxylate), or others.

The oxetanyl ether compound includes, for example, an alkyl oxetanyl ether compound (e.g., a $C_{1-6}$alkyl oxetanyl ether such as n-butyl oxetanyl ether), an aryl oxetanyl ether compound (e.g., phenyl oxetanyl ether), an aralkyl oxetanyl ether compound (e.g., benzyl oxetanyl ether, xylylene dioxetanyl ether), a bisphenol-based oxetane resin [e.g., an oxetane resin having a bis(hydroxyphenyl)$C_{1-10}$alkane backbone such as a bisphenol A-based, a bisphenol F-based, and a bisphenol AD-based oxetane resin, and a bisphenol S-based oxetane resin], a novolak oxetane resin (e.g., a phenol novolak oxetane resin, a cresol novolak oxetane resin), an aliphatic oxetane resin (e.g., a hydrogenated bisphenol A-based oxetane resin, propylene glycol mono- or dioxetanyl ether, a pentaerythritol mono- to tetraoxetanyl ether), a monocyclic oxetane resin (e.g., resorcin oxetanyl ether, tetrahydroxyphenylmethane-based oxetane resin), or others.

As the oxetanyl amine compound, for example, there may be mentioned an oxetanyl amine-based oxetane resin (e.g., tetraoxetanyl diaminodiphenylmethane, trioxetanyl aminophenol, dioxetanyl aniline, dioxetanyl toluidine).

The oxetane group-containing vinyl-series polymer includes, for example, a $C_{2-4}$olefin-oxetanyl (meth)acrylate copolymer such as an ethylene-oxetanyl methacrylate copolymer, an ethylene-oxetanyl methacrylate-styrene copolymer, a $C_{2-4}$olefin-oxetanyl (meth)acrylate-(meth)acrylonitrile-styrene copolymer such as an oxetane-modified (or oxetnane-containing) polystyrene-styrene copolymer, or others. The oxetanyl (meth)acrylate compound includes methyl-3-(meth)acryloxymethyloxetane, ethyl-3-(meth)acryloxymethyloxetane, or the like.

The preferred oxetane compound includes an oxetanyl ester compound such as di[1-ethyl(3-oxetanyl)]methyl isophthalate and di[1-ethyl(3-oxetanyl)]methyl terephthalate, an oxetanyl ether compound (e.g., an alkyloxetanyl compound such as di[1-ethyl(3-oxetanyl))methyl ether and 3-ethyl-3-(2-ethylhexyloxymethyl) oxetane, an aryloxetanyl compound such as 3-ethyl-3-(phenoxymethyl) oxetane, an aralkyloxetanyl ether compound such as 1,4-bis{[(3-ethyl-3-oxetanyl)methoxy]methyl}benzene, a bisphenol-based oxetane resin such as a bisphenol-A di[1-ethyl(3-oxetanyl)] methyl ether, a novolak oxetane resin such as a mono- to poly[1-ethyl(3-oxetanyl)]methyl etherified phenol novolak resin and a mono- to poly [1-ethyl(3-oxetanyl)]methyl etherified cresol novolak resin}, an oxetane-modified (or oxetane-containing) (poly)organosiloxane such as 3-ethyl-3-{[3-(triethoxysilyl)propoxy]methyl} oxetane, and a derivative having an alkyloxetanyl unit [e.g., a derivative having an alkyl(3-oxetanyl)methyl unit] corresponding to the derivative having an oxetanyl unit [e.g., the above-mentioned derivative having [1-ethyl(3-oxetanyl)]methyl unit].

The compound having an acid anhydride group includes an aliphatic dicarboxylic anhydride (e.g., maleic anhydride, succinic anhydride), an aromatic polycarboxylic anhydride [e.g., phthalic anhydride, tetrahydrophthalic anhydride, hexahydrophthalic anhydride, pyromellitic anhydride, naphthalenetetracarboxylic dianhydride, dianhydride of bis(3,4-dicarboxyphenyl)alkane], anolefinicresinhaving an acid anhydride group [e.g., an ethylene-maleic anhydride copolymer, an ethylene-(meth)acrylic acid-maleic anhydride copolymer, a maleic anhydride-modified polypropylene such as a maleic anhydride-grafted polypropylene], or others. Among these acid anhydride group-containing compounds, an olefinic resin having a maleic anhydride group (e.g., an ethylene-maleic anhydride copolymer, a maleic anhydride-modified polypropylene) is preferred.

The compound having an isocyanate group includes an aliphatic isocyanate [e.g., trimethylene diisocyanate, 1,2-propylene diisocyanate, tetramethylene diisocyanate, pentamethylene diisocyanate, hexamethylene diisocyanate (HDI), trimethylhexamethylene diisocyanate], an alicyclic isocyanate [e.g., cyclopentene diisocyanate, cyclohexane diisocyanate, 3-isocyanatemethyl-3,5,5-trimethylcyclohexyl isocyanate (isophorone diisocyanate; IPDI), a trimer of IPDI, dicyclohexylmethane diisocyanate (hydrogenated MDI), methylcyclohexane diisocyanate, bis(isocyanatemethyl)cyclohexane (hydrogenated XDI)], an aromatic isocyanate [e.g., phenylene diisocyanate, diphenyl diisocyanate, naphthalene diisocyanate (NDI), diphenylmethane diisocyanate (MDI), tolylene diisocyanate (TDI), toluidine diisocyanate (TODI), diphenyl ether diisocyanate], an araliphatic isocyanate [e.g., xylylene diisocyanate (XDI), tetramethylxylylene diisocyanate (TMXDI)], and others. Moreover, as the compound having an isocyanate group, there may be exemplified a polymer of the above-mentioned isocyanate compound (the above-mentioned aliphatic, alicyclic, aromatic and araliphatic isocyanate) (for example, a dimer, a trimer (an isocyanurate group-containing polyisocyanate), and a polyurethane oligomer or polymer [for example, a reaction product of the above-mentioned isocyanate component with a polyol component (e.g., a $C_{2-10}$alkylene glycol such as ethylene glycol, propylene glycol, trimethylene glycol, tetramethylene glycol, 1,3- or 1,2-butanediol, pentanediol, neopentyl glycol, heptanediol, octanediol, nonanediol and decanediol, or a condensed product thereof (a polyether diol such as a polyoxy$C_{2-4}$alkylene glycol), a polyester diol, a polycarbonate diol)], a urethane (meth)acrylate [for example, a reaction product of a polyurethane oligomer with a hydroxy$C_{2-6}$alkyl (meth)acrylate], and others. Among these isocyanate group-containing compounds, an aromatic polyisocyanate (e.g., MDI, TDI), an aromatic polyurethane oligomer, or others is preferred.

As the compound having an oxazoline group (or ring), there may be exemplified oxazoline, an alkyloxazoline (a $C_{1-4}$alkyloxazoline such as 2-methyloxazoline, and 2-ethyloxazoline), a bisoxazoline compound, and others. The bisoxazoline compound includes 2,2'-bis(2-oxazoline), a 2,2'-bis(alkyl-2-oxazoline) [e.g., a 2,2'-bis($C_{1-6}$alkyl-2-oxazoline) such as 2,2'-bis(4-methyl-2-oxazoline), 2,2'-bis(4-ethyl-2-oxazoline), and 2,2'-bis(4,4-dimethyl-2-oxazoline)], a 2,2'-bis(aryl-2-oxazoline) [e.g., 2,2'-bis(4-phenyl-2-oxazoline)], a 2,2'-bis(cycloalkyl-2-oxazoline) [e.g., 2,2'-bis(4-cyclohexyl-2-oxazoline)], a 2,2'-bis(aralkyl-2-oxazoline) [e.g., 2,2'-bis(4-benzyl-2-oxazoline)], a 2,2'-alkylenebis(2-oxazoline) [e.g., a 2,2'-$C_{1-10}$alkylenebis(2-oxazoline) such as 2,2'-ethylenebis(2-oxazoline), and 2,2'-tetramethylenebis(2-oxazoline)], a 2,2'-alkylenebis(alkyl-2-oxazoline) [e.g., a 2,2'-$C_{1-10}$alkylenebis($C_{1-6}$alkyl-2-oxazoline) such as 2,2'-ethylenebis(4-methyl-2-oxazoline), and 2,2'-tetramethylenebis(4,4-dimethyl-2-oxazoline)], a 2,2'-arylenebis(2-oxazoline) [e.g., 2,2'-(1,3-phenylene)-bis(2-oxazoline), 2,2'-(1,4-phenylene)-bis(2-oxazoline), 2,2'-(1,2-phenylene)-bis(2-oxazoline), 2,2'-diphenylenebis(2-oxazoline)], a 2,2'-arylenebis(alkyl-2-oxazoline) [e.g., a 2,2'-phenylenebis($C_{1-6}$alkyl-2-oxazoline) such as 2,2'-(1,3-phenylene)-bis(4-methyl-2-oxazoline), and 2,2'-(1,4-phenylene)-bis(4,4-dimethyl-2-oxazoline)], a 2,2'-aryloxyalkanebis(2-oxazoline) [e.g., 2,2'-9,9'-diphenoxyethanebis(2-oxazoline)], a 2,2'-cycloalkylenebis(2-oxazoline) [e.g., 2,2'-cyclohexylenebis(2-oxazoline)], an N,N'-alkylenebis(2-carbamoyl-2-oxazoline) [e.g., an N,N'-$C_{1-10}$alkylenebis(2-carbamoyl-2-oxazoline) such as N,N'-ethylenebis(2-carbamoyl-2-oxazoline), and N,N'-tetramethylenebis(2-carbamoyl-2-oxazoline)], an N,N'-alkylenebis(2-carbamoyl-alkyl-2-oxazoline) [e.g., an N,N'-$C_{1-10}$alkylenebis(2-carbamoyl-$C_{1-6}$alkyl-2-oxazoline) such as N,N'-ethylenebis(2-carbamoyl-4-methyl-2-oxazoline), and N,N'-tetramethylenebis(2-carbamoyl-4,4-dimethyl-2-oxazoline)], an N,N'-arylenebis(2-carbamoyl-2-oxazoline) [e.g., N,N'-phenylenebis(2-carbamoyl-oxazoline)], or others. Moreover, the compound having an oxazoline group also includes a vinyl polymer containing an oxazoline group [for example, RPS Series, RAS Series and RMS Series of "EPOCROS", manufactured by Nippon Shokubai Co., Ltd.], and others. Among these oxazoline compounds, a bisoxazoline compound is preferred.

As the compound having an oxazine group (or ring), there may be exemplified oxazine, a bisoxazine compound, and others. The bisoxazine compound includes 2,2'-bis(5,6-dihydro-4H-1,3-oxazine), a 2,2'-bis(alkyl-5,6-dihydro-4H-1,3-oxazine) [e.g., a 2,2'-bis($C_{1-6}$alkyl-5,6-dihydro-4H-1,3-oxazine) such as 2,2'-bis(4-methyl-5,6-dihydro-4H-1,3-oxazine), 2,2'-bis(4,4-dimethyl-5,6-dihydro-4H-1,3-oxazine), and 2,2'-bis(4,5-dimethyl-5,6-dihydro-4H-1,3-oxazine)], a 2,2'-alkylenebis(5,6-dihydro-4H-1,3-oxazine) [e.g., a 2,2'-$C_{1-10}$alkylenebis(5,6-dihydro-4H-1,3-oxazine) such as 2,2'-methylenebis(5,6-dihydro-4H-1,3-oxazine), 2,2'-ethylenebis(5,6-dihydro-4H-1,3-oxazine), and 2,2'-hexanemethylenebis(5,6-dihydro-4H-1,3-oxazine)], a 2,2'-arylenebis(5,6-dihydro-4H-1,3-oxazine) [e.g., 2,2'-(1,3-phenylene)-bis(5,6-dihydro-4H-1,3-oxazine), 2,2'-(1,4-phenylene)-bis(5,6-dihydro-4H-1,3-oxazine), 2,2'-(1,2-phenylene)-bis(5,6-dihydro-4H-1,3-oxazine), 2,2'-naphthylenebis(5,6-dihydro-4H-1,3-oxazine), 2,2'-diphenylenebis(5,6-dihydro-4H-1,3-oxazine)], an N,N'-alkylenebis(2-carbamoyl-5,6-dihydro-4H-1,3-oxazine) [e.g., an N,N'-$C_{1-10}$alkylenebis(2-carbamoyl-5,6-dihydro-4H-1,3-oxazine) such as N,N'-ethylenebis(2-carbamoyl-5,6-dihydro-4H-1,3-oxazine), and N,N'-tetramethylenebis(2-carbamoyl-5,6-dihydro-4H-1,3-oxazine)], an N,N'-alkylenebis(2-carbamoyl-alkyl-5,6-dihydro-4H-1,3-oxazine) [e.g., an N,N'-$C_{1-10}$alkylenebis(2-carbamoyl-$C_{1-6}$alkyl-5,6-dihydro-4H-1,3-oxazine) such as N,N'-ethylenebis(2-carbamoyl-4-methyl-5,6-dihydro-4H-1,3-oxazine), and N,N'-hexamethylenebis(2-carbamoyl-4,4-dimethyl-5,6-dihydro-4H-1,3-oxazine)], an N,N'-arylenebis(2-carbamoyl-5,6-dihydro-4H-1,3-oxazine) [e.g., N,N'-phenylenebis(2-carbamoyloxazine)], and others. Among these oxazine compounds., a bisoxazine compound is preferred.

As the compound having a carbodiimide group, there may be exemplified an aromatic carbodiimide (e.g., an aryl carbodiimide such as diphenylcarbodiimide and dinaphthylcarbodiimide, a linear or branched $C_{1-6}$alkyl-substituted aryl carbodiimide such as 2,2'-dimethyldiphenylcarbodiimide, 2,6,2',6'-tetraethyldiphenylcarbodiimide, 2,6,2',6'-tetraisopropyldiphenylcarbodiimide, 2,4,6,2',4',6'-hexaisopropyldiphenylcarbodiimide, 2,4,6,2',4',6'-tri-t-butyldiphenylcarbodiimide and 2,4,2',4'-diethyltolylcarbodiimide), a polycarbodiimide [e.g., a polyaryl carbodiimide such as a poly(phenylcarbodiimide) and a poly(naphthylcarbodiimide); a homo- or copolymer of a linear or branched $C_{1-6}$alkyl-substituted aryl carbodiimide, such as a poly(2-methyldiphenylcarbodiimide), a poly(2,6-diethyldiphenylcarbodiimide), a poly(2,6-diisopropyldiphenylcarbodiimide), a poly(2,4,6-triisopropyldiphenylcarbodiimide), and a poly(2,4,6-tri-t-butyldiphenylcarbodiimide); a poly[$C_{1-4}$alkylenebis($C_{1-6}$alkyl or $C_{3-8}$cycloalkylaryl)carbodiimide] such as a poly[4,4'-methylenebis(2,6-diethylphenyl)carbodiimide], a poly[4,4'-methylenebis(2-ethyl-6-methylphenyl)carbodiimide], a poly[4,4'-methylenebis(2,6-diisopropylphenyl)carbodiimide], and a poly[4,4'-methylenebis(2-ethyl-6-methylcyclohexylphenyl) carbodiimide]], and others. Among these carbodjimide group-containing compounds, a polycarbodiimide, in particular an aromatic polycarbodiimide is preferred.

These compounds having a functional group reactive to an active hydrogen atom (or functional group-containing compounds) may be used singly or in combination.

(D2) Water-repellent Compound

Exemplified as the water-repellent compound is a fluorine-containing oligomer, a silicone-series resin, and others. These water-repellent compounds may be used singly or in combination.

The silicone-series resin includes a (poly)organosiloxane. The (poly)organosiloxane includes a monoorganosilbxane, e.g., a siloxane having substituent(s) such as an alkyl group (a $C_{1-10}$alkyl group such as methyl group, ethyl group, propyl group, butyl group, pentyl group, and hexyl group), a halogenated alkyl group (a halogenated $C_{1-10}$alkyl group such as 3-chloropropyl group, and 3,3,3-trifluoropropyl group), an alkenyl group (a $C_{2-10}$alkenyl group such as vinyl group, allyl group, butenyl group, pentenyl group, and hexenyl group), an aryl group (e.g., a $C_{6-12}$aryl group such as phenyl group, tolyl group, xylyl group, and naphthyl group), a cycloalkyl group (a $C_{3-10}$cycloalkyl group such as cyclopentyl group, and cyclohexyl group), or an aralkyl group (a $C_{6-12}$aryl-$C_{1-4}$alkyl group such as benzyl group, and phenethyl group); a homopolymer or copolymer of the siloxane; and others. Among these substituents, a substituent such as methyl group, phenyl group, an alkenyl group (e.g., vinyl group), and a fluoro$C_{1-6}$alkyl group is preferred. As the (poly)organosiloxane, for example, there may be mentioned a homopolymer such as a dialkylsiloxane (e.g., dimethylsiloxane), an alkylarylsiloxane (e.g., phenylmethylsiloxane), a diarylsiloxane (e.g., diphenylsiloxane), and amonoorganosiloxane (for instance, a polydimethylsiloxane, a polyphenylmethylsiloxane); or a copolymer; or others. Moreover, the (poly)organosiloxane also includes a branched organosiloxane [e.g., trade name "XC99-B5664" manufactured by Toshiba Silicone Co., Ltd., compounds described in Japanese Patent Application Laid-Open No. 139964/1998 (JP-10-139964A)], and a linear, branched, or crosslinked polymer. Further, a modified (poly)organosiloxane (for example, a modified silicone) having substituent(s) such as hydroxyl group, carboxyl group, amino group, and ether group in the end or main chain of the molecule may be also used.

Among these silicone-series resins, a polydimethylsiloxane, a polyphenylmethylsiloxane, or a polydiphenylsiloxane, each of which may have a branched structure, is preferred. The silicone-series resin may be used in the form of a liquid oil, a thermoplastic resin, a crosslinked rubber, or a composition or composite containing two or more kinds thereof.

[Proportion of Flame Retardant and Stabilizer Auxiliary to be Used]

In the present invention, the combination use of a specific stabilizer auxiliary with a flame retardant composed of a phosphorus-containing compound, an aromatic resin and a specific flame-retardant auxiliary can impart high flame retardancy and hydrolysis resistance to a wide variety of thermoplastic resins at a small amount of addition of the flame retardant.

The proportion of the flame retardant relative to the thermoplastic resin is not particularly limited to a specific one as far as resin properties thereof are not deteriorated, and is about 0.1 to 300 parts by weight (e.g., about 1 to 300 parts by weight), preferably about 1 to 250 parts by weight, and more preferably about 50 to 200 parts by weight relative to 100 parts by weight of the thermoplastic resin.

As the thermoplastic resin and the aromatic resin, different kinds of resins are usually employed. In such a case, the ratio (weight ratio) of the thermoplastic resin relative to the aromatic resin [the thermoplastic resin/the aromatic resin] is about 50/50 to 99/1 (e.g., about 50/50 to 95/5), preferably about 60/40 to 90/10, and more preferably about 70/30 to 85/15.

The proportion of the aromatic resin in the flame retardant may be suitably selected within the range that flame retardancy can be imparted to a resin, and is about 1 to 500 parts by weight (e.g., about 10 to 500 parts by weight), preferably about 10 to 400 parts by weight, and more preferably about 50 to 350 parts by weight relative to 100 parts by weight of the phosphorus-containing compound. Moreover, the proportion of the flame-retardant auxiliary is about 5 to 1000 parts by weight, preferably about 10 to 500 parts by weight, and more preferably about 50 to 300 parts by weight relative to 100 parts by weight of the phosphorus-containing compound. The ratio (weight ratio) of the aromatic resin relative to the flame-retardant auxiliary in the flame retardant is about 10/90 to 99/1, preferably about 20/80 to 95/5, and more preferably about 40/60 to 90/10.

The proportion of the nitrogen-containing compound relative to the resin component composed of the thermoplastic resin and the aromatic resin is not more than 70 parts by weight (e.g., about 0.01 to 70 parts by weight), preferably about 0.01 to 60 parts by weight (e.g., 0.05 to 50 parts by weight), more preferably about 0.1 to 40 parts by weight (in particular about 1 to 20 parts by weight), and usually about 1 to 30 parts by weight (e.g., about 1 to 15 parts by weight) relative to 100 parts by weight of the resin component.

The proportion of the stabilizer auxiliary is not particularly limited to a specific one as far as resin properties are not deteriorated, and is about 0.01 to 100 parts by weight, preferably about 0.1 to 80 parts by weight, and more preferably about 0.1 to 50 parts by weight relative to 100 parts by weight of the thermoplastic resin.

Moreover, the proportion of the stabilizer auxiliary is about 0.1 to 100 parts by weight (e.g., about 1 to 100 parts by weight), preferably about 0.5 to 100 parts by weight (e.g., about 1 to 80 parts by weight), more preferably about 1 to 50 parts by weight, and usually about 5 to 60 parts by weight relative to 100 parts by weight of the phosphorus-containing compound.

[Additive]

If necessary, the flame-retardant resin composition of the present invention may comprise a variety of additives (for example, other flame-retardant, a dripping inhibitor, an antioxidant, a stabilizer). The total content of the additive(s) is about 0.01 to 50 parts by weight, preferably about 0.1 to 30 parts by weight, and more preferably about 1 to 20 parts by weight relative to 100 parts by weight of the thermoplastic resin.

(Other Flame Retardant)

Incidentally, the flame-retardant resin composition of the present invention may comprise, in order to further impart flame retardancy to the composition, other flame retardant(s), for example a sulfur-containing flame retardant, an alcohol-based flame retardant, an inorganic flame retardant (e.g., a metal oxide, a metal hydroxide, a metal sulfide), and others.

The sulfur-containing flame retardant includes an organic sulfonic acid (e.g., an alkanesulfonic acid, a perfluoroalkanesulfonic acid, an arylsulfonic acid, a sulfonated polystyrene), sulfamic acid, an organic sulfamic acid, a salt of an organic sulfonic acid amide (e.g., an ammonium salt, an alkali metal salt, an alkaline earth metal salt), and others.

Examples of the alcohol-based flame retardant include a polyhydric alcohol (e.g., pentaerythritol), an oligomeric polyhydric alcohol (e.g., dipentaerythritol, tripentaerythritol), an esterified polyhydric alcohol, a substituted alcohol, a cellulose compound (e.g., cellulose, hemicellulose, lignocellulose, pectocellulolse, adipocellulose), and a saccharide compound (e.g., a monosaccharide, a polysaccharide).

Among the inorganic flame retardants, the metal oxide includes, for example, molybdenum oxide, tungstic oxide, titanium oxide, zirconium oxide, tin oxide, copper oxide, zincoxide, aluminumoxide, nickeloxide, ironoxide, manganese oxide, antimony trioxide, antimony tetraoxide, antimony pentaoxide, and others. The metal hydroxide includes, for example, aluminum hydroxide, magnesium hydroxide, tin hydroxide, and zirconium hydroxide. As the metal sulfide, for example, there may be mentioned zinc sulfide, molybdenum sulfide, tungstic sulfide, and others. Moreover, the inorganic flame retardant also includes an expansive graphite.

These other flame retardants may be used singly or in combination.

The content of other flame retardant may for example be selected within the range of about 0.01 to 50 parts by weight, preferably about 0.05 to 30 parts by weight, and particularly about 0.1 to 20 parts by weight relative to 100 parts by weight of the thermoplastic resin.

Moreover, the flame retardant resin composition of the present invention may comprise an antioxidant and/or a stabilizer to maintain thermal stability of the composition for a long term. The antioxidant or the stabilizer includes a phenol-series (e.g., hindered phenols), amine-series (e.g., hindered amines), phosphorous-series, sulfur-series, hydroquinone-series, or quinoline-series antioxidant (or stabilizer), an inorganic stabilizer (a hydrotalcite, a zeolite), and others.

The phenol-series (phenolic) antioxidant preferably includes a hindered phenol (hindered phenol-series antioxidant), e.g., a $C_{2-10}$alkylene glycol-bis[3-(3,5-di-branched $C_{3-6}$alkyl-4-hydroxyphenyl) propionate] such as 1,6-hexanediol-bis[3-(3,5-di-t-butyl-4-hydroxyphenyl) propionate]; e.g., a di- or trioxy$C_{2-4}$alkylene glycol-bis[3-(3,5-di-branched $C_{3-6}$alkyl-4-hydroxyphenyl) propionate] such as triethylene glycol-bis[3-(3-t-butyl-5-methyl-4-hydroxyphenyl) propionate]; e.g., a $C_{3-8}$alkylenetriol-bis[3-(3,5-di-branched $C_{3-6}$alkyl-4-hydroxyphenyl) propionate] such as glycerin-tris[3-(3,5-di-t-butyl-4-hydroxyphenyl) propionate]; and e.g., a $C_{4-8}$alkylene tetraol-tetrakis[3-(3,5-di-branched $C_{3-6}$alkyl-4-hydroxyphenyl) propionate] such as pentaerythritol-tetrakis[3-(3,5-di-t-butyl-4-hydroxyphenyl) propionate].

The amine-series antioxidant includes a hindered amine, for example, a tri- or tetra$C_{1-3}$alkylpiperidine or a derivative thereof [e.g., 2,2,6,6-tetramethylpiperidine which may have a substituent (such as methoxy, benzoyloxy or phenoxy group) at 4-position], a bis (tri-, tetra- or penta$C_{1-3}$alkylpiperidine) $C_{2-20}$alkylenedicarboxylic ester [e.g., bis(2,2,6,6-tetramethyl-4-piperidyl) oxalate, a melonate, adipate, sebacate or terephthalate corresponding to the oxalate; and bis(1,2,2,6,6-pentamethyl-4-piperidyl) sebacate], 1,2-bis(2, 2,6,6-tetramethyl-4-piperidyloxy)ethane, phenylnaphthylamine, N,N'-diphenyl-1,4-phenylenediamine, and N-phenyl-N'-cyclohexyl-1,4-phenylenediamine.

The phosphorus-containing stabilizer (or antioxidant) includes an organic phosphorus-containing stabilizer, for example, triisodecyl phosphite, trisnonylphenyl phosphite, diphenylisodecyl phosphite, phenyldiisodecyl phosphite, 2,2-methylenebis(4,6-di-t-butylphenyl)octyl phosphite, 4,4'-butylidenebis(3-methyl-6-t-butylphenyl)ditridecyl phosphite, a tris(branched $C_{3-6}$alkylphenyl) phosphite [e.g., tris (2,4-di-t-butylphenyl) phosphite, tris(2-t-butyl-4-methylphenyl) phosphite, tris(2,4-di-t-amylphenyl) phosphite], a (branched $C_{3-6}$alkylphenyl)phenyl phosphite [e.g., bis(2-t-butylphenyl)phenyl phosphite, 2-t-butylphenyldiphenyl phosphite], tris (2-cyclohexylphenyl) phosphite, a bis(Cl-galkylaryl)pentaerythritol diphosphite [e.g., bis(2,4-di-t-butylphenyl)pentaerythritol diphosphite, bis(2, 4-di-t-butyl-4-methylphenyl)pentaerythritol diphosphite, bis (2,6-di-t-butyl-4-methylphenyl)pentaerythritol diphosphite, bis(nonylphenyl)pentaerythritol diphosphite], a triphenyl phosphate-series stabilizer (e.g., 4-phenoxy-9-α-(4-hydroxyphenyl)-p-cumenyloxy-3,5,8,10-tetraoxa-4,9-diphosphaspiro[5.5]undecane, tris(2,4-di-t-butylphenyl) phosphate], and a diphosphonite-series stabilizer (e.g., tetrakis (2,4-di-t-butyl)-4,4'-biphenylene diphosphonite). The phosphorus-containing stabilizer usually has a branched $C_{3-6}$alkylphenyl group (particularly, t-butylphenyl group).

The hydroquinone-series antioxidant includes, for example, 2,5-di-t-butylhydroquinone, and the quinoline-series antioxidant includes, for example, 6-ethoxy-2,2,4-trimethyl-1,2-dihydroquinone. The sulfur-series antioxidant includes, for example, dilaurylthiodipropionate, distearylthiodiproionate, and others.

The inorganic stabilizer includes an inorganic metal-series stabilizer (or a mineral stabilizer) such as a hydrotalcite and a zeolite. As the hydrotalcite, hydrotalcites recited in Japanese Patent Application Laid-Open No. 1241/1985 (JP-60-1241A) and Japanese Patent Application Laid-Open No. 59475/1997 (JP-9-59475A), such as hydrotalcite compounds represented by the following formula are usable.

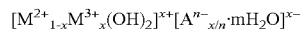

In the formula, $M^{2+}$ represents $Mg^{2+}$, $Mn^{2+}$, $Fe^{2+}$, $Co^{2+}$, or any of other divalent metal ions; $M^{3+}$ represents $Al^{3+}$, $Fe^{3+}$, $Cr^{3+}$, or any of other trivalent metal ions; $A^{n-}$ represents $CO_3^{2-}$, $OH^-$, $HPO_4^{2-}$, $SO_4^{2-}$, or any of other n-valent anions (particularly, monovalent or divalent anion); x is $0<x<0.5$; and m is $0 \leq m < 1$.

Incidentally, the hydrotalcite is available from Kyowa Chemical Industry Co., Ltd. under the trade name "DHT-4A", "DHT-4A-2", or "Alcamizer".

The zeolite is not particularly limited to a specific one, and for example, zeolites recited in Japanese Patent Application Laid-Open No. 62142/1995 (JP-7-62142A) [zeolites the smallest unit cell of which is a crystalline aluminosilicate with an alkali and/or alkaline earth metal (A-, X-, Y-, L-, and ZSM-type zeolites, mordenite-type zeolite; chabazite, mordenite, faujasite, and other naturally-occurring zeolites)] may be employed.

Incidentally, A-type zeolite is available as "ZEOLAM-series (A-3, A-4, A-5)", "ZEOSTAR-series (KA100P, NA-100P, CA-100P)" or others, X-type zeolite as "ZEOLAM-series (F-9)", "ZEOSTAR-series (NX-100P)" or others, and Y-type zeolite as "HSZ-series (320NAA)" or others, from Tosoh Corp. or Nippon Chemical Industrial Co., Ltd. These inorganic stabilizers may be used singly or in combination.

These antioxidants and/or stabilizers may be used singly or in combination. The content of the antioxidant and/or the stabilizer may for example be selected within the range of about 0.01 to 5 parts by weight, preferably about 0.05 to 3 parts by weight (e.g., about 0.05 to 2.5 parts by weight), and particularly about 0.1 to 2.5 parts by weight (e.g., about 0.1 to 1 part by weight) relative to 100 parts by weight of the thermoplastic resin.

Incidentally, in the case using a polyester-series resin or a polycarbonate-series resin as a thermoplastic resin, addition of a phosphoric acid exemplified in the paragraph on the foregoing specific flame-retardant auxiliary (for example, an inorganic phosphoric acid such as a phosphoric acid, a phosphorous acid, a phosphonic acid, a hypophosphorous acid, and a polyphosphoric acid; an organic phosphoric acid such as a phosphonocarboxylic acid. and a nitrogen-containing phosphoric acid) realizes further improvement of thermal stability.

Further, to the flame-retardant resin composition of the present invention may be added a dripping inhibitor such as a fluorine-containing resin. Dripping of kindling material and a molten upon combustion is inhibited by the addition of a dripping inhibitor. As the fluorine-containing resin, there may be mentioned a homo- or copolymer of a fluorine-containing monomer such as tetrafluoroethylene, chlorotrifluoroethylene, vinylidene fluoride, hexafluoropropylene and perfluoroalkyl vinyl ether; and a copolymer of the fluorine-containing monomer and a copolymerizable monomer such as ethylene, propylene and acrylate. Examples of the fluorine-containing resin (or fluorine-series resin) are a homopolymer such as a polytetrafluoroethylene, a polychlorotrifluoroethylene and a polyvinylidene fluoride; and a copolymer such as a tetrafluoroethylene-hexafluoropropylene copolymer, a tetrafluoroethylene-perfluoroalkyl vinyl ether copolymer, an ethylene-tetrafluoroethylene copolymer and an ethylene-chlorotrifluoroethylene copolymer. These fluorine-containing resins may be used singly or in combination.

The fluorine-containing resin may be used in the form of particles, and the mean particle size may for example be about 10 to 5,000 μm, preferably about 100 to 1,000 μm, and more preferably about 100 to 700 μm.

The content of the fluorine-containing resin is, for example, about 0.01 to 10 parts by weight, preferably about 0.1 to 5 parts by weight, and more preferably about 0.1 to 3 parts by weight relative to 100 parts by weight of the total amount of the thermoplastic resin and the aromatic resin.

Further, the flame-retardant resin composition of the present invention may comprise other additive(s) for any purpose. As other additive(s), there may be mentioned a stabilizer (e.g., an ultraviolet ray absorbing agent, aheat stabilizer, aweather (light)-resistant stabilizer), a lubricant, a mold-release agent (releasing agent), a coloring agent (colorant), a plasticizer, a nucleating agent (e.g., an alkali metal salt of an organic carboxylic acid, an alkaline earth metal salt of an organic carboxylic acid), an impact resistance improver (impact modifier), a slip-(friction/wear) improving agent, and others.

[Filler]

The flame-retardant resin composition of the present invention may be modified with the use of a filler to further improve mechanical strength, rigidity, thermal stability, electrical property and others. The filler includes a fibrous filler, and a non-fibrous filler (such as a plate-like one and a particulate one).

As the fibrous filler, there may be mentioned a glass fiber, an asbestos fiber, a carbon fiber, a silica fiber, a silica-alumina fiber, a zirconia fiber, a potassium titanate fiber, a metal fiber, and an organic fiber having high melting point (e.g., an aliphatic or aromatic polyamide, an aromatic polyester, a fluorine-containing resin, an acrylic resin such as a polyacrylonitrile).

Among the non-fibrous fillers, the plate-like filler includes a glass flake, a mica, a graphite, a variety of metal foil, and others.

The particulate filler includes a carbon black, a silica, a powder of quartz, a glass bead, a glass powder, a milled fiber (such as a milled glass fiber), a silicate [e.g., a calcium silicate, an aluminum silicate, a kaolin, a talc, a clay, a diatomite, a wollastonite); a metal oxide (e.g., an iron oxide, a titanium oxide, a zinc oxide, an alumina); a metal carbonate (e.g., a calcium carbonate, a magnesium carbonate); a metal sulfate (e.g., a calcium sulfate, a barium sulfate); and a metal powder (such as a silicon carbide).

The preferred fibrous filler includes a glass fiber and a carbon fiber. The preferred non-fibrous filler includes a particulate or plate-like filler, in particular a glass bead, a mild fiber, a kaolin, a talc, a mica, and a glass flake.

Moreover, the particularly preferred filler includes a glass fiber, for example, a glass fiber having high strength and rigidity (e.g., chopped strand).

In the case using the filler, the proportion of the filler in the flame-retardant resin composition is, for example, about 0.5 to 60% by weight, preferably about 1 to 60% by weight (e.g., about 1 to 50% by weight), and more preferably about 1 to 45% by weight.

On the occasion of use of the filler, a sizing agent or surface-treatment agent may be optionally employed. Such a sizing agent or surface-treatment agent includes a functional compound. As the functional compound, there may be mentioned, for example, an epoxy-series compound, silane-series compound, a titanate-series compound, and preferably an epoxy-series compound (particularly, a bisphenol A-based epoxy resin, a novolak epoxy resin).

The filler may be size-treated or surface-treated with use of the sizing agent or surface-treatment agent. The time to treat the filler may be the same time with addition thereof, or the time precedent to addition thereof.

Moreover, the amount of the functional surface-treatment agent or sizing agent to be used in combination with the filler is about not more than 5% by weight, and preferably about 0.05 to 2% by weight relative to the filler.

These additives may be used singly or in combination. Among the above-mentioned additives, the flame-retardant resin composition of the present invention preferably comprises at least one member selected from the group consisting of the antioxidant (the hindered phenol-series antioxidant, the phosphorus-containing stabilizer), the stabilizer (the inorganic stabilizer), the dripping inhibitor (the fluorine-containing resin), and the filler.

The flame retardant of the present invention imparts high flame retardancy to a resin probably because the flame retardant facilitates carbonization of the resin surface on burning. Moreover, the combination use of a phosphorus-containing compound, an aromatic resin, and a specific flame-retardant auxiliary realizes high flame retardancy of a thermoplastic resin in small amount of the flame retardant, and does not bleed out and deteriorate heat stability.

[Production Process of Flame-retardant Resin Composition]

The flame-retardant resin composition of the present invention may be a particulate mixture or a molten mixture, and it may be prepared by mixing the thermoplastic resin with the flame retardant, the stabilizer auxiliary, and if necessary, the dripping inhibitor or other additive(s) in a conventional manner. For example, (1) a process comprising mixing each component, kneading and extruding the resulting mixture into pellets with a uniaxial or biaxial extruder, and molding the pellets, (2) a process comprising once making pellets (master batch) different in composition, mixing (diluting) the pellets in a certain amount, and molding the resulting pellets to give a shaped article having a specific composition, or (3) a process comprising directly charging one or not less than 2 of each component with a molding machine, is utilized. Further, as a production process of pellets with an extruder, for example, the following processes are available: (1) a production process comprising precedently melt-mixing all components except for a brittle or fragile filler such as a glass-series filler, and then mixing the brittle or fragile filler with the mixture; (2) a production process comprising precedently melt-mixing all components except for a phosphorus-containing compound and a brittle or fragile filler such as a glass-series filler, and then mixing the phosphorus-containing compound and the brittle or fragile filler with the mixture simultaneously (in the same feed position); (3) a production process comprising precedently melt-mixing all components except for a phosphorus-containing compound and a brittle or fragile filler such as a glass-series filler, and then mixing the brittle or fragile filler and the phosphorus-containing compound with the mixture sequentially (in different feed positions); and other processes. In the pellet production with use of an extruder, a small amount of a dispersing auxiliary agent such as an aromatic compound or halogen-containing compound (e.g., benzene, toluene, xylene, chlorobenzene, trichlorobenzene, chloroform, trichloroethylene) may be blended in the extrusion step. The dispersing auxiliary agent is removed from the kneaded resin through a vent-port of the extruder. Moreover, in the preparation of the composition for a shaped article, dispersion of other component(s) (e.g., a flame retardant) may be improved advantageously by mixing a powdery or particulate thereplastic resin component (e.g., a powder or particulate obtained by pulverizing a part or all of the polyester-series resin) with the other component(s) and melt-kneading the mixture.

Incidentally, for imparting handling, it is usable the master batch prepared by melt-mixing a non-resinous component(s) (e.g., the phosphorus-containing compound, the nitrogen-containing compound, the metal salt of an inorganic acid, the functional group-containing compound) and a resinous component(s) (e.g., the thermoplastic resin, the aromatic resin, the functional group-containing resin, the water-repellent compound). In particular, when a red phosphorus is used as the phosphorus-containing compound, a master batch is often prepared. Moreover, when a master batch comprises the resinous component(s), part of the thermoplastic resin is used as a master batch in many cases.

The master batch includes, for example, (a) a master batch comprising a part of a thermoplastic resin, and a non-resinous component; (b) a master batch comprising an aromatic resin and a non-resinous component; (c) a master batch comprising an aromatic resin, a resinous flame retardant, and a non-resinous component; (d) a master batch comprising a part of a thermoplastic resin, an aromatic resin, and a non-resinous component; (e) a master batch comprising a part of a thermoplastic resin, a resinous component, and a non-resinous component; and (f) a master batch comprising a part of a thermoplastic resin, an aromatic resin, a resinous component, and a non-resinous component.

If necessary, the master batch may comprise a variety of additives such as a fluorine-containing resin, an antioxidant, a phosphorus-containing stabilizer, an inorganic stabilizer, and a filler.

The flame-retardant resin composition can be produced by melt-mixing thus obtained master batch, a thermoplastic resin, and if necessary a residual component(s).

Moreover, a shaped article may be molded by melt-mixing the flame-retardant resin composition of the present invention and molding the composition by a conventional manner such as extrusion molding, injection molding and compression molding. The shaped article is excellent in flame retardancy and molding processability (mold-processability), and may be utilized for various purposes. For example, the shaped article is suitable for an electric or electronic device part, an office automation (OA) device part, a household electrical appliance part, a mechanical device part, an automotive part, a packaging material or a case, and others.

INDUSTRIAL APPLICABILITY

According to the present invention, the combination use of a thermoplastic resin, a flame retardant comprising a phosphorus-containing compound, an aromatic resin and a specific flame-retardant auxiliary, and a specific stabilizer auxiliary imparts flame retardancy to the resin even in small amount of the flame retardant without using a halogen-series flame retardant. In particular, mold deposit and bleeding out (or blooming) of the flame retardant is effectively inhibited without deteriorating resin properties. Moreover, even in the case using a phosphoric ester as a flame retardant, a flame-retardant resin composition which is excellent in hydrolysis resistance can be obtained. Further, a shaped article having improved flame retardancy can be obtained by the use of such a resin composition.

EXAMPLES

The following examples are intended to describe this invention in further detail and should by no means be interpreted as defining the scope of the invention.

Incidentally, flame retardancy, blooming properties and hydrolysis resistance of a resin composition were evaluated on the basis of the following tests.

(Evaluation of Flame Retardancy)

In accordance with UL94, the flame retardancy was evaluated using a test piece 0.8 mm thick.

(Evaluation of Blooming Properties)

A test piece 0.8 mm thick for burning was heated at 150° C. for 5 hours, and visually observed for the state of bleeding out in the surface of the test piece. The blooming properties were evaluated on the basis of the following judgmental standard.
- "A": no bleeding out was observed
- "B": slight bleeding out was observed
- "C": remarkable bleeding out was observed (Evaluation of Hydrolysis Resistance)

A test piece for ISO tensile test was prepared by means of injection molding, and the PCT test (measurement conditions: 121° C.×100% RH, 2 atmospheres, and 24 hours) was carried out using the test piece. The tensile strengths before and after PCT test were measured, and the retention (%) of the tensile strength was qualified as an index of hydrolysis resistance.

[Thermoplastic Resin R]
R-1: Polybutylene terephthalate ["DURANEX", intrinsic viscosity=1.0, manufactured by Polyplastics Co., Ltd.]
R-2: Polystyrene [MFR=1.0 g/10 min., manufactured by Toyo Styrene Co., Ltd.]
R-3: Polyethylene terephthalate ["BELLPET EFG", manufactured by Kanebo Gohsen, Ltd.]
R-4: Acrylonitrile-styrene copolymer ["CEVIAN NJD", manufactured by Daicel Chemical Industries, Ltd.]

[Flame Retardant]

[Phosphorus-containing Compound A]
A-1: Resorcinol bis(di-2,6-xylenyl phosphate) ["PX200", manufactured by Daihachi Chemical Industry Co., Ltd.]
A-2: Hydroquinone bis(di-2,6-xylenyl phosphate) ["PX201", Manufactured by Daihachi Chemical Industry Co., Ltd.]
A-3: Biphenol bis(di-2,6-xylenyl phosphate) ["PX202", manufactured by Daihachi Chemical Industry Co., Ltd.]
A-4: Bisphenol-A bis(diphenyl phosphate) ["CR741", manufactured by Daihachi Chemical Industry Co., Ltd.]
A-5: Phenoxyphosphazene [a mixture of 3- to 4-membered cyclic phenoxyphosphazene]
A-6: Aluminum salt of ethylmethylphosphinic acid
A-7: 1,4-piperazinediyl tetraphenylphosphate [N,N'-bis(diphenoxyphosphinyl)piperazine]

[Aromatic Resin B]
B-1: Poly(2,6-dimethyl-1,4-phenylene)ether ("PPE polymerYPX-100F", manufactured by Mitsubishi Gas Chemical Co., Inc.)
B-2: Polycarbonate ["PANLITE L1225", manufactured by Teijin Chemicals Ltd.]
B-3: Polyarylate ["POLYARYLATE U100", manufactured by Unitika Ltd.]
B-4: Novolak phenol resin ["SUMILITE RESIN PR-53647", manufactured by Sumitomo Durez Co., Ltd.]
B-5: Poly(1,4-phenylene) sulfide
B-6: Novolak epoxy resin ["EPPN-201", manufactured by Nippon Kayaku Co., Ltd.]
B-7: Nylon MXD6 ["RENY 6002", manufactured by Mitsubishi Engineering-Plastics Corp.]

[Flame-retardant Auxiliary C]

[Nitrogen-containing Cyclic Compound C1]
C1-1: Melam polyphosphate ["PMP200", manufactured by Nissan Chemical Industries, Ltd.]
C1-2: Polyphosphoric acid amide ["SUMISAFE PM", manufactured by Sumitomo Chemical Co., Ltd.]
C1-3: Melamine polyphosphate ["PMP100", manufactured by Nissan Chemical Industries, Ltd.]
C1-4: Melamine sulfate ["APINON 901", manufactured by Sanwa Chemical Co., Ltd.]
C1-5: Melamine polyphosphate ["Melapur 200", manufactured by DSM]
C1-6: Melamine cyanurate ["MC610", manufactured by Nissan Chemical Industries, Ltd.]

[Metal Salt of Inorganic Acid C2]
C2-1: Anhydrous calcium secondary phosphate [mean particle size=about 30 μm, manufactured by Taihei Chemical Industrial Co., Ltd.]
C2-2: Zinc borate ["FIREBRAKE ZB", manufactured by Borax Japan Ltd.]

[Stabilizer Auxiliary D]

[Compound having Functional Group Reactive to Active Hydrogen Atom (Stabilizer Auxiliary D1)]
D1-1: Bisphenol A-based epoxy resin ["EPIKOTE 828", manufactured by Yuka Shell Epoxy K.K.]
D1-2: Bisphenol A-based epoxy resin ["EPIKOTE 1004K", manufactured by Yuka Shell Epoxy K.K.]
D1-3: Ethylene-glycidyl methacrylate-styrene copolymer ["MODIPER A4100", manufactured by NOF Corporation]
D1-4: Ethylene-glycidyl methacrylate-methyl methacrylate copolymer ["MODIPER A4200", manufactured by NOF Corporation]
D1-5: Epoxy-modified styrene-styrene copolymer ["RESEDA GP500", manufactured by Toagosei Co., Ltd.]
D1-6: Isophorone diisocyanate ["VESTANTT1890"]
D1-7: Carbodiimide ["CARBODILITE HMV-8CA", manufactured by Nisshin Spinning Co., Ltd.]
D1-8: 2,2'-(1,3-phenylene)-bis(2-oxazoline)
D1-9: Oxazoline group-containing vinyl polymer ["EPOCROS RAS-1020", manufactured by Nippon Shokubai Co., Ltd.]
D1-10: Glycidyl versatate
D1-11: 1,4-bis{[3-ethyl-3-oxetanylmethoxy]methyl}benzene ["OXT-121", manufactured by Toagosei Co., Ltd.]
D1-12: Di[1-ethyl(3-oxetanyl)]methyl ether ["OXT-221", manufactured by Toagosei Co., Ltd.]

[Water-repellent Compound (Stabilizer Auxiliary D2)]
D2-1: Dimethylsilicone oil [7500 cst]

[Inorganic Filler E]
E-1: Glass chopped strand being 10 μm in diameter and 3 mm long
E-2: Calcium carbonate
E-3: Talc

[Antioxidant F]
F-1: Pentaerythritol-tetrakis[3-(3,5-di-t-butyl-4-hydroxyphenyl)propionate]["IRGANOX 1010", manufactured by Ciba-Geigy Ltd.]

[Stabilizer G]
G-1: Bis-(2,6-di-t-butyl-4-methylphenyl) pentaerythritol diphosphite ["ADK STAB PEP36", manufactured by Adeka Argus Chemical Co., Ltd.]

G-2: Tetrakis(2,4-di-t-butylphenyl)-4,4'-biphenylene diphosphonite ["SANDOSTAB P-EPQ", manufactured by Sandoz.]

G-3: Hydrotalcite ["DHT-4A", manufactured by Kyowa Chemical Industry Co., Ltd.]

G-4: Zeolite ["ZEOLAM A-3", manufactured by Tosoh Corp.]

[Dripping Inhibitor H]

H-1: Polytetrafluoroethylene

Examples 1 to 40 and Comparative Examples 1 to 11

The above components were mixed in the ratio (parts by weight) described in Tables 1 to 5, and the mixture was kneaded and extruded with the use of an extruder to prepare a resin composition. The obtained resin composition was subjected to injection molding to make shaped articles for flame retardancy test and tensile evaluation test. The flame retardancy, blooming properties, and hydrolysis resistance were evaluated with the use of the test shaped articles. The results are shown in Tables 1 to 5.

TABLE 1

| | Examples | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Thermoplastic resin R (parts by weight) | R-1 100 | R-1 100 | R-1 100 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-3 90 R-2 10 | R-3 90 R-2 10 |
| Phosphorus-containing compound A (parts by weight) | A-1 40 | A-1 40 | A-1 40 | A-1 40 | A-1 40 | A-1 40 | A-1 40 | A-1 40 | A-1 40 | A-1 40 | A-1 40 | A-1 40 | A-1 40 | A-1 40 | A-1 40 |
| Aromatic resin B (parts by weight) | B-1 35 | B-1 35 | B-1 35 | B-1 35 | B-1 35 | B-1 35 | B-1 35 | B-1 35 | B-1 35 | B-1 35 | B-1 35 | B-1 35 | B-1 35 | B-2 35 | B-3 35 |
| Nitrogen-containing cyclic compound C1 (parts by weight) | C1-1 15 | C1-1 15 | — | C1-1 13 | C1-1 13 | C1-1 13 | C1-1 13 | C1-1 13 | C1-1 13 | C1-1 13 | C1-1 13 | C1-1 13 | C1-1 13 | C1-1 13 | C1-1 13 |
| Metal salt of inorganic acid C2 (parts by weight) | — | — | C2-1 15 | — | — | — | — | — | — | — | — | — | — | — | — |
| Stabilizer auxiliary D1 (parts by weight) | D1-1 2 | D1-2 2 | D1-2 2 | D1-1 2 | D1-2 2 | D1-3 4 | D1-4 4 | D1-5 4 | D1-6 2 | D1-7 2 | D1-8 2 | D1-9 4 | — | D1-2 2 | D1-2 2 |
| Stabilizer auxiliary D2 (parts by weight) | — | — | — | — | — | — | — | — | — | — | — | — | D2-1 1 | D2-1 1 | — |
| Inorganic filler E (parts by weight) | E-1 80 | E-1 80 | E-1 80 | E-1 80 | E-1 80 | E-1 80 | E-1 80 | E-1 80 | E-1 80 | E-1 80 | E-1 80 | E-1 80 | E-1 80 | E-1 80 | E-1 80 |
| Antioxidant F (parts by weight) | F-1 0.8 | F-1 0.8 | F-1 0.8 | F-1 0.8 | F-1 0.8 | F-1 0.8 | F-1 0.8 | F-1 0.8 | F-1 0.8 | F-1 0.8 | F-1 0.8 | F-1 0.8 | F-1 0.8 | F-1 0.8 | F-1 0.8 |
| Stabilizer G (parts by weight) | G-1 0.8 | G-2 0.8 | — | — | — | — | — | — | — | — | — | — | — | — | G-2 0.8 |
| Dripping inhibitor H (parts by weight) | H-1 1.3 | H-1 1.3 | H-1 1.3 | H-1 1.3 | H-1 1.3 | H-1 1.3 | H-1 1.3 | H-1 1.3 | H-1 1.3 | H-1 1.3 | H-1 1.3 | H-1 1.3 | H-1 1.3 | H-1 1.3 | H-1 1.3 |
| UL94 Flame Retardancy | V-0 | V-0 | V-0 | V-0 | V-0 | V-0 | V-0 | V-0 | V-0 | V-0 | V-0 | V-0 | V-0 | V-0 | V-0 |
| Blooming properties | A | A | A | A | A | A | A | A | A | A | A | A | A | A | A |
| Hydrolysis resistance Retention of the tensile strength (%) | 78 | 81 | 82 | 85 | 87 | 89 | 85 | 87 | 84 | 87 | 86 | 76 | 83 | 80 | 81 |

TABLE 2

| | Examples | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Thermoplastic resin R (parts by weight) | R-3 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-1 90 R-2 10 | R-3 90 R-2 10 |
| Phosphorus-containing compound A (parts by weight) | A-1 40 | A-1 40 | A-1 40 | A-1 40 | A-1 40 | A-1 40 | A-1 40 | A-1 40 | A-1 40 | A-3 40 | A-1 40 | A-1 40 | A-1 40 | A-1 40 | A-1 40 |
| Aromatic resin B (parts by weight) | B-3 35 | B-1 35 | B-1 35 | B-1 35 | B-1 35 | B-1 35 | B-1 35 | B-1 35 B-2 3 | B-1 35 B-3 3 | B-1 35 B-4 3 | B-1 35 | B-1 35 | B-1 35 | B-1 25 B-5 10 | B-1 35 |
| Nitrogen-containing cyclic compound C1 (parts by weight) | C1-1 13 | C1-2 13 | C1-3 13 | C1-3 13 | C1-4 13 | — | — | C1-1 13 | C1-1 13 | C1-1 10 | C1-5 5 | C1-5 5 | C1-5 5 | C1-1 13 | C1-1 13 |
| Metal salt of inorganic acid C2 (parts by weight) | — | — | — | — | — | C2-1 15 | C2-1 15 | — | — | — | C2-1 5 | C2-1 5 | C2-2 5 | — | — |

TABLE 2-continued

| | Examples | | | | | | | | | | | | | | |
|---|---|---|---|---|---|---|---|---|---|---|---|---|---|---|---|
| | 16 | 17 | 18 | 19 | 20 | 21 | 22 | 23 | 24 | 25 | 26 | 27 | 28 | 29 | 30 |
| Stabilizer auxiliary D | D1-2 | D1-3 | D1-3 | D1-6 | D1-7 | D1-2 | D1-7 | D1-2 | D1-2 | D2-1 | D1-2 | D1-7 | D1-2 | D1-2 | D1-7 |
| (parts by weight) | 2 | 4 | 4 | 4 | 4 | 2 | 2 | 2 | 2 | 1 | 2 | 2 | 2 | 2 | 2 |
| Inorganic filler E | E-1 | E-1 | E-1 | E-1 | E-1 | E-1 | E-1 | E-1 | E-1 | E-1 | E-1 | E-1 | E-1 | E-1 | E-1 |
| (parts by weight) | 80 | 80 | 80 | 80 | 80 | 80 | 80 | 80 | 80 | 80 | 80 | 80 | 80 | 80 | 80 |
| Antioxidant F | F-1 | F-1 | F-1 | F-1 | F-1 | F-1 | F-1 | F-1 | F-1 | F-1 | F-1 | F-1 | F-1 | F-1 | F-1 |
| (parts by weight) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| Stabilizer G | G-2 | — | — | — | — | — | — | G-1 | G-2 | — | — | — | — | G-1 | G-1 |
| (parts by weight) | 0.8 | | | | | | | 0.8 | 0.8 | | | | | 0.8 | 0.8 |
| Dripping inhibitor H | H-1 | H-1 | H-1 | H-1 | H-1 | H-1 | H-1 | H-1 | H-1 | — | H-1 | H-1 | H-1 | H-1 | H-1 |
| (parts by weight) | 1.3 | 1.3 | 1.3 | 1.3 | 1.3 | 1.3 | 1.3 | 1.3 | 1.3 | | 1.3 | 1.3 | 1.3 | 1.3 | 1.3 |
| UL94 Flame Retardancy | V-0 | V-0 | V-0 | V-0 | V-0 | V-0 | V-0 | V-0 | V-0 | V-0 | V-0 | V-0 | V-0 | V-1 | V-0 |
| Blooming properties | A | A | A | A | A | A | A | A | A | A | A | A | A | A | A |
| Hydrolysis resistance Retention of the tensile strength (%) | 85 | 74 | 82 | 82 | 83 | 83 | 81 | 79 | 82 | 80 | 79 | 84 | 81 | 82 | 77 |

TABLE 3

| | Comparative Examples | | | | |
|---|---|---|---|---|---|
| | 1 | 2 | 3 | 4 | 5 |
| Thermoplastic resin R (parts by weight) | R-1 100 | R-1 100 | R-1 100 | R-1 100 | R-1 90 R-2 10 |
| Phosphorus-containing compound A (parts by weight) | — | A-1 40 | A-1 40 | A-1 40 | A-1 40 |
| Aromatic resin B (parts by weight) | B-1 35 | — | B-1 35 | B-1 35 | B-1 35 |
| Nitrogen-containing cyclic compound C1 (parts by weight) | C1-1 15 | C1-1 15 | — | C1-1 15 | C1-1 13 |
| Metal salt of inorganic acid C2 (parts by weight) | — | — | — | — | — |
| Stabilizer auxiliary D1 (parts by weight) | D1-2 2 | D1-2 2 | — | — | — |
| Stabilizer auxiliary D2 (parts by weight) | — | — | — | — | — |
| Inorganic filler E (parts by weight) | E-1 80 | E-1 80 | E-1 80 | E-1 80 | E-1 80 |
| Antioxidant F (parts by weight) | F-1 0.8 | F-1 0.8 | F-1 0.8 | F-1 0.8 | F-1 0.8 |
| Stabilizer G (parts by weight) | — | — | — | — | — |
| Dripping inhibitor H (parts by weight) | H-1 1.3 | H-1 1.3 | — | H-1 1.3 | H-1 1.3 |
| UL94 Flame Retardancy | HB | HB | V-2 | V-0 | V-0 |
| Blooming properties | A | C | B | A | A |
| Hydrolysis resistance Retention of the tensile strength (%) | 81 | 76 | 53 | 51 | 55 |

TABLE 4

| | Examples | | | | | | | | | |
|---|---|---|---|---|---|---|---|---|---|---|
| | 31 | 32 | 33 | 34 | 35 | 36 | 37 | 38 | 39 | 40 |
| Thermoplastic resin R (parts by weight) | R-1 90 | R-3 40 | R-1 90 | R-1 45 R-3 45 | R-1 90 | R-1 50 R-3 30 | R-1 75 | R-1 90 | R-1 90 | R-1 90 |
| | R-2 10 | R-4 20 | R-2 10 | R-2 10 | R-4 10 | R-4 20 | R-4 25 | R-4 10 | R-2 10 | R-4 10 |
| Phosphorus-containing compound A (parts by weight) | A-1 40 | A-1 35 | A-1 40 | A-4 40 | A-1 40 | A-1 35 | A-1 50 | A-5 40 | A-1 20 A-6 20 | A-7 40 |

TABLE 4-continued

| | | Examples | | | | | | | | | |
|---|---|---|---|---|---|---|---|---|---|---|---|
| | | 31 | 32 | 33 | 34 | 35 | 36 | 37 | 38 | 39 | 40 |
| Aromatic resin B | | B-1 | B-6 | B-1 | B-1 | B-1 | B-7 | B-2 | B-1 | B-1 | B-1 |
| (parts by weight) | | 35 | 5 | 35 | 35 | 35 | 15 | 75 | 35 | 35 | 35 |
| Nitrogen-containing cyclic compound C1 (parts by weight) | | C1-1 13 | C1-1 50 | C1-6 13 | C1-1 13 | C1-6 13 | C1-1 C1-6 15   50 | C1-6 100 | C1-6 13 | C1-6 13 | C1-6 13 |
| Stabilizer auxiliary D (parts by weight) | | D1-1 3 D1-10 3 | D1-11 3 | D1-1 3 D1-12 3 | D1-2 3 | D1-1 3 D1-11 3 | D1-1 3 D1-11 3 | D1-1 5 D1-11 5 | D1-1 3 D1-11 3 | D1-1 3 D1-11 3 | D1-1 3 D1-11 3 |
| Inorganic filler E (parts by weight) | | E-1 80 E-2 2 | E-1 80 E-2 2 | E-1 80 | E-1 80 E-3 2 | E-1 80 | E-1 90 E-2 3 | E-1 150 | E-1 80 E-2 2 | E-1 80 E-2 2 | E-1 80 E-2 2 |
| Antioxidant F (parts by weight) | | F-1 0.8 | F-1 0.8 | F-1 0.8 | F-1 0.8 | F-1 0.8 | F-1 1 | F-1 1.5 | F-1 0.8 | F-1 0.8 | F-1 0.8 |
| Stabilizer G (parts by weight) | | — | G-2 0.8 | G-3 2 | G-2 G-4 0.8   2 | G-3 3 | G-2 1 | G-2 G-4 1.5   5 | — | — | — |
| Dripping inhibitor H (parts by weight) | | H-1 1.3 | H-1 1.3 | H-1 1.3 | H-1 1.3 | H-1 1.3 | H-1 1.5 | H-1 2.5 | H-1 1.3 | H-1 1.3 | H-1 1.3 |
| UL94 Flame Retardancy | | V-0 | V-0 | V-0 | V-0 | V-0 | V-0 | V-0 | V-0 | V-0 | V-0 |
| Blooming properties | | A | A | A | A | A | A | A | A | A | A |
| Hydrolysis resistance Retention of the tensile strength (%) | | 88 | 94 | 93 | 91 | 96 | 92 | 91 | 96 | 97 | 91 |

TABLE 5

| | Comparative Examples | | | | | |
|---|---|---|---|---|---|---|
| | 6 | 7 | 8 | 9 | 10 | 11 |
| Thermoplastic resin R (parts by weight) | R-1 90 | R-1 45 R-3 45 | R-1 75 | R-1 90 | R-1 90 | R-1 90 |
| | R-2 10 | R-2 10 | R-4 25 | R-4 10 | R-2 10 | R-4 10 |
| Phosphorus-containing compound A (parts by weight) | A-1 40 | A-4 40 | A-1 50 | A-5 40 | A-1 20 A-6 20 | A-7 40 |
| Aromatic resin B (parts by weight) | B-1 35 | B-1 35 | B-2 75 | B-1 35 | B-1 35 | B-1 35 |
| Nitrogen-containing cyclic compound C1 (parts by weight) | C1-6 13 | C1-1 13 | C1-6 100 | C1-6 13 | C1-6 13 | C1-6 13 |
| Stabilizer auxiliary D (parts by weight) | — | — | — | — | — | — |
| Inorganic filler E (parts by weight) | E-1 80 | E-1 80 E-3 2 | E-1 150 | E-1 80 E-2 2 | E-1 80 E-2 2 | E-1 80 |
| Antioxidant F (parts by weight) | F-1 0.8 | F-1 0.8 | F-1 1.5 | F-1 0.8 | F-1 0.8 | F-1 0.8 |
| Stabilizer G (parts by weight) | — | — | — | — | — | — |
| Dripping inhibitor H (parts by weight) | H-1 1.3 | H-1 1.3 | H-1 2.5 | H-1 1.3 | H-1 1.3 | H-1 1.3 |
| UL94 Flame Retardancy | V-0 | V-0 | V-0 | V-0 | V-0 | V-0 |
| Blooming properties | A | A | A | A | A | A |
| Hydrolysis resistance Retention of the tensile strength (%) | 53 | 55 | 48 | 70 | 65 | 52 |

As apparent from the Tables, every resin composition of the Examples, which comprises a flame retardant composed of a phosphorus-containing compound (A), an aromatic resin (B) and a specific flame-retardant auxiliary (C) in combination with a specific stabilizer auxiliary (functional compound and/or water-repellent compound) (D), is excellent in flame retardancy, blooming properties and hydrolysis resistance compared with resin compositions of the Comparative Examples, which lack any of the above-mentioned components.

The invention claimed is:

1. A flame-retardant resin composition comprising at least one thermoplastic resin selected from the group consisting of a polyester-series resin, a polyamide-series resin, a vinyl-series resin, an olefinic resin, and an acrylic resin and a flame retardant, wherein the flame retardant comprises, at least one phosphorus-containing compound (A) selected from the group consisting of a piperazine unit-containing phosphoric ester amide and a metal salt of a phosphinic acid, an aromatic resin (B), and at least one flame-retardant auxiliary (C) selected from the group consisting of a nitrogen-containing compound (C1) and a metal salt of an inorganic acid (C2), and wherein the resin composition further comprises at least one stabilizer auxiliary (D) selected from the group consisting of a compound having a functional group reactive to an active hydrogen atom (D1) and a water-repellent compound (D2).

2. A flame-retardant resin composition according to claim 1, wherein the phosphorus-containing compound (A) comprises at least one member selected from the group consisting of a dialkyl phosphinic metal salt and a dialkyl diphosphinic metal salt.

* * * * *